(12) United States Patent
Parvari et al.

(10) Patent No.: US 11,124,630 B2
(45) Date of Patent: Sep. 21, 2021

(54) INVERSE-FREEZING COMPOSITIONS AND USE THEREOF

(71) Applicant: TECHNION RESEARCH & DEVELOPMENT FOUNDATION LIMITED, Haifa (IL)

(72) Inventors: Galit Parvari, Omar (IL); Daniel Rittel, Haifa (IL); Yonatan Rotbaum, Pardes-Hanna (IL); Yoav Eichen, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 0 days.

(21) Appl. No.: 16/618,905

(22) PCT Filed: Jun. 4, 2018

(86) PCT No.: PCT/IL2018/050606
§ 371 (c)(1),
(2) Date: Dec. 3, 2019

(87) PCT Pub. No.: WO2018/225060
PCT Pub. Date: Dec. 13, 2018

(65) Prior Publication Data
US 2020/0095399 A1    Mar. 26, 2020

(30) Foreign Application Priority Data

Jun. 4, 2017   (IL) .......................................... 252660
Jan. 29, 2018  (IL) .......................................... 257226

(51) Int. Cl.
*C08L 1/28*    (2006.01)
*F41H 1/00*    (2006.01)
*F41H 5/06*    (2006.01)

(52) U.S. Cl.
CPC ................. *C08L 1/28* (2013.01); *F41H 1/00* (2013.01); *F41H 5/06* (2013.01)

(58) Field of Classification Search
CPC ..................................... F41H 1/00; F41H 5/06
(Continued)

(56) References Cited

U.S. PATENT DOCUMENTS 6,228,416 B1    5/2001  Reibert et al.
8,828,134 B2 *  9/2014  Sampson .............. C08B 37/003
                                          106/160.1
(Continued)

FOREIGN PATENT DOCUMENTS

CA    2703807 A1      11/2011
WO    2011139763 A1   11/2011

OTHER PUBLICATIONS

Woignier, T.; Despetis, F.; Alaoui, A.; Etienne, P.; Phalippou, J. Mechanical properties of gel-derived materials. J. Sol-Gel Sci. Technol. 2000, 19 (1-3), 163-169.
(Continued)

*Primary Examiner* — Bret Hayes
(74) *Attorney, Agent, or Firm* — The Roy Gross Law Firm, LLC; Roy Gross

(57) ABSTRACT

A composite comprised of: (i) at least one inverse freezing material, and (ii) an additive in the form of at least one solid particle. Articles made of the composites, and uses of the composites or the articles incorporating same, particularly for reducing incoming shockwaves, are also disclosed.

19 Claims, 31 Drawing Sheets

(58) Field of Classification Search
USPC .................................................. 89/36.02
See application file for complete search history.

(56) References Cited

U.S. PATENT DOCUMENTS

| | | | |
|---|---|---|---|
| 2006/0280797 A1 | 12/2006 | Shoichet et al. | |
| 2014/0287641 A1* | 9/2014 | Steiner, III | F41H 5/0442 442/223 |
| 2014/0343413 A1* | 11/2014 | Jolck | A61B 6/505 600/426 |
| 2016/0089454 A1* | 3/2016 | Andresen | A61P 35/00 424/1.11 |

OTHER PUBLICATIONS

Schupper, N.; Shnerb, N. M. Inverse melting and inverse freezing: A spin model. Physical Review E 2005, 72 (4), 046107.

J. Floury, A. Desrumaux, M. A. V. Axelos, J. Legrand, Degradation of methylcellulose during ultra-high pressure homogenization. Food Hydrocolloids 16 (1), 47-53 (2002).

Y. Rotbaum, G. Parvari, Y. Eichen, D. Rittel, Static and dynamic large strain properties of methyl cellulose hydrogels. Macromol. 50, 4817-4826 (2017).

C.P. Salisbury, D. S. Cronin, Mechanical properties of ballistic gelatin at high deformation rates. Exp. Mech. 49, 829-840 (2009).

Du, F.; Fischer, J. E.; Winey, K. I. Coagulation method for preparing single-walled carbon nanotube/poly (methyl methac-rylate) composites and their modulus, electrical conductivity, and thermal stability. Journal of Polymer Science Part B: Pol-ymer Physics 2003, 41 (24), 3333-3338.

Yano, S.; Maeda, H.; Nakajima, M.; Hagiwara, T.; Sawaguchi, T. Preparation and mechanical properties of bacterial cellulose nanocomposites loaded with silica nanoparticles. Cellulose 2008, 15 (1), 111-120.

PCT Search Report for International Application No. PCT/IL2018/050606, dated Sep. 17, 2018, 3 pp.

PCT Written Opinion for International Application No. PCT/IL2018/050606, dated Sep. 17, 2018, 4 pp.

PCT Preliminary Report on Patentability for International Application No. PCT/IL2018/050606, dated Dec. 10, 2019, 5 pp.

Ahsan, Saad, et al., Structural studies on aqueous gelatin solutions: Implications indesigning a thermo-responsive nanoparticulate formulation, International Journal of Biological Macromolecules, dated Oct. 31, 2016, 9 pp.

Hynninen, Ville, et al., Inverse thermoreversible mechanical stiffening and birefringence in methylcellulose/cellulose nanocrystal hydrogel, Biomacromolecules, Just Accepted Manuscript, dated May 7, 2018, 35 pp.

Schild, H. G. Poly (N-isopropylacrylamide): experiment, theory and application. Prog. Polym. Sci. 1992, 17 (2), 163-249.

Heskins, M.; Guillet, J. E. Solution properties of poly (Nisopropylacrylamide). J. Macromol. Sci., Chem. 1968, 2 (8), 1441-1455.

Hirrden, M.; Chevillard, C.; Desbrieres, J.; Axelos, M.; Rinaudo, M. Thermogelation of methylcelluloses: new evidence for understanding the gelation mechanism. Polymer 1998, 39 (25), 6251-6259.

Desbrieres, J.; Hirrden, M.; Rinaudo, M. A calorimetric study of methylcellulose gelation. Carbohydrate polymers 1998, 37 (2), 145-152.

Li, L.; Thangamathesvaran, P.; Yue, C.; Tam, K; Hu, X.; Lam, Y. Gel network structure of methylcellulose in water. Langmuir 2001, 17 (26), 8062-8068.

Kobayashi, K.; Huang, C.-i.; Lodge, T. P. Thermoreversible gelation of aqueous methylcellulose solutions. Macromolecules 32 (21), 7070-7077, 1999.

Sarkar, N. Kinetics of thermal gelation of methylcellulose and hydroxypropylmethylcellulose in aqueous solutions. Carbohydrate Polymers 1995, 26 (3), 195-203.

Herraez-Dominguez, J.; de Leon, F. G. G.; Diez-Sales, O.; Herráez-Domínguez, M. Rheological characterization of two viscosity grades of methylcellulose: an approach to the modeling of the thixotropic behaviour. Colloid and Polymer Science 2005, 284 (1), 86-91.

Kundu, M.; Mallapragada, S.; Larock, R.; Kundu, P. Rheological properties of methylcellulose aqueous gels under dynamic compression: Frequency sweep and validity of scaling law. Journal of applied polymer science 2010, 117 (4), 2436-2443.

McAllister, J. W.; Lott, J. R.; Schmidt, P. W.; Sammler, R. L.; Bates, F. S.; Lodge, T. P. Linear and nonlinear rheological behavior of fibrillar methylcellulose hydrogels. ACS Macro Letters 2015, 4 (5), 538-542.

Wang, Q.; Li, L. Effects of molecular weight on thermoreversible gelation and gel elasticity of methylcellulose in aqueous solution. Carbohydrate polymers 2005, 62 (3), 232-238.

Sarkar, N. Thermal gelation properties of methyl and hydroxypropyl methylcellulose. Journal of applied polymer science 1979, 24 (4), 1073-1087.

Kundu, P.; Kundu, M. Effect of salts and surfactant and their doses on the gelation of extremely dilute solutions of methyl cellulose. Polymer 2001, 42 (5), 2015-2020.

Xu, Y.; Li, L.; Zheng, P.; Lam, Y. C.; Hu, X. Controllable gelation of methylcellulose by a salt mixture. Langmuir 2004, 20 (15), 6134-6138.

Xu, Y.; Li, L. Thermoreversible and salt-sensitive turbidity of methylcellulose in aqueous solution. Polymer 2005, 46 (18), 7410-7417.

Knarr, M.; Bayer, R. The shear dependence of the methylcellulose gelation phenomena in aqueous solution and in ceramic paste. Carbohydrate polymers 2014, 111, 80-88.

Haque, A.; Morris, E. R. Thermogelation of methylcellulose. Part I: molecular structures and processes. Carbohydrate Polymers 1993, 22 (3), 161-173.

McAllister, J. W.; Schmidt, P. W.; Dorfman, K. D.; Lodge, T. P.; Bates, F. S. Thermodynamics of Aqueous Methylcellulose Solutions. Macromolecules 2015, 48 (19), 7205-7215.

Li, L. Thermal gelation of methylcellulose in water: scaling and thermoreversibility. Macromolecules 2002, 35 (15), 5990-5998.

Li, L.; Shan, H.; Yue, C.; Lam, Y.; Tam, K.; Hu, X. Thermally induced association and dissociation of methylcellulose in aqueous solutions. Langmuir 2002, 18 (20), 7291-7298.

Plazanet, M.; Dean, M.; Merlini, M.; Huller, A.; Emerich, H.; Meneghini, C.; Johnson, M.; Trommsdorff, H. Crystallization on heating and complex phase behavior of alpha-cyclodextrin solutions. Journal of Chemical Physics 2006, 125 (15), 154504.

Lott, J. R.; McAllister, J. W.; Arvidson, S. A.; Bates, F. S.; Lodge, T. P. Fibrillar structure of methylcellulose hydrogels. Biomacromolecules 2013, 14 (8), 2484-2488.

Bodvik, R.; Dedinaite, A.; Karlson, L.; Bergstrom, M.; Baverback, P.; Pedersen, J. S.; Edwards, K.; Karlsson, G.; Varga, I.; Claesson, P. M. Aggregation and network formation of aqueous methylcellulose and hydroxypropylmethylcellulose solutions. Colloids and Surfaces A: Physicochemical and Engineering Aspects 2010, 354 (1), 162-171.

Kong, M.; Saha Dalai, I.; Li, G.; Larson, R. G. Systematic coarse-graining of the dynamics of self-attractive semiflexible polymers. Macromolecules 2014, 47 (4), 1494-1502.

Huang, W.; Ramesh, R.; Jha, P. K.; Larson, R. G. A systematic coarse-grained model for methylcellulose polymers: Spontaneous ring formation at elevated temperature. Macromolecules 2016, 49 (4), 1490-1503.

Ginzburg, V. V.; Sammler, R. L; Huang, W.; Larson, R. G. Anisotropic self-assembly and gelation in aqueous methylcellulose—theory and modeling. Journal of Polymer Science Part B: Polymer Physics 2016, 54 (16), 1624-1636.

Patel, T. R.; Morris, G. A.; de la Torre, J. G.; Ortega, A.; Mischnick, P.; Harding, S. E. Molecular flexibility of methylcelluloses of differing degree of substitution by combined sedimentation and viscosity analysis. Macromolecular bioscience 2008, 8 (12), 1108-1115.

Pavlov, G.; Michailova, N.; Tarabukina, E.; Korneeva, E., Velocity sedimentation of water-soluble methyl cellulose. In Analytical Ultracentrifugation, Springer 1995; pp. 109-113.

(56) References Cited

OTHER PUBLICATIONS

Chen, W. W. Experimental methods for characterizing dynamic response of soft materials. Journal of Dynamic Behavior of Materials 2016, 2 (1), 2-14.
Miller, K.; Chinzei, K. Mechanical properties of brain tissue in tension. Journal of biomechanics 2002, 35 (4), 483-490.
Sun, W.; Sacks, M. S.; Scott, M. J. Effects of boundary conditions on the estimation of the planar biaxial mechanical properties of soft tissues. Journal of biomechanical engineering 2005, 127 (4), 709-715.
Saraf, H.; Ramesh, K.; Lennon, A.; Merkle, A.; Roberts, J. Mechanical properties of soft human tissues under dynamic loading. Journal of biomechanics 2007, 40 (9), 1960-1967.
Knarr, M.; Adden, R.; Anderson, W. K.; Hubner-Keese, B. Characterization of in-vitro gel performance of novel MC with respect to the suitability for satiety applications. Food hydrocolloids 2012, 29 (2), 317-325.
Miquelard-Garnier, G.; Creton, C.; Hourdet, D. Strain induced clustering in polyelectrolyte hydrogels. Soft Matter 2008, 4 (5), 1011-1023.
Webber, R. E.; Creton, C.; Brown, H. R.; Gong, J. P. Large strain hysteresis and mullins effect of tough double-network hydrogels. Macromolecules 2007, 40 (8), 2919-2927.
White, J. C.; Saffer, E M.; Bhatia, S. R. Alginate/PEO-PPO-PEO composite hydrogels with thermally-active plasticity. Biomacromolecules 2013, 14 (12), 4456-4464.
Buyanov, A.; Gofman, I.; Revel'skaya, L.; Khripunov, A.; Tkachenko, A. Anisotropic swelling and mechanical behavior of composite bacterial cellulose-poly (acrylamide or acrylamide-sodium acrylate) hydrogels. Journal of the Mechanical Behavior of Biomedical Materials 2010, 3 (1), 102-111.
Stammen, J. A.; Williams, S.; Ku, D. N.; Guldberg, R. E. Mechanical properties of a novel PVA hydrogel in shear and unconfined compression. Biomaterials 2001, 22 (8), 799-806.
Lee, S.-Y.; Pereira, B. P.; Yusof, N.; Selvaratnam, L.; Yu, Z.; Abbas, A.; Kamarul, T. Unconfined compression properties of a porous poly (vinyl alcohol)-chitosan-based hydrogel after hydration. Acta biomaterialia 2009, 5 (6), 1919-1925.
Chau, M.; De France, K. J.; Kopera, B.; Machado, V. R.; Rosenfeldt, S.; Reyes, L.; Chan, K. J.; Föster, S.; Cranston, E. D.; Hoare, T. Composite hydrogels with tunable anisotropic morphologies and mechanical properties. Chemistry of Materials 2016, 28 (10), 3406-3415.
Chang, C.; Peng, J.; Zhang, L.; Pang, D.-W. Strongly fluorescenthydrogels with quantum dots embedded in cellulose matrices. J. Mater.Chem. 2009, 19 (41), 7771-7776.
Duan, J.; Zhang, X.; Jiang, J.; Han, C.; Yang, J.; Liu, L.; Lan, H.; Huang, D. The synthesis of a novel cellulose physical gel J. Nanomater. 2014, 2014, 1-7.
Roy, N.; Saha, N.; Kitano, T.; Saha, P. Development and characterization of novel medicated hydrogels for wound dressing. Soft Mater 2010, 8 (2), 130-148.
Ivanov, C.; Popa, M.; Ivanov, M.; Popa, A. Synthesis of poly (vinyl alcohol): methyl cellulose hydrogel as possible scaffolds in tissue engineering. J. Optoelectron. Adv. Mater. 2007, 9 (11), 3440-3444.
Negim, E.; Nurpeissova, Z. A.; Mangazbayeva, R.; Khatib, J.; Williams, C.; Mun, G. Effect of pH on the physico-mechanical properties and miscibility of methyl cellulose/poly (acrylic acid) blends. Carbohydr. Polym. 2014, 101, 415-422.
Rajabi-Siahboomi, A.; Nokhodchi, A. Compression properties of methylcellulose and hydroxypropylmethylcellulose polymers. Pharm. Pharmacol. Commun. 1999, 5 (2), 67-71.
Park, H. J.; Weller, C.; Vergano, P.; Testin, R. Permeability and mechanical properties of cellulose-based edible films. J. Food Sci. 1993, 58 (6), 1361-1364.
Rimdusit, S.; Jingjid, S.; Damrongsakkul, S.; Tiptipakorn, S.; Takeichi, T. Biodegradability and property characterizations of methyl cellulose: effect of nanocompositing and chemical crosslinking. Carbohydr. Polym. 2008, 72 (3), 444-455.
Benatar, A.; Rittel, D.; Yarin, A. Theoretical and experimental analysis of longitudinal wave propagation in cylindrical viscoelasticrods. J. Mech. Phys. Solids 2003, 51 (8), 1413-1431.
Richler, D.; Rittel, D. On the Testing of the Dynamic Mechanical Properties of Soft Gelatins. Exp. Mech. 2014, 54 (5), 805-815.
E Heymann: "Studies on Sol-Gel Transformations. I. The Inverse Sol-Gel Transformation of Methylcellulose in Water", Transactions of the Faraday Society, Mar. 27, 1935, pp. 615-632.
Marie Plazanet et al: "Inverse freezing in molecular binary mixtures of a-cyclodextrin and 4-methylpyridine", Physical Chemistry Chemical Physics, vol. 12, No. 26, Jan. 1, 2010, pp. 7026-7031.

* cited by examiner

FIG. 33B  Max. force amplitude 20,000 N

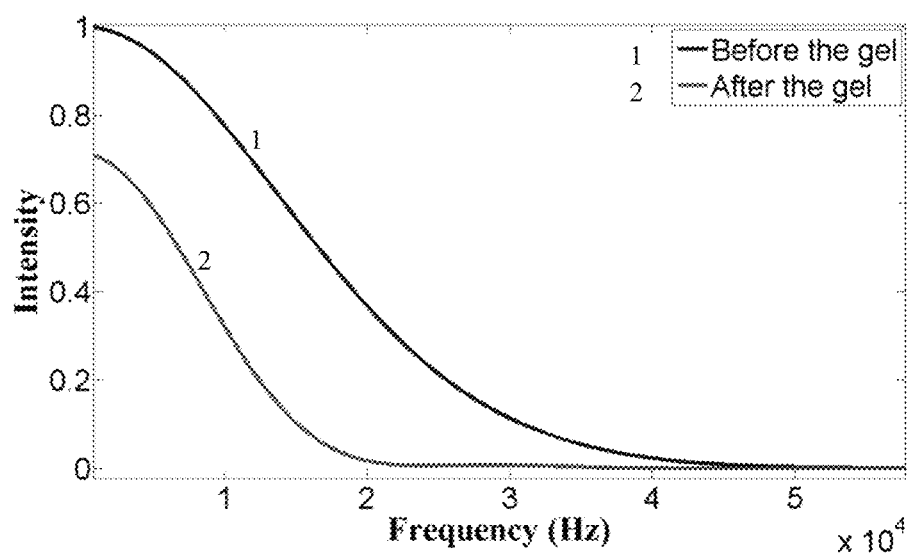
FIG. 38B
FIG. 39
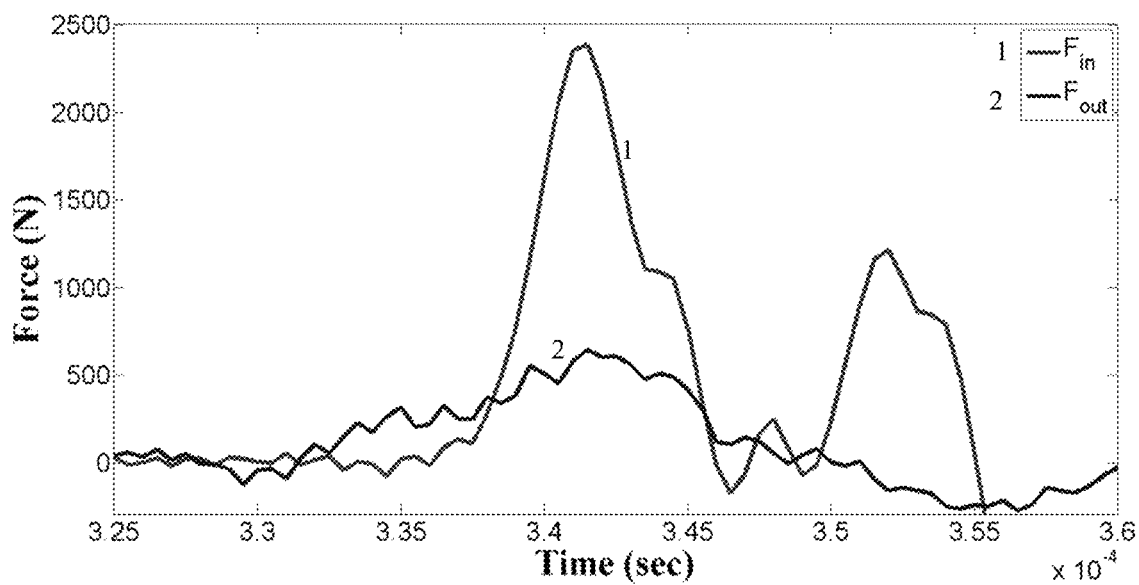

INVERSE-FREEZING COMPOSITIONS AND USE THEREOF

CROSS-REFERENCE TO RELATED APPLICATIONS

This application is a National Phase of PCT Patent Application No. PCT/IL2018/050606 having International filing date of Jun. 4, 2018, which claims the benefit of priority from Israel Patent Applications Nos. 252660 filed on Jun. 4, 2017 and 257226 filed on Jan. 29, 2018, both entitled: "INVERSE-FREEZING COMPOSITIONS AND USE THEREOF". The content of the above documents is incorporated by reference in its entirety as if fully set forth herein.

FIELD OF THE INVENTION

The present invention, in some embodiments thereof, relates to inverse-freezing materials, compositions comprising same, and use thereof.

BACKGROUND OF THE INVENTION

An inverse-freezing material is a material that increases its viscosity with applied heat and/or rise in temperature (upon a certain temperature range), without apparent loss of solvent. The increase in viscosity can be of a few percent, or of tens or hundreds of percent. Inverse-freezing materials can be found in literature also under the names "inverse-melting", "thermo-gelating", "thermo-solidifying" and others. A field in which inverse-freezing materials have found prolific uses is biology and medicine, and examples for applications include injectable and controlled drug delivery systems, ophthalmic solutions and applicators, and in situ generated implants or plugs.

Although heat reduces the armor's ability to protect the wearer/armored object, since all materials currently used for armors soften upon heating, and furthermore this heat might in itself damage the wearer/armored object, current-day armor has no components which specifically address this threat.

Furthermore, the attenuation of vibrational, mechanical, ballistic or blast-caused shocks remains a major challenge.

SUMMARY OF THE INVENTION

The present invention, in some embodiments thereof, relates to compositions comprising inverse-freezing materials, articles comprising same and use thereof for impact protection or shock-wave mitigation. In some embodiments, the compositions further comprise performance-enhancing additives.

According to one aspect, there is provided a composite comprising an inverse freezing material, and an additive, e.g., in the form of a solid particle. In some embodiments, the additive is present at a concentration in the range of from 0.02% to 55%, by total weight.

According to one aspect, there is provided a composition comprising a composite, the composite comprising (i) at least one inverse freezing material, and (ii) an additive in the form of at least one solid particle.

In some embodiments, the additive is present at a concentration of 0.5 to 65%, by weight.

In some embodiments, the composition comprises at least two inverse freezing materials.

In some embodiments, the inverse freezing material is present at a concentration of 40 to 99.9%, by weight.

In some embodiments, the composition further comprises a solvent, a matrix, or a combination thereof.

In some embodiments, the solvent comprises an aqueous solvent.

In some embodiments, the matrix comprises a fabric.

In some embodiments, the composite is characterized by undergoing one or more from: solidification, crystallization, phase separation, gelation, or increased viscosity, upon heating or upon introduction of shock into the composite.

In some embodiments, the composite is in the form of hydrogel.

In some embodiments, the inverse freezing material comprises a polymeric component selected from the group consisting of: cellulose derivatives, amphiphilic polymers, Polysuccinimide, N-alkyl substituted acryl amides, Poly-4-methylpentene-1 (P4MP1), Polyethyleneoxide-polypropyleneoxide-polyethyleneoxide (PEO-PPO-PEO), poly(2-ethyl-2-oxazoline, poly(ethylene oxide)-polylactic acid block copolymers, and any combination thereof.

In some embodiments, the inverse freezing material comprises a small molecule selected from the group consisting of: 4-cyano-4'-octyloxybiphenyl liquid crystal, 4-methylpyridine (4MP) with alpha cyclodextrin, nicotine, water mixtures, and any combination thereof.

In some embodiments, the cellulose derivative is selected from the group consisting of: hydroxypropylcellulose, methyl cellulose, and a combination thereof.

In some embodiments, the additive is selected from the group consisting of: rubber, polystyrene, polyethylene, polypropylene, a polyvinyl, graphite, polysaccharide, polyvinyl alcohol (PVA), alginic acid, poly(methyl methacrylate) (PMMA), polyvinyl pyrrolidone, polythiophene, polylactic acid, polysuccinimide, acrylic polymer, methacrylic acid polymers, polyamines, polyamides, peptides, polyesters, polyurethanes, a biomolecule or bio-sourced material, cornflour (starch), starch derivatives, polyamine crosslinkers, Flubber or a derivative thereof, and any combination thereof.

In some embodiments, the additive is in the form of one or more types of particles, the one or more types of particles being micrometer- or nanometer-sized.

In some embodiments, the additive comprises a material selected from the group consisting of: diamond, graphene, ceramics, metals, metalloids, and any composition thereof.

In some embodiments, the additive is selected from the group consisting of: boron carbide ($B_4C$), boron nitride, silicon carbide, tungsten carbide, aluminum, alumina, silicon, silica and inorganic silicates, alkali and earth-alkali hydroxides and oxides, and any combination or mixture thereof.

In some embodiments, the composition or the composite is characterized by an increase of flow stress of at least 10%, measured at a strain higher than 2%, at a strain rate of 1200 l/sec to 1800 l/sec and at a temperature above the gelation or solidification point, compared to a corresponding flow stress of a pristine inverse-freezing material devoid of the additive.

In some embodiments, the composition or the composite is a shear thickening composition or composite, respectively, characterized by an increase of viscosity of at least 20% within a shear rate range between 1 l/sec and 1,000,000 l/sec, compared to a corresponding viscosity of a pristine inverse-freezing material devoid of the additive.

In some embodiments, the composition or the composite is a shock attenuator, capable of reducing at least 10% of a maximal amplitude of a force passing through 1 cm thick layer of the composition.

In some embodiments, the composition or the composite is a shock attenuator, capable of reducing at least 5% of an impulse of a force passing through 1 cm thick layer of the composition or the composite.

In some embodiments, the composition or the composite is capable of reducing incoming shockwaves entering into the composition, at a value of at least 10% higher compared to water.

In some embodiments, the composition or the composite is capable of reducing at least 10% of the intensity of shockwaves passing thereto in the frequencies of 0 Hz to 50,000 Hz.

In some embodiments, the gelation or solidification point is 45 to 70° C.

In some embodiments, the flow stress varies by at least |±5%|, as compared to the flow stress of a pristine inverse-freezing material devoid of the PVA additive.

In some embodiments, the composition or the composite comprises a plurality of particles at a concentration of 40% to 65% weight, wherein the composite is characterized by at least 10% shear thickening at a shear rate of at least 1 l/sec to 1000 l/sec.

According to another aspect, there is provided an article comprising the composition or the composite disclosed herein in an embodiment thereof, wherein the article is selected from the group consisting of protective shields, armors or their components, flexible armors and flexible armor components, energy mitigators, personal protective gear against impacts and shocks, shock absorbers, acoustic insulators, acoustic attenuation devices, temperature-controlled phase-change components, actuators, and tissue mimicking components.

According to another aspect, there is provided an article comprising an inverse-freezing material, wherein the article is selected from the group consisting of protective shields, armors or their components, flexible armors and flexible armor components, energy mitigators, personal protective gear against impacts and shocks, shock absorbers, acoustic insulators, acoustic attenuation devices, temperature-controlled phase-change component, actuators, and tissue mimicking components.

In some embodiments, the inverse-freezing material comprises aqueous methyl cellulose.

In some embodiments, the article is characterized by an increase of flow stress of at least 10% at strains higher than 10%, upon increasing the temperature from the gelation point to 100° C.

In some embodiments, the methyl cellulose is in the form selected from liquid and solid, and is characterized by attenuation coefficient in the range of 0.4-0.55 Np/Cm at frequencies of 400 KHz to 1 MHz.

In some embodiments, the article comprises a first layer and an second layer, wherein: (i) the first layer and the second layer are held together, (ii) the second layer comprises a hard material and wherein (iii) the first layer comprises the inverse freezing material or the composite.

In some embodiments, the hard material comprises at least one material selected from: a metal, ceramic material, inorganic oxide, Kevlar, or ultra-high molecular weight polyethylene.

In some embodiments, the first layer is an interior layer having a thickness of 1 micrometer to 3 cm.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description together with the drawings makes apparent to those skilled in the art how embodiments of the invention may be practiced.

In the drawings:

(FIG. 23B); and Cryo-transmission electron microscopy (TEM) images of the nano-BC-MC composite gel, focusing on the nano-BC aggregates (hexagonal plates with a mean average diameter of 50 nm) Bar is 100 mm (FIG. 23C) or 200 nm (FIG. 23D). Examples of fibril/polymer interactions with the aggregate are emphasized using black arrows. Two upward pointing arrows in the lower picture show an example of free fibrils in the gel.

(FIG. 24A); the reduction of maximum force amplitudes of a 2 cm thick shear thickening fluid (FIG. 24B); the reduction of maximum force amplitudes of a 2 cm thick shear thickening inverse freezing liquid (FIG. 24C).

FIG. 25C presents a photograph showing dynamic compression modified Kolsky apparatus, with a focus on the controlled environment chamber, in which the gel specimen is positioned. Marked components: 1. Incident bar; 2. Disc-shaped gel sample; 3. Transmission bar; 4. Strain gauge (one of two sets, the other on the incident bar is not shown); 5. Force sensors leads, the sensors are positioned between the incident bar and the gel sample, and between the gel sample and the transmission bar.

FIGS. 33A-33B present force amplitude graphs measured for two different impactor driving pressures (specified at the upper left corner in each graph): maximum force amplitude of 10,000 N (FIG. 33A), and maximum force amplitude of 20,000 N (FIG. 33B).

FIG. 35A: Max. amplitude force reduction 2.9%; impulse attenuation ~3%; FIG. 35B: Max. amplitude force reduction 45%; Impulse attenuation ~40%.

FIGS. 38A-38B present graphs showing the impact force mitigation of water (FIG. 38A) and a 5% w/w aqueous methylcellulose solution (FIG. 38B), at room temperature, by frequency. A black upwards bar marks an approximate, theoretical "border" of frequency, at ~20 KHz, from which the inverse freezing material provides complete attenuation of the impact forces.

FIG. 39 presents graphs showing impact force mitigation of a 2 cm 10% w/w aqueous methylcellulose solution, at room temperature. A shift on the time-axis for the readings of the hind sensor (measuring the force passing through the investigated material) was performed so that both maxima have the same time value, for visual aid of the comparison of force profiles. Maximum amplitude force reduction: ~80%; impulse attenuation: ~70%.

(FIG. 41B).

Hereinabove, "A7C" refers to an A7C methyl cellulose based hydrogel having 5.3% weight in water.

DETAILED DESCRIPTION OF THE INVENTION

The present invention, in some embodiments thereof, relates to compositions and composites comprising inverse-freezing materials, and use thereof, for example, for impact protection or shock-wave mitigation.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The present invention is based, in part, on the inventors' findings of some inverse-freezing materials having one or more from: a. increased stress flow (and therefore hardening) at quasi-static loading/compression with heating past the gelation point (see, e.g., FIGS. 8 and 9); b. increased stress flow (and therefore hardening) at dynamic loading/compressions and impacts compared to quasi-static compressions (see, e.g., FIGS. 15 and 16); c. temperature-dependent acoustic (ultrasonic wave) velocity and attenuation, the latter of which is considerably larger than comparative materials such as steel and water (see, e.g., FIGS. 27, 28, 29); and d. in their ambient temperature (non-heated) liquid form materials; may absorb the energy of a dynamic impact, in a partially confined setting, hundreds of percentages better than water (at the same conditions).

When taking into account that the disclosed materials may undergo inverse-freezing by an endothermic transition, the inventors have contemplated that such materials could be useful, in some embodiments, for attenuating and dispersing the energy of dynamic mechanical impacts, shockwaves, and acoustic energy—either as directly evolving from the impacts and shockwaves or from an external source (radiated or convected heat). In a particular non-limiting example, such materials may augment armors: impacts on armor surfaces (for example, by ballistic projectiles, shrapnel, manual stabbing) may create heat that is diverted by the gelation process.

Figure 30:
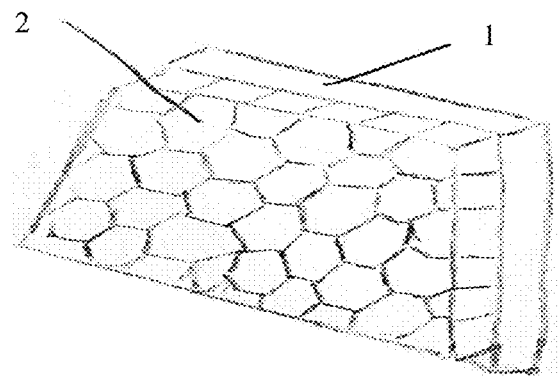
FIG. 30 illustrates an example for one embodiment of an article of the invention, in which the composite (or non-composite inverse-freezing material) is a component of armor. 1: a steel or other-material rigid plate, or Kevlar®. 2: A honeycomb-type layer of confined composite (or non-composite) forming a second protective layer (against heat, shockwaves, etc.).
Figure 31:
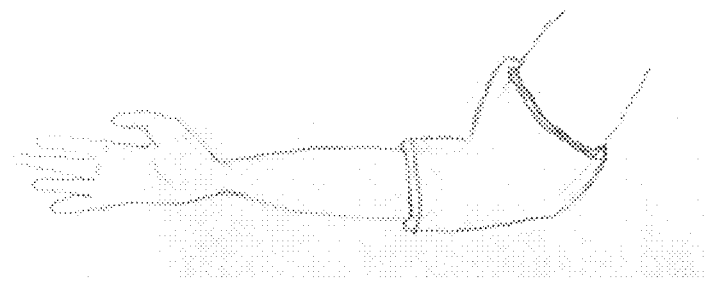
FIG. 31 illustrates an example for one embodiment of an article of the invention, in which the composite (or non-composite inverse-freezing material) is a component of armor. A sealed "sleeve", flexible (and possibly transparent—depending on the composition's components) is set around a wearer's joint—in this case elbow, offering protection against heat, impact, etc.

It would be advantageous to use inverse-freezing materials, in light of the disclosure provided herein (and specified in this section) as armors or components in armor (a non-limiting example for two such embodiment is presented for demonstration in FIGS. 30, 31).

The shockwaves (due to dynamic impacts) are hardly attenuated by modern-day rigid armors (such as steel plating or other hard materials) and therefore the herein disclosed materials, thanks to their large attenuations at relatively low frequencies which are still highly potent at damage to soft tissues such as the human brain, may be employed as protective elements for these and other shock-sensitive systems. Furthermore, since the disclosed materials, at least in some embodiments, are in their liquid state at the ambient temperatures in which the armor is expected to be employed (for one example, up to 65° C.), armors relying on these materials could offer increased flexibility and shape-conformity (for example, FIG. 31) as compared to, for example, ceramic insert plates or even Kevlar®.

The present invention is further based, in part, on the finding that the performance of the inverse-freezing materials may be enhanced by combining various types of additives with the inverse-freezing materials. These findings include, for some examples, that these additives may confer to the new composite incorporating them one or more from: a. tunable stress flow in the quasi-static loading or compression, for the same additive but in different concentrations and depending on the inverse-freezing material type: increased stress-flow (and therefore hardening) (e.g., FIG. 17) or decreased stress-flow (and therefore softening) (e.g., FIG. 18); b. tunable stress flow in the quasi-static loading/compression, for different additive types (e.g., FIG. 16, 19); c. tunable stress flow in the quasi-static loading/compression, for the non-limiting example in which the additives are rigid particles, depending on different particle sizes and concentrations (e.g., FIGS. 20 and 21), and/or d. tunable stress flow in the dynamic loading or compression (and where required, for some non-limiting examples, extreme increase in the stress flow and therefore hardening) depending on the additive type and concentration and in the dynamic loading or compression and tunable sensitivity to impact or stress waves, and as a response to it the extent of responsive phase-transition.

Since the inventors have shown that the composite's stress-flow may be tuned depending on a number of factors related to the additives (among these factors are, but not only, the inverse-freezing material type, the additive's nature (for example: polymer or rigid particle), the additive's material type (for example, metal oxide or boron carbide), the additive's size and geometry (for example, 0.7 micrometer or 55 nanometer average diameters), and the additive's concentration within the composite, the present invention provides novel composites which, in some embodiments, are useful in a variety of applications, for example higher-performance armor with enhanced response to impact (for the higher stress flow composites, whose response-strain values are significantly lower than the non-composite materials, and whose stresses at these values may provide better protection against the impacting object), or for example for tissue-mimicking media, where it is desirable to adjust the stress flow traits to approximate them as closely as possible to the desired tissue (this may include, for non-limiting example, an additive that lowers the stress flow). Thus, the present disclosure further provides composites of inverse-freezing materials and additives, the composites having enhanced performance for specific application (e.g., impact protection would be benefitted by an increased stress flow composite).

Furthermore, the inventors have shown that in some embodiments inverse freezing materials may solidify in response to shock. Thus, shock-induced solidification may be used as a mechanism to absorb, divest, or mitigate energies (which might otherwise be harmful to a target).

Inverse-Freezing Materials

As used herein, the term "inverse-freezing material" (interchangeably "thermo-sensitive", "thermo-responsive", "thermo-gelating", "thermo-solidifying" and/or including the prefix "reverse" to any of these materials), refers to a substance that is characterized by undergoing full or partial: solidification, crystallization, gelation, phase-separation or increase their viscosity, in some embodiments, without any apparent loss of solvent, upon heating and/or increasing temperature, or, as disclosed herein upon introduction of shock wave into the material. In some embodiments, the inverse-freezing material undergoes at least partial solidification, gelation or crystallization upon heating, or, as disclosed herein upon introduction of shock wave into the material.

In some embodiments, the shock may be introduced by providing one or more from, without limitation, vibrations, mechanical loading, manual-, ballistic-(bullet), or explosion-derived impact (shrapnel), airborne shockwaves (such as due to blast), water-, ground- or structure-conveyed shockwaves, impact due to collisions or falls, acoustic phenomena, or any combination thereof.

In some embodiments, the compositions or composite of the invention may be in the form of one or more phases. In some embodiments, the composition or composite is in the form of liquid. In some embodiments, the composition or composite is in the form of gel. In some embodiments, the composition or composite is in the form of hydrogel. In some embodiments, the composition or composite is in the form of semi-solid.

As will be appreciated by one skilled in the art, the high-temperature state (referred to as the "solid" or "gel" state henceforth) is thus physically different from the low-temperature state (referred to as the "liquid" state henceforth), in more than just its temperature. The transition between the two states does not necessarily have to be of a first-order type (and the transition may have a continuous character).

In some embodiments, the material is in the form of gel or a hydrogel (at a certain range of temperatures). In some embodiments, the term "gel" describes a semi-solid formed from a solution, e.g., due to heating. Thus, a gel comprises a continuous liquid phase and a dispersed phase (e.g., a liquid or solid phase). In some embodiments, the term "gel" refers to hydrogel.

In some embodiments, the term "hydrogel" refers to a heterogeneous or micro-heterogeneous composition of water and other molecules, displaying some of the properties of a solid, including the tendency to retain their structure better than their liquid component alone (in this case liquid water).

In some embodiments, the gel may be composed of aggregates of molecules (either small, polymeric, organic, inorganic, or other molecule) that interact with each other either directly or by mediation via other species such as the solute molecules, such as, without limitation, ballistic gelatin.

In some embodiments, the gel may be composed of molecular structures that interact with each other within the solute (and around it), such as, without being limited thereto, methyl cellulose hydrogel s.

The gel may be composed of crystalline or semi-crystalline materials and water, such as, without being limited thereto, the system of 4-methylpyridine in alphacyclodextrin and water.

In some embodiments, the inverse-freezing material is a polymer or copolymer, with or without the further presence of solute molecules. In some embodiments, the inverse-freezing material comprises a small molecule, with or without the further presence of solute molecules (such as, and without limitation, 4-cyano-4'-octyloxybiphenyl liquid crystal). In some embodiments, the inverse-freezing material is a combination of a polymer and small molecule.

In some embodiments, the term "polymer", as used hereinthroughout, describes a substance, e.g., an organic substance, or an inorganic substance, composed of a plurality of repeating structural units (referred to interchangeably as backbone units or monomeric units), e.g., being covalently connected to one another and forming the polymeric backbone of the polymer. The term "polymer" as used herein encompasses organic and inorganic polymers and further encompasses one or more of a homopolymer, a copolymer or a mixture thereof (e.g., a blend). The term "homopolymer" as used herein describes a polymer that is made up of one type of monomeric units and hence is composed of homogenic back bone units. The term "copolymer" as used herein describes a polymer that is made up of more than one type of monomeric units and hence is composed of heterogenic backbone units. The heterogenic backbone units can differ from one another by the pendant groups thereof.

Non-limiting examples of inverse-freezing materials include cellulose derivatives, amphiphilic polymers, Poly-succinimide polymers whose succinimide rings have all or some been opened and linked to various alkyl or further functionalized groups, such as but not limited to N-isopropyl, N-hexyl, N-hydroxypropyl, N-hydroxyethyl, N-hydroxyhexyl, N-alkyl substituted acrylamides (e.g., poly-N-isopropyl acrylamide [PNIPAAm], Poly-4-methylpentene-1 (P4MP1), Polyethyleneoxide-polypropyleneoxide-polyethyleneoxide (PEO-PPO-PEO), poly(ethylene oxide)-polylactic acid block copolymers, triblocks, random or alternating thermo-responsive PEO-PPO block copolymers, poly(X-alkyl-Y-oxazoline) with X and Y being integers, or any combinations thereof.

In some embodiments, the inverse-freezing material is one or more cellulose derivatives. In some embodiments, the cellulose derivative is selected from hydroxypropylcellulose, methyl cellulose, or any combination thereof.

In some embodiments, the inverse-freezing material is a small molecule. Non-limiting examples of small molecule include: 4-cyano-4'-octyloxybiphenyl liquid crystal, 4-methylpyridine (4MP) with alpha cyclodextrin, nicotine, and any mixture thereof.

In some embodiments, the inverse-freezing material has reverse-thermal gelation (RTG) properties. In some embodiments, the water or organic solutions of these materials display low viscosities at low temperatures (below, at or above ambient temperature), and exhibit a sharp increase of the viscosity as the temperature rises within a very narrow temperature interval (known as the "gelation temperature"), producing a semi-solid gel above this interval.

In some embodiments, the inverse-freezing material is tailored to display substantial property changes, in response to stimuli. The "stimulus" may be mechanical stress, shockwave, chemical, physical or biological stimuli, e.g., temperature (including external heat radiation and internal heat formation), pH, ionic strength, biochemical agents, or application of magnetic or electrical fields. In some embodiments, the stimulus is applied continuously; for example, the composite is maintained at a certain temperature. In further embodiments, the stimulus is transient or is applied over a period of time sufficient to transform all or a portion of the material or composite into the desired physical state.

In some embodiments, the stimulus is a mechanical stress (e.g., static, quasi-static or dynamic). In some embodiments, the stimulus is a shock wave. In some embodiments, the stimulus is temperature. In some embodiments, the stimulus is heat generated due to another stimulus (such as the heat generated due to mechanical impact). In some embodiments, the stimulus may rise in pressure generated due to another stimulus (such as the increased pressure generated due to mechanical impact).

Performance-Enhancing Additives

In some embodiments, the invention provides compositions and composites comprising inverse-freezing materials and additives. In some embodiments, the additives enhance the performance of the compositions and composites with regard to the various applications detailed herein (e.g., impact protection or shock-wave mitigation).

As exemplified herein, a variety of additives, ranging from organic polymers to inorganic and metallic particles, with varying geometry and sizes, have been shown to maintain the material's inverse-freezing trait as well as to affect the material's stress-flow curve and stimuli response.

In some embodiments, the composite comprises one or more additives. Typically, an additive is a component in a minor amount (e.g., less than 60%, less than 20%, less than 10%, or less than 5%, by total weight, and any value in between) added to the composite which modifies the properties of the composite, for example to further increase the composite's flow stress or to provide a feature of shear thickening to the composite. The additive, in some embodiments, may increase the stress flow of a heated gel. In additional embodiments, the additive enables the fine-tuning of the stress flow to suit the requirements of certain specific applications. As a non-limiting example, additives may be used for tailoring the stress flow to behave similar to that of a desired tissue.

In some embodiments, the additive decreases the response time of the inverse-freezing material to undergo phase change due a stimulus.

In some embodiments, the additive facilitates the phase change of the inverse-freezing material, for example, and without being bound by any particular mechanism, by enabling inhomogeneous "local points", such as but not limited to, nucleation sites and crystallization seeding centers, within the bulk solution of the composite.

In some embodiments, the additive is a polymeric material or composition. In some embodiment, the additive is a plurality of particles. Non-limiting examples of additives include particles of varying geometries, sizes and materials, such as, polyvinyl alcohol (PVA), alginic acid, Poly(methyl methacrylate) (PMMA), polyvinyl pyrrolidone, starch (e.g., corn flour), starch derivatives, polyamine crosslinkers, Flubber and its derivatives (e.g., PVA cross-lined with borax), or any combination thereof.

Further non-limiting examples of additives include a material comprising diamond, grapheme or graphite, polysaccharides (including e.g., cellulose, starch, cotton), rubber (including latex), polystyrene, polyethylene, polypropylene, polyvinyls (including halogenated such as polyvinylchlorides, and functionalized with acidic or basic groups such as carboxylic, sulfonic, acetates and pyrrolidones), polythiophenes, polylactic acids, polysuccinimides, acrylic and methacrylic acid polymers, polyamines and polyamides, peptides, polyesters, and polyurethanes, or any combination thereof.

In some embodiments, the additive comprises polymers (e.g., PVA) having an average molecular weights that varies by at least 1%, at least 5%, least 10%, at least 15%, least 20%, or at least 25%.

In some embodiments, the additive is selected from: ceramics, metals (e.g., aluminum, silica), metalloids, alumina, or a composition or a mixture thereof.

In some embodiments, the additives are nano-metered sized (for example, nano-meter diameter) particles selected from metals, metalloids, and ceramics. As used herein and in the art the term "metalloid" refers to a chemical element having both metals and nonmetals properties. In some embodiments, the metalloid is selected from, but not limited to: boron, silicon, germanium, arsenic, antimony, and tellurium.

In exemplary embodiments, the additive is boron carbide ($B_4C$).

In some embodiments, the additive particle may have geometry or a form selected from, but is not limited to: colloidal, spherical, cubic, plate, rod, wire, toroidal, or ring, fibrillar, dendritic (fractal), brush, or amorphous.

Figure 22:
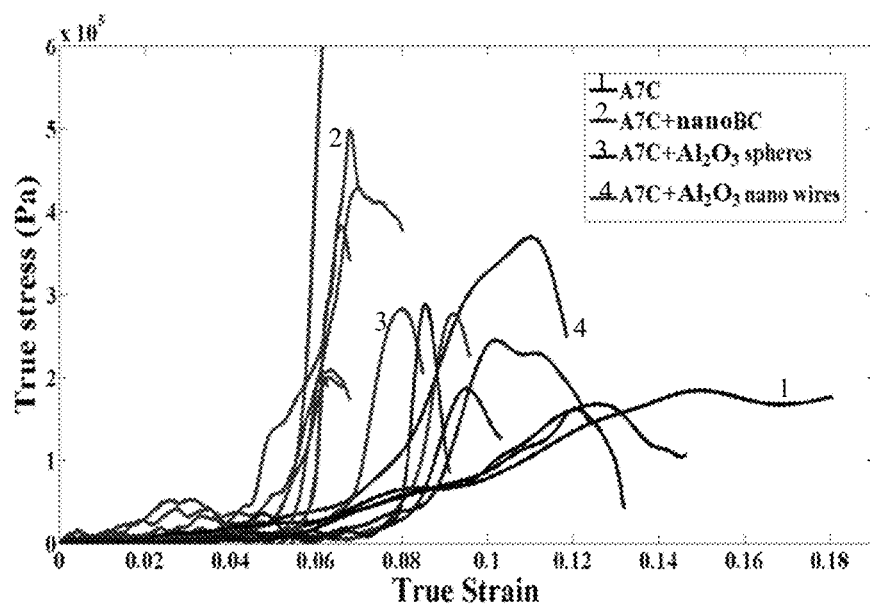
FIG. 22 illustrates the dynamic flow curves of A7C with and without different types of particles at 70° C., and compared to the non-composite A7C gel at quasi-static loading regime.

Reference is made to FIG. 23 showing that a composite comprising nanoparticles of boron carbide and A7C methyl cellulose displays, under dynamic loading or compression, an increase of its flow-stress by 2400% at a strain of 1% up to an increase of 44700% at a strain of 6%, in comparison to the non-composite A7C submitted to the same dynamic compression. Some embodiments of composites in which the additives were alumina spheres and alumina wires also showed increased stress flow, compared to the non-composite A7C methyl cellulose hydrogel, under dynamic loading/compression (FIG. 22).

In exemplary embodiments, the additive is micrometer-sized (e.g., having an average diameter of about 0.7 micrometers). In additional exemplary embodiments, the additive is nano-sized (e.g., in the form of nanoparticle(s), with an average diameter of about 55 nm).

Hereinthroughout, the term "nanoparticle" describes a particle featuring a size of at least one dimension thereof (e.g., diameter, length, thickness) that ranges from about 1 nanometer to 1000 nanometers.

In some embodiments, the size of the particle described herein represents an average size of a plurality of nanoparticles. In some embodiments, the average size (e.g., diameter, length) ranges from about 1 nanometer to 500 nanometers. In some embodiments, the average size ranges from about 1 nanometer to about 300 nanometers. In some embodiments, the average size ranges from about 1 nanometer to about 200 nanometers. In some embodiments, the average size ranges from about 1 nanometer to about 100 nanometers. In some embodiments, the average size ranges from about 1 nanometer to about 55 nanometers. In some embodiments, the average size ranges from about 1 nanometer to 50 nanometers. In some embodiments, the average size ranges from about 20 nanometer to about 500 nanometers. In some embodiments, the average size ranges from about 20 nanometer to about 200 nanometers, and in some embodiments, it is lower than 500 nm.

The particle can be generally shaped as a sphere, a rod, a wire, a plate, a rhombohedral, a cylinder, a ribbon, a sponge, and any other shape, or can be in a form of a cluster of any of these shapes, or can comprises a mixture of one or more shapes.

In some embodiments, the plurality of particles is at a concentration of at least 0.01, at least 0.05, at least 0.1, at least 0.2, at least 0.3, at least 0.4, at least 0.5, at least 1, at least 2, at least 5, at least 10, at least 15, at least 30, at least 50, at least 100, at least 500, at least 600 milligrams per ml of the material or any value therebetween. In some embodiments, the plurality of additive is at a concentration of at most 1, at most 3, at most 5, at most 8, at most 9, at most 10, at most 11, at most 12, at most 13, at most 15, at most 30, at most 50, at most 100, at most 200, at most 500, or at most 600 milligrams per ml of the material or any value therebetween.

The additive may comprise a plurality of particles conferring to the composite further features of shear thickening, so that it behaves under mechanical stimuli (such as dynamic loading, compression, impact, and/or shock) and other stimuli (such as shockwaves) as a shear thickening fluid. Shear Thickening Fluids (STFs) are Non-Newtonian Fluids that change their viscosity with changing shear rates. In some shear rate ranges (usually defined as being above the critical shear rate), the viscosity increases with increasing shear rates. Thus, these fluids can respond to mechanical impacts (ranging from falling objects and hand punches to stabbing and ballistic projectiles). There are a variety of materials that show shear thickening properties, including but not limited to "oobleck" (a solution of starch in water with a large weight percentages, around 50-60%, of the starch). The starch provides the shear-thickening enabling particles, but these can be also synthetic particles, such as silica nanoparticles, and the solution can be non-aqueous, such as ethylene glycol.

Figure 24A:
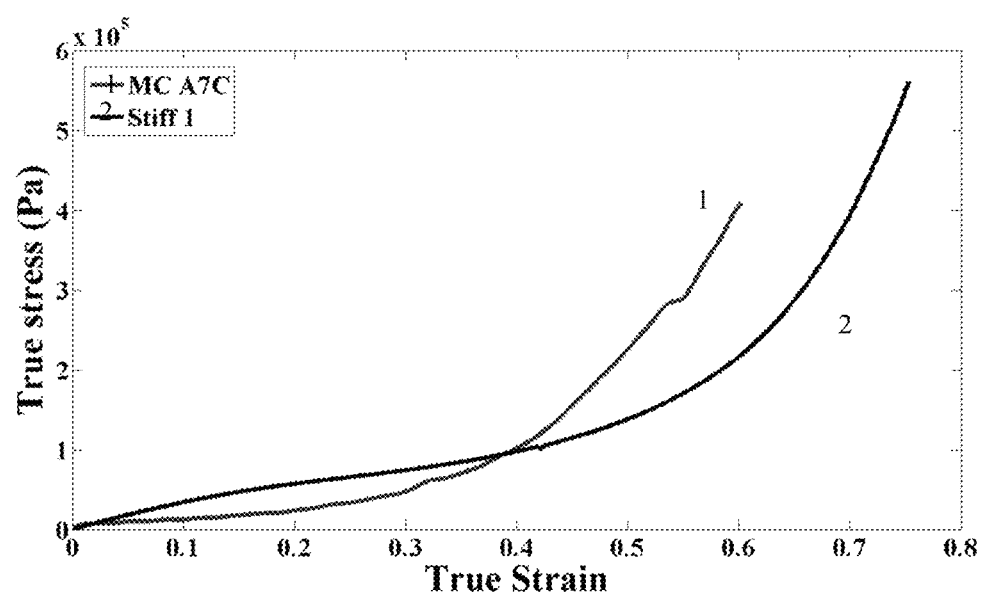
FIGS. 24A-24C present graphs illustrating: the quasi-static stress flow curves for non-composite A7C gel and a composite comprising the A7C with 53% of corn-flour in water (abbreviated as STIFF) at 80° C.
Figure 24B:
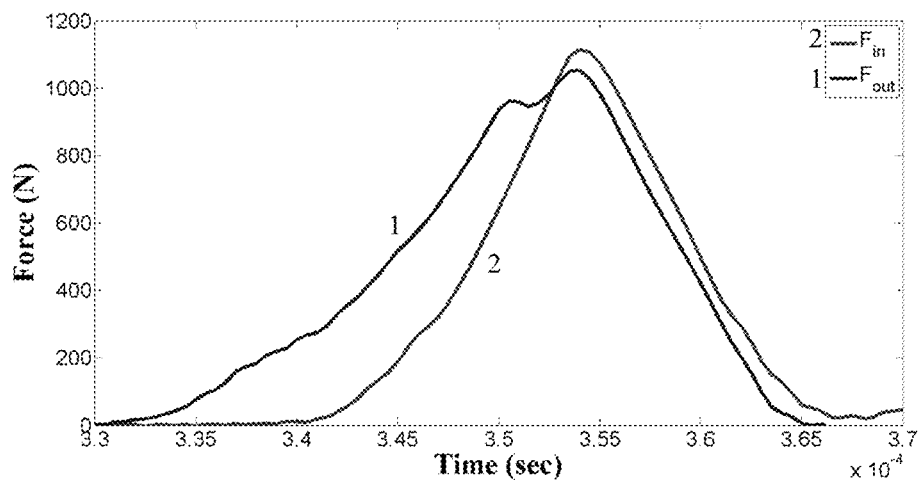
Figure 24C:
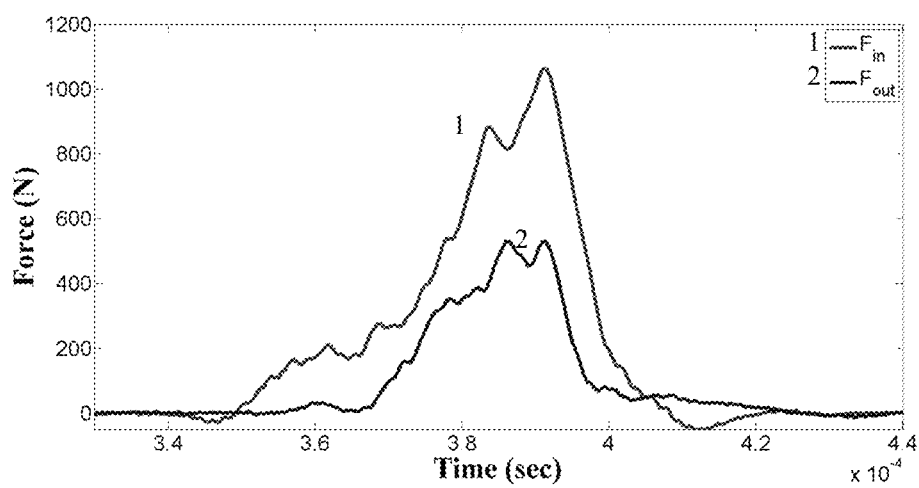

As exemplified herein below, addition of a thermally-responsive component, which both endothermically converts to the "solid" state (thus, e.g., taking up some of the energy of the impact) and hardens due to this heat (thus, e.g., enabling better spread of the energy across the armor and lessening the impact's harm toward the wearer or armor-protected object). A non-limiting exemplary embodiment combing both components, of STF and of inverse-freezing (referred to hereon as STIFF—shear thickening inverse freezing fluid) is composed of 53% weight corn-flour additive, 5.3% weight A7C-type methyl cellulose, in an aqueous solution. This exemplary embodiment may be prepared and measured for both the behavior of an inverse-freezing material, which it does indeed show by stiffening upon heating, and for its mechanical behavior as measured by quasi-static loading/compression. As demonstrated herein, the exemplified STIFF showed a stress flow curve similar to that of the non-composite A7C methyl cellulose hydrogel (FIGS. 24A-C). However, STIFF-type materials show reduction of shockwaves forces that is much greater than those of STF alone. This embodiment demonstrates harnessing both the thermal-responsive capability of inverse freezing fluids which has been shown to mitigate shockwave forces and the kinetic impact-induced hardening.

The Composites

According to another aspect, there is provided a composite comprising an inverse-freezing material and an additive at a concentration in the range of from 0.02 to 80% (e.g., 0.02%, 0.05%, 1%, 5%, 10%, 15%, 20%, 25%, 30%, 35%, 40%, 45%, 50%, 55%, 60%, 70%, or 80% by total weight, including any value and range therebetween).

In some embodiments, the additive comprises a solid material. In some embodiments, the additive comprises one or more solid particles.

In some embodiments, the inverse freezing material is present at a concentration of 40 to 99.9%, 50 to 99.9%, 60 to 99.9%, or 40 to 95%, by weight of the composite.

In some embodiments, the additive is incorporated within the inverse-freezing material. In some embodiments, the additive is dispersed within the inverse-freezing material.

According to another aspect, there is provided a composition comprising the composite in an embodiment thereof. In some embodiments, the composition further comprises a solvent, a matrix, or a combination thereof. In some embodiments, the solvent comprises an aqueous solvent. In some embodiments, the matrix comprises a fabric. In some embodiments, solvent may contain inorganic cations or anions, organic solvent (such as but no limited to alcohol, ketone, aldehyde, ester, amide, ether) and/or an aqueous solution. In some embodiments, the matrix comprises a fabric or a flexible or non-flexible scaffold, a gel (e.g., a hydrogel) or any combination thereof.

The term "composite" is used herein to denote a composition made of at least two substances (e.g., materials and additives). In some embodiments, the two or more substances have different characteristics, wherein each substance, retains, at least partially, its identity while contributing desirable properties to the whole.

In some embodiments, the composite is characterized by a first physical state at a temperature below gelation temperature (e.g., 45° C., 55° C., 65° C. or 75° C., including any value and range therebetween).

Herein, by "first physical state" it is meant to refer to the liquid state. The term "second physical state" generally refers to the solid state (as defined above, for inverse-freezing materials). In some embodiments, this solid state has a flow stress of at least 10 KPa at strains of 20% in quasi-static loading/compression.

In some embodiments, the flow stress of the second physical state is characterized by at least 10, at least 15, at least 20, at least 25, at least 30, at least 35 or at least 40 KPa, including any value therebetween, and at a strain of at least 20%.

In some embodiments, the composite may convert to the second physical state (e.g., solid state) at the solidification temperature, known as gelation temperature in the cases where the second physical state is a gel, or due to other stimuli, such as mechanical impact or introduction of shockwaves into the material. The gelation temperature, and/or the sensitivity to impact or shockwave stimuli may be tunable for some inverse-freezing materials and their composites. In some embodiments, this tuning depends on a number of factors, among which for non-limiting example are: the component's concentrations, the presence of additives, the heating rate, and the extent of the interface of the inverse-freezing material with the shock-conveying element.

In some embodiments, the composite is characterized by gelation temperature, 45° C., 50° C., 55° C., or 65° C., and anywhere in the range between these values.

In some embodiments, the composite is characterized by undergoing solidification, crystallization, phase separation or gelation, partially or fully, and/or increased viscosity without apparent loss of solvent, upon increase in temperature and/or heating.

In some embodiments, the additive (e.g., $B_4C$ nanoparticles) increases the flow stress by at least 1000% at a strain of 1% when tested by dynamic loading (e.g., shock, high rate compression, etc.) at a temperature above 65° C. and a strain rates of 1200-1700 l/sec (e.g., 1500 l/sec). In some embodiments, the additive increases the flow stress by at least 2000% at a strain of 1% when tested by dynamic loading (e.g., shock) at a temperature above 65° C. and strain rates of 1200-1700 l/sec (e.g., 1500 l/sec). In some embodiments, the additive increases the flow stress by at least 10,000% at a strain of 1% when tested by dynamic loading (e.g., shock) at a temperature above 65° C. and a strain rates of 1200-1700 l/sec (e.g., 1500 l/sec). In some embodiments, the additive increases the flow stress by at least 30,000% at a strain of 1% when tested by dynamic loading (e.g., shock) at a temperature above 65° C. and strain rates of 1200-1700 l/sec (e.g., 1500 l/sec). In exemplary embodiments, the $B_4C$ nanoparticles increase the flow stress of the methyl cellulose composite by 1000% at a strain of 2% up to an increase of 32000% at a strain of 6% when tested by dynamic loading (e.g., fast impact at 70° C. and a strain rate of 1500 l/sec).

In some embodiments, the liquid and solid methyl cellulose are characterized by attenuation coefficient of at least 0.01 Np/Cm at frequencies of 400 KHz to 1 MHz. In some embodiments, the liquid and solid methyl cellulose are characterized by attenuation coefficient of at least 0.2 Np/Cm at frequencies of 400 KHz to 1 MHz. In some embodiments, the liquid and solid methyl cellulose are characterized by attenuation coefficient of at least 0.4 Np/Cm at frequencies of 400 KHz to 1 MHz. In exemplary embodiments, the liquid and solid methyl cellulose are characterized by attenuation coefficient in the range of 0.4-0.55 Np/Cm at frequencies of 400 KHz to 1 MHz.

In some embodiments, the article comprises inverse-freezing materials with an adjusted composition for acoustic insulation of ears, or sensitive acoustic instruments.

As exemplified in the Examples section below, the inverse-freezing materials (e.g., methyl cellulose solution) have been shown to provide significant (e.g., at least 90%, or even complete) attenuation of shockwaves at various frequencies.

In some embodiments, the inverse-freezing material, the composite or the composition (e.g., methyl cellulose and its composites) shows a significant ability to reduce shockwave forces, as measured by the maximal amplitude of force, passing therethrough. When compared to water tested under the same conditions (identical apparatus, temperature, and thickness) these inverse-freezing materials show, in some embodiments, improved reduction of the shockwaves, mitigating at least 1.5 times more energy per cm thickness than water. In some embodiments, the inverse-freezing material, the composite or the composition (e.g., methyl cellulose hydrogel) is characterized by mitigation of at least 20 times more energy per cm thickness than water tested under the same conditions (identical apparatus, temperature, and thickness). This was exemplified by water attenuating 3% of the maximal amplitude of shockwave forces with the inverse-freezing solution attenuating more than 70% of the maximal amplitude of shockwave forces.

In some embodiments, the composition or the composite is capable of attenuating shockwaves, by reduction of: at least 5%, at least 10%, or at least 15%, of the maximal amplitude of forces passing through 1 cm thick layer of the composition.

In some embodiments, the composition or the composite is capable of attenuating shockwaves, by reduction of: at least 5%, at least 10%, or at least 15%, of the impulse of force of forces passing through 1 cm thick layer of the composition or composite.

In some embodiments, the composition or the composite is capable of attenuating incoming shockwaves entering into the composition, by a reduction of at least 5%, at least 10%, or at least 15% higher, compared to a reference material. In some embodiments the reference material is water or a material with the same acoustic impedance. In some embodiments, the composition or the composite is capable of reducing incoming shockwaves entering into the composition, by at least 5%, or at least 10% higher reduction compared to water.

In some embodiments, the composite or the composition is characterized by its ability to attenuate shockwaves, so that within the range of frequencies of 0 Hz to 50,000 Hz a reduction of at least 5%, at least 10%, or at least 15% of the intensity of the waves occurs.

The shockwaves nay then be further attenuated due to passage within the composite or the composition, as detailed herein.

In some embodiments, the flow stress of the inverse-freezing material (e.g., methyl cellulose hydrogel) is increased by at least 100% at a temperature above 65° C., as compared to the flow stress of the inverse freezing material not comprising the additive. In exemplary embodiments, the flow stress of methyl cellulose is increased by at least 300% at a temperature above 65° C. as compared to the flow stress of the inverse freezing material not comprising the additive. In exemplary embodiments, the flow stress of methyl cellulose is increased by at least 500% at a temperature above 65° C. as compared to the flow stress of the inverse freezing material not comprising the additive.

In some embodiments, the ultrasonic wave velocity of the inverse-freezing material (e.g., methyl cellulose) is increased by at least 100 m/sec when the temperature rises from 14° C. to 80° C. In some embodiments, the ultrasonic wave velocity of the inverse-freezing is increased by at least 100 m/sec when the temperature rises from 14° C. to 80° C.

In these embodiments, an element is achieved in which temperature changes enable to tailor the element's acoustic performance.

In some embodiments, the flow stress of the inverse-freezing material (e.g., methyl cellulose hydrogel) is increased by at least 5% at strains higher than 10%, when the temperature increases from e.g., 65° C. to 100° C. In some embodiments, the flow stress of the inverse-freezing material is increased by at least 10% at strains higher than 10%, when the temperature increases from e.g., 65° C. to 100° C. In some embodiments, the flow stress of the inverse-freezing material is increased by at least 50% at strains higher than 10%, when the temperature increases from e.g., 65° C. to 100° C. In exemplary embodiments, the methyl cellulose is characterized by an increase of flow stress by at least 100% at strains higher than 10%, when the temperature increases from e.g., 65° C. to 100° C.

In some embodiments, the flow stress of methyl cellulose hydrogel is increased by at least 200% at a temperature ranging from 65° C. to 100° C., compared to lower temperature.

In some embodiments, the flow stress of the inverse-freezing material (e.g., methyl cellulose hydrogel) is increased by at least 2 folds at a temperature above 65° C. and at a strain rate above $10^3$ l/sec compared to lower compression rates. In some embodiments, the flow stress of the inverse-freezing material is increased by at least 5 folds at a temperature above 65° C. and at a strain rate above $10^3$ l/sec compared to lower compression rates. In exemplary embodiments, the flow stress of the methyl cellulose is increased by at least 10 folds at a temperature above 65° C. and at a strain rate above $10^3$ l/sec compared to quasi-static compression rates.

In some embodiments, the flow stress of the inverse-freezing material (e.g., methyl cellulose) is increased by at least 100% at a strain of 4.5%, when dynamic compression was measured at a temperature above 65° C. compared to quasi-static loading. In some embodiments, the flow stress of the inverse-freezing material is increased by at least 300% at a strain of 4.5%, when dynamic compression was measured at a temperature above 65° C. compared to quasi-static loading. In exemplary embodiments, the flow stress of the methyl cellulose is increased by at least 600% at a strain of 4.5%, when dynamic compression was measured at a temperature above 65° C. compared to quasi-static loading. In some embodiments, the flow stress of the inverse-freezing material is increased by at least 500% at a strain of 15%, when dynamic compression was measured at a temperature above 65° C. compared to quasi-static loading. In some embodiments, the flow stress of the inverse-freezing material is increased by at least 1000% at a strain of 15%, when dynamic compression was measured at a temperature above 65° C. compared to quasi-static loading. In some embodiments, the flow stress of the inverse-freezing material is increased by at least 1500% at a strain of 15%, when dynamic compression was measured at a temperature above 65° C. compared to quasi-static loading. In exemplary embodiments, the flow stress of the methyl cellulose is increased by at least 1800% at a strain of 15%, when dynamic compression was measured at a temperature above 65° C. compared to quasi-static loading.

In some embodiments, the flow stress of the inverse-freezing material is increased by at least 250% upon strain ranging between 10-50%, when increasing the concentration from 28 to 224 gr/l at 80° C. In some embodiments, the flow stress of the inverse-freezing material is increased by at least 45% upon strain ranging between 10-50%, when increasing the concentration from 28 to 224 gr/l at 80° C. In some embodiments, the flow stress of the inverse-freezing material is increased by at least 75% upon strain ranging between 10-50%, when increasing the concentration from 28 to 224 gr/l at 80° C. In exemplary embodiments, the flow stress of the methyl cellulose is increased by at least 45-75% upon strain ranging between 10-50%, when increasing the concentration from 28 to 224 gr/l at 80° C.

In some embodiments, the composite is characterized by at least 5% decrease as compared to the flow stress of the inverse freezing material not comprising an additive. In exemplary embodiments, the composite is characterized by at least 10% decrease as compared to the flow stress of the inverse freezing material not comprising an additive. In some embodiments, the composite is characterized by at least 5% decrease as compared to the flow stress of the inverse freezing material not comprising PVA additive. In exemplary embodiments, the composite is characterized by at least 10% decrease as compared to the flow stress of the inverse freezing material not comprising PVA additive.

In some embodiments, the composite may be homogeneous in space or may consist of different zones displaying different densities and/or other properties.

By "different zones" it is meant to refer to e.g., nanometric, up to macroscopic, continuous or discontinuous, creating independent or interconnected domains within the composite, having several geometries, architectures and spatial arrays, dispersed homogeneously or heterogeneously, isotropically or not.

In some embodiments, the additive concentration ranges from about 0.01 to 10 milligrams per ml of the material (e.g., the composite). In some embodiments, the additive concentration ranges from about 0.05 to 10 milligrams per ml of the material. In some embodiments, the additive concentration ranges from about 0.1 to 10 milligrams per ml of the material. In some embodiments, the additive concentration ranges from about 0.2 to 10 milligrams per ml of the material. In some embodiments, the additive concentration ranges from about 0.3 to 10 milligrams per ml of the material. In some embodiments, the additive concentration ranges from about 0.4 to 10 milligrams per ml of the material. In some embodiments, the additive concentration ranges from about 0.5 to 10 milligrams per ml of the material. In some embodiments, the additive concentration ranges from about 1 to 10 milligrams per ml of the material. In some embodiments, the additive concentration ranges from about 2 to 10 milligrams per ml of the material. In some embodiments, the additive concentration ranges from about 0.01 to 8 milligrams per ml of the material. In some embodiments, the additive concentration ranges from about 0.05 to 8 milligrams per ml of the material. In some embodiments, the additive concentration ranges from about 0.1 to 8 milligrams per ml of the material. In some embodiments, the additive concentration ranges from about 0.2 to 8 milligrams per ml of the material. In some embodiments, the additive concentration ranges from about 0.3 to 8 milligrams per ml of the material. In some embodiments, the additive concentration ranges from about 0.4 to 8 milligrams per ml of the material. In some embodiments, the additive concentration ranges from about 0.5 to 8 milligrams per ml of the material. In some embodiments, the additive concentration ranges from about 1 to 8 milligrams per ml of the material. In some embodiments, the additive concentration ranges from about 2 to 8 milligrams per ml of the material. In some embodiments, the additive concentration ranges from about 0.01 to 12 milligrams per ml of the material. In some embodiments, the additive concentration ranges from about 0.05 to 12 milligrams per ml of the material. In some embodiments, the additive concentration ranges from about 0.1 to 12 milligrams per ml of the material. In some embodiments, the additive concentration ranges from about 0.2 to 12 milligrams per ml of the material. In some embodiments, the additive concentration ranges from about 0.3 to 12 milligrams per ml of the material. In some embodiments, the additive concentration ranges from about 0.4 to 12 milligrams per ml of the material. In some embodiments, the additive concentration ranges from about 0.5 to 12 milligrams per ml of the material. In some embodiments, the additive concentration ranges from about 1 to 12 milligrams per ml of the material. In some embodiments, the additive concentration ranges from about 2 to 12 milligrams per ml of the material. In some embodiments, the additive concentration ranges from about 0.01 to 15 milligrams per ml of the material. In some embodiments, the additive concentration ranges from about 0.05 to 15 milligrams per ml of the material. In some embodiments, the additive concentration ranges from about 0.1 to 15 milligrams per ml of the material. In some embodiments, the additive concentration ranges from about 0.2 to 15 milligrams per ml of the material. In some embodiments, the additive concentration ranges from about 0.3 to 15 milligrams per ml of the material. In some embodiments, the additive concentration ranges from about 0.4 to 15 milligrams per ml of the material. In some embodiments, the additive concentration ranges from about 0.5 to 15 milligrams per ml of the material. In some embodiments, the additive concentration ranges from about 1 to 15 milligrams per ml of the material. In some embodiments, the additive concentration ranges from about 2 to 15 milligrams per ml of the material. In some embodiments, the additive concentration ranges from about 0.01 to 30 milligrams per ml of the material. In some embodiments, the additive concentration ranges from about 0.05 to 30 milligrams per ml of the material. In some embodiments, the additive concentration ranges from about 0.1 to 30 milligrams per ml of the material. In some embodiments, the additive concentration ranges from about 0.2 to 30 milligrams per ml of the material. In some embodiments, the additive concentration ranges from about 0.3 to 30 milligrams per ml of the material. In some embodiments, the additive concentration ranges from about 0.4 to 30 milligrams per ml of the material. In some embodiments, the additive concentration ranges from about 0.5 to 30 milligrams per ml of the material. In some embodiments, the additive concentration ranges from about 1 to 30 milligrams per ml of the material. In some embodiments, the additive concentration ranges from about 2 to 30 milligrams per ml of the material. In some embodiments, the additive concentration ranges from about 1 to 50 milligrams per ml of the material. In some embodiments, the additive concentration ranges from about 1 to 100 milligrams per ml of the material. In some embodiments, the additive concentration ranges from about 1 to 600 milligrams per ml of the material.

In some embodiments, the composite comprises an additive is in the form of millimeter sized, microsized or nanosized particles at e.g., 20% to 70% weight, at e.g., 30% to 70% weight, at e.g., 20% to 65% weight, at e.g., 30% to 60% weight, or at e.g., 40% to 65% weight, including any value and range therebetween.

In some embodiments, the composite has a shear thickening inverse freezing fluid characterized by an increase of at least 10%, or at least 20% viscosity at a shear rate of at least 1 l/sec, least 10 l/sec, at least 50 l/sec, at least 100 l/sec, at least 500 l/sec, at least 1000 $sec^{-1}$, at least 5000 l/sec, at least 10,000 l/sec, at least 50,000 l/sec, at least 100,000 l/sec, at least 500,000 l/sec, or at least 1,000,000 l/sec, including any value and range therebetween.

In some embodiments, the composite is characterized by an increase of at least 50% in viscosity at a shear rate of at least 1 l/sec, at least 10 l/sec, at least 50 l/sec, at least 100 l/sec, at least 500 l/sec, at least 1000 $sec^{-1}$, at least 5000 l/sec, at least 10,000 l/sec, at least 50,000 l/sec, at least 100,000 l/sec, at least 500,000 l/sec, at least 1,000,000 l/sec, including any value and range therebetween. In some embodiments, the composite is characterized by an increase of at least ten times in viscosity at at least 1 l/sec, at least 10 l/sec, at least 50 l/sec, at least 100 l/sec, at least 500 l/sec, at least 1000 $sec^{-1}$, at least 5000 l/sec, at least 10,000 l/sec, at least 50,000 l/sec, at least 100,000 l/sec, at least 500,000 l/sec, at least 1,000,000 l/sec, including any value and range therebetween. Herein, by "increase" it is meant to refer to the composite, or composition, compared to the inverse-freezing material not comprising the additive.

The Articles

The present inventors have contemplated that an inverse freezing material may be utilized as a second (e.g., inner) layer of a structure (e.g., an armor), behind a first (e.g., outer) layer. The first layer may comprise, for example, elements that allow to stop or hinder bullets or hard-bodied objects from penetrating the armor. The inverse freezing materials in the second layer may allow to mitigate shockwaves and forces that the impact produces, and thus protect the wearer or target, such as a building or sensitive components within a system, from the shocks' damaging effects.

The shape of the layers may be but is not limited to that of plates, flexible sheet-like, interwoven ribbons or fibers, or intermixed as a multi-component bulk (such as particles of the hard material within the inverse-freezing material or composite).

According to an aspect of some embodiments of the present invention, there is provided an article comprising inverse-freezing material e.g., a solution of any cellulose derivative as disclosed herein (e.g., methyl cellulose solution).

In some embodiments, the armor is protective clothing, benefiting from the fluidity of the inverse-freezing materials.

In some embodiments, by "cellulose derivative" it is also meant to encompass cellulose (e.g., methyl cellulose) solution. In some embodiments, by "solution" it is meant to refer to an aqueous solution. In some embodiments, by "cellulose solution" it is meant to refer to 1% to 40%, 1% to 30%, 5% to 20%, or 1% to 10%, by weight, cellulose, including any value and range therebetween.

In some embodiments, by "cellulose solution" it is meant to refer to 1%, 5%, 10%, 15%, 20%, 25%, 30%, 35%, or 40%, by weight, cellulose (e.g., methyl cellulose) including any value and range therebetween.

In exemplary embodiments, the cellulose solution comprises about 5%, by weight, methyl cellulose.

In additional exemplary embodiments, the cellulose solution comprises about 10%, by weight, methyl cellulose.

In some embodiments, the article is a ballistics protection apparatus. In some embodiments, the article is a ballistics-grade article. In some embodiments, the article is a bullet proof vest. In some embodiments, the article is an armor (e.g., body armor) or a shield. In some embodiments, the article is configured to absorb and dissipate the energy from projectiles, percussion waves, shock waves or heat sources. In some embodiments, the shockwaves and heat can also be sourced to an article comprising blast, e.g., an exploding material.

In some embodiments, the article (e.g., in the form of a bullet proof vest, ballistics, shrapnel, or shock protective layer) comprises at least two layers: an inner (also referred to as: "interior") layer and an outer layer. Herein by "inner layer and an outer layer" it is also meant to refer to "front plate, and back (or rear) plate", or to "front panel and back (or rear) panel", respectively.

In some embodiments, the front and rear panels may be coupled together by any suitable means, such as welding, bonding, or mechanically fastening. In one embodiment, the front and rear panels are seam welded together along their respective peripheries.

In some embodiments, the inner layer comprises inverse-freezing material, for example, cellulose ("cellulose layer").

In some embodiments, the inner layer further comprises an additive, for example in the form of one or more types of particles as disclosed hereinthroughout.

In some embodiments, the types of particles may be characterized by different sizes thereof (e.g., 50% or more different in size).

In some embodiments, the inner layer comprising inverse-freezing material (such as 5% weight methylcellulose aqueous solution) has a thickness of 0.1, 0.5, 1, 1.5, 2, 2.5, or 3 cm, including any value and range therebetween, although it will be appreciated that the layers may have any other suitable thickness.

In some embodiments, the inverse-freezing material (e.g., cellulose) layer is configured to absorb and dissipate the energy from projectiles, pressure waves (e.g., explosive device), shock wave, or heat sources reaching thereto. In some embodiments, the inverse-freezing material (e.g., cellulose) layer allows to absorb forces or shock waves reaching the inner layer.

In some embodiments, by "absorb" it is meant to reduction of e.g., 10%, 20%, 30%, 40%, 50%, 60%, 70%, 80%, 90%, or even 100%, including any value therebetween, of the maximum amplitude of the force (impact force) signal incoming into the inner (e.g., cellulose) layer after the force signal passes through and exits the inner (e.g., cellulose) layer.

In some embodiments, by "reduction" it is meant to refer to % reduction per 1 cm of the inverse-freezing material layer.

In some embodiments, the inner layer comprising cellulose has a thickness of 0.1, 0.5, 1, 1.5, 2, 2.5, or 3 cm, including any value and range therebetween, and the cellulose solution comprises 5%, 6%, 7%, 8%, 9%, 10%, 15%, 20%, 25%, 30%, 35%, or 40%, by weight, cellulose, including any value and range therebetween.

In some embodiments, the inner layer comprising cellulose has a thickness of 10 nm, 100 nm, 500 nm, 1 micrometer, 10 micrometer, 100 micrometer, 1 mm, 5 mm including any value and range therebetween, and the cellulose solution comprises 5%, 6%, 7%, 8%, 9%, 10%, 15%, 20%, 25%, 30%, 35%, or 40%, by weight, cellulose, including any value and range therebetween.

In exemplary embodiments, the inner layer comprising cellulose has a thickness of about 1 cm, or about 2 cm, and the cellulose solution comprises about 5%, by weight, cellulose, including any value and range therebetween.

In exemplary embodiments, the inner layer comprising cellulose has a thickness of about 2 cm, and the cellulose solution comprises about 10%, by weight, cellulose, including any value and range therebetween.

Herein by "force" it is also meant to encompass kinetic impact forces, and shockwaves.

In some embodiments, the cellulose layer allows to reduce the thickness of the outer layer (e.g., ceramic layer) by at least 10%, at least 20%, at least 30%, at least 40%, or at least 50%.

Herein by "allows to reduce the thickness" it is meant that the thickness of the outer layer may be reduced while maintaining the same absorbance the impact shock, compared to a situation lacking the presence of the inner layer.

It will be appreciated, however, that the present invention is not limited to the dimensions recited herein, and any other suitable dimensions may be selected based upon the size of the user and the desired coverage area.

Furthermore, even without reduction in thickness of the outer layer, it will be appreciated that the advantage to the wearer/protected target is such that it is better protected against impacts and shocks due to the presence of the second layer.

In some embodiments, the presence of an inverse-freezing component in a shear-thickening fluid provides this composite with increased ability to mitigate shocks and impact forces, compared to the shear-thickening fluids without this additional component.

In an exemplary embodiment, methyl cellulose was introduced into an aqueous cornstarch solution, which may be shear thickening. The aqueous cornstarch solution without the methylcellulose shows 2-8% reduction of maximum amplitude of forces, but the inverse-freezing composite solution, comprising aqueous cornstarch and methylcellulose shows 56% reduction of the maximum amplitude of forces.

In some embodiments, the article comprising cellulose is characterized by a first physical state below the methyl cellulose's hydrogel's gelation point (e.g., within the range of 20-80° C., 20 to 70° C., 40 to 70° C., or 45 to 70° C.).

In some embodiments, the article comprising methyl cellulose is characterized by a second physical state above the hydrogel's gelation point.

In some embodiments, the second physical state has characteristics of a solid (gel), such as flow stress of at least 1 KPa, or, in some embodiments, at least 10 KPa, at a strain of 0.5%.

According to another aspect of some embodiments of the present invention there is provided an article comprising the composite disclosed herein.

In some embodiments, the article is characterized by an increase of flow stress by at least 1%, at least 5%, or by at least 10% at strains higher than 10%, when the temperature increases from the gelation temperature to 100° C.

In some embodiments, the article is characterized by an increase of flow stress of at least 45%, at least 50%, at least 55%, at least 60%, at least 65%, at least 70%, or at least 75%, when increasing the concentration of inverse-freezing component, e.g. methyl cellulose from 28 to 56 gr/l at 80° C.

In some embodiments, the ultrasonic wave velocity of the article is increased by at least 100 m/sec when the temperature rises from 14° C. to 80° C. In some embodiments, the ultrasonic wave velocity of the article is increased by at least 160 m/sec when the temperature rises from 14° C. to 80° C. In some embodiments, the ultrasonic wave velocity of the article is increased by at least 170 m/sec when the temperature rises from 14° C. to 80° C.

In some embodiments, the article is characterized by an increase of flow stress by at least 10%, at least 50%, at least 100%, at least 200%, at least 300%, at least 400%, or at least 500%, at strains above 4% at a strain rate above $10^3$ 1/sec, compared to the flow stress at the same strains at strain rates below 1 1/sec, at a temperature above the gelation or solidification temperature.

In some embodiments, the article is characterized by an increase of flow stress by at least 100% at a strain of 4.5% under dynamic loading or compression at a temperature above the gelation or the solidification temperature compared to quasi-static loading or compression. In some embodiments, the article is characterized by an increase of flow stress by at least 200% at a strain of 4.5% under dynamic loading or compression at a temperature above the gelation or the solidification temperature compared to quasi-static loading or compression. In some embodiments, the article is characterized by an increase of flow stress by at least 300% at a strain of 4.5% under dynamic loading or compression at a temperature above the gelation or the solidification temperature compared to quasi-static loading or compression. In some embodiments, the article is characterized by an increase of flow stress by at least 400% at a strain of 4.5% under dynamic loading or compression at a temperature above the gelation or the solidification temperature compared to quasi-static loading or compression. In some embodiments, the article is characterized by an increase of flow stress by at least 500% at a strain of 4.5% under dynamic loading or compression at a temperature above the gelation or the solidification temperature compared to quasi-static loading or compression.

In some embodiments, the article is characterized by an increase of flow stress by at least 500%, at least 600%, at least 700%, at least 800%, at least 900%, at least 1000%, at least 1100%, at least 1200%, at least 1300%, at least 1400%, at least 1500%, at least 1600%, at least 1700%, or at least 1800%, at a strain of 15% under dynamic loading or compression, at gelation or solidification temperature compared to quasi-static loading or compression.

In some embodiments, the article is characterized by attenuation coefficient of at least 0.01 Np/Cm at frequencies of 400 KHz to 1 MHz. In some embodiments, the article is characterized by attenuation coefficient of at least 0.2 Np/Cm at frequencies of 400 KHz to 1 MHz. In some embodiments, the article is characterized by attenuation coefficient of at least 0.4 Np/Cm at frequencies of 400 KHz to 1 MHz. In some embodiments, the article is characterized by attenuation coefficient in the range of 0.4 to 0.55 Np/Cm at frequencies of 400 KHz to 1 MHz. In some embodiments, the article is characterized by attenuation coefficient in the range of 0.4 to 0.5 Np/Cm at frequencies of 400 KHz to 1 MHz.

In some embodiments, the article is characterized by significant reduction of shockwaves in a certain range of frequencies. In some embodiments, the article is characterized by near-complete reduction (to approximately zero value) in a certain range of frequencies.

In some embodiments, the article comprises a body armor wherein the armor is in the form of an interior layer and an outer layer. In some embodiments, the interior layer and the outer layer are bonded together. In some embodiments, the outer layer comprises a hard plate. In some embodiments, the interior layer comprises an inverse freezing material.

In some embodiments, the article has an interior layer comprising an additive at a concentration of 0.02% to 55%, by total weight of the inverse freezing material and the additive.

In some embodiments, the article has an interior layer comprising an additive at a concentration of 0.1% to 55%, by total weight of the inverse freezing material and the additive. In some embodiments, the article has an interior layer comprising an additive at a concentration of 1% to 50%, by total weight of the inverse freezing material and the additive. In some embodiments, the article has an interior layer comprising an additive at a concentration of 5% to 40%, by total weight of the inverse freezing material and the additive.

In some embodiments, the hard material (e.g., in the form of a plate) comprise a ceramic material. In some embodiments, the hard material comprises one or more from: metal, inorganic oxide, Kevlar, or ultra-high molecular weight polyethylene. In some embodiments, the hard plate has a thickness of 1 to 100 mm, or 1 to 10 mm.

In some embodiments, the interior layer has a thickness of 0.1 to 10 cm. In some embodiments, the interior layer has a thickness of 0.5 to 5 cm. In some embodiments, the interior layer has a thickness of 1 micrometer to 5 cm, e.g., 1 micrometer, 1 mm, 0.5 cm, 1 cm, 2 cm, 3 cm, 4, or 5 cm, including any value and range therebetween. In some embodiments, the interior layer has a thickness of less than 1 micrometer, e.g., 100 to 900 nm.

Thus, according to another aspect of embodiments of the invention, there is provided a kit comprising any of the cellulose derivative or the composites discloses herein.

Any article that may benefit from the enhanced mechanical property (e.g., the flow stress) of the composite or inverse-freezing material (e.g., methyl cellulose hydrogel) or its energy absorption/dispersion properties (such as ultrasonic wave attenuation or other frequencies which are harmful to the target and are generated by shockwaves) described herein is contemplated.

Exemplary articles include, but are not limited to, an acoustic insulator, acoustic attenuation, an article for military use, an article for security use, a protective shield, flexible armor and flexible armor components, energy mitigators, personal protective gear against impacts and their shocks, shock absorbers, e.g., packages or containers, as well as for damping shocks in daily application, such as shoes, when the transparency of the liquid state is beneficial as armor for windshields and electronic screens, optical actuators, civil engineering and buildings, infrastructure and protection/mitigation against shocks both by natural elements (such as earthquakes) and human-caused (such as explosions—accidental or rocket/missile hits, and repetitive/expected such as vibrations from moving vehicles or nearby drilling), temperature-controlled phase-change material such as for insulation from heat (attenuates heating or cooling of the structure by absorbing or releasing heat from the outside walls or roof), devices for computing (where the bit's 0 or 1 value may be determined by the material's phase), tissue mimicking components or stand-alone materials (due to the ability to fine-tune the stress flow properties and texture of the materials, enable beneficial use in embodiments where control of these traits is needed, such as tissue mimicking for example, liver, muscles etc.), sports, agriculture, veterinary, industrial, transportation, astronomy, dental, medical devices and maritime, shock absorbers, shock attenuator, and energy mitigators.

In some embodiments the article may be used for personnel, instrument or component, vehicular, and structural armor, solely or combined with other armor elements.

In some embodiments the article is in the form of a portioned (such as honeycomb) sheet. In some embodiments the article is in the form of an inner layer of a multi-component armor, and may include rigid components (such as ceramics) or as a contained individual unit (such as in a sealed "sleeve" for the elbow).

In some embodiments the article is used in a personal employment e.g., joints (e.g., elbows, knees), such as in inner casings for helmets to protect against concussions and brain lesions, and/or for repetitive smaller amplitude shocks such as provided by shoe soles.

In some embodiments the article is used in civil engineering and buildings, for infrastructure and protection/mitigation against shocks both by natural elements (such as earthquakes) and human-caused (such as explosions—accidental or rocket/missile hits, and repetitive/expected such as vibrations from moving vehicles or nearby drilling.

In some embodiments the article may be implemented for military, security, sports, agriculture, veterinary, industrial, transportation, astronomy, dental, medicine, or maritime.

In some embodiments, the article may be implemented in designated instruments or in instruments and structures where control of acoustic waves is beneficiary.

In some embodiments, the article is implemented in acoustic insulation of devices.

In some embodiments, the article is an optical actuator.

In some embodiments, the transparency of the liquid state of the disclosed composite is beneficiary for e.g., medical devices, armor for windshields and electronic screens, etc.

In some embodiments, the disclosed temperature-controlled phase-change material is utilized. Such materials may be used in a variety of applications, e.g. structure insulation from heat (e.g., attenuates heating or cooling of the structure by absorbing or releasing heat from the outside walls or roof) to computing (where the bit's 0 or 1 value is determined by the material's phase).

In some embodiments, the disclosed article is employed as tissue mimicking component, or stand-alone materials. The ability to fine-tune the stress flow properties and texture of the disclosed article materials allow to enable beneficial use in embodiments where control of such traits is needed, such as tissue mimicking (liver, muscles etc.).

Since, in some embodiments, the disclosed articles are expected to be resistant to wear at relatively high temperatures (e.g., 80-100° C.) they may serve as components in armors (e.g., helmets), protective shield, gels in vehicles, gels in systems with heating due to friction—brakes, pistons, designable template (and spacer) for tubing, soft or flexible elements (for example: a flexible tube placed in a second outer tube) which is filled with e.g., methyl cellulose solution or with the disclosed composite in any embodiment thereof.

In exemplary embodiments, the tube may be bent and shaped into the desired form, and then heated, thereby stiffening or rigidifying the tube.

Further exemplary articles are selected from shrink film wrap. In some embodiments, the disclosed article comprises mattresses, e.g., to reduce vibrational shocks to the person deposited on the mattress.

In some embodiments, the disclosed article is used for the medical purpose of fixating a limb or other organs, such as a cast or scaffold.

In some embodiments, the disclosed articles can be employed by, without being limited to, personnel, instrument or component, vehicular, and structural armor, solely or combined with other armor elements. In some embodiments, the personnel protection includes, but is not limited to: joints (e.g., elbows, knees) where the flexibility of the liquid state is an advantage, sensitive organs such as in inner casings for helmets to protect against concussions and brain lesions.

In one embodiment, the article is a portioned (such as honeycomb) sheet of the composite (see FIG. 30). In some embodiments, the disclosed article can be the inner layer of a multi-component armor or as a contained individual unit (such as in a sealed "sleeve" for the elbow, FIG. 31).

Further exemplary articles are selected from acoustic and shock-wave protection devices e.g., a shock absorbers or acoustic insulators.

As exemplified in the Examples section below the liquid-state of the disclosed composites show considerably higher attenuation of acoustic waves than water and lead. In additional exemplary embodiments, the articles are selective acoustics component/adjustable hearing-range sound and ultrasound coupling. Since the attenuation of ultra waves may be temperature dependent, a component bearing the inverse-freezing material (e.g., cellulose or methyl cellulose hydrogel) or the disclosed composite may be placed so that at a certain set temperature the waves pass through, and at another waves are attenuated. This may allow control of ultrasound amplitude past the component without requiring mechanical manipulation (such as physically removing barriers or changing the angle of shutters), with simple heating bodies.

In some embodiments, the compositions, composites or articles disclosed herein may be used in various fields, including but not limited to protection or improved performance of personal protection devices and accessories, vehicles, instruments and their components, buildings or infrastructures, vehicles, and robotics.

In some embodiments, the compositions, composites or articles disclosed herein may be used in various fields, including but not limited to security, military, sports and leisure activities, civil engineering, maritime, medicine, veterinary medicine, agriculture, electronics, aeronautics and aerospace, industrial manufacturing, and transportation.

In some embodiments, the compositions, composites or articles disclosed herein may be used in various fields, including but not limited to use against harmful effects due to either human-sourced causes (such as ballistic projectiles, explosions of warheads or explosive devices, drilling, vibrations caused by nearby active transportation) or naturally-sourced causes (such as wildfires, earthquakes, volcanic eruptions).

In some embodiments, the compositions, composites or articles disclosed herein may be at least partially transparent (depending on their composition) such as for use as a protective layer for windshields in vehicles or for display screens.

In some embodiments, the compositions, composites or articles disclosed herein may be used in various fields, including but not limited to engines (e.g., insulation of engine components such as pistons and/or mitigating heat due to friction).

In some embodiments, the compositions, composites or articles disclosed herein may be used in flexible tubing, as an external encaser of the flexible tube.

In some embodiments, the compositions, composites or articles disclosed herein may be used in shrink-wraps of various components of instruments, instruments, or goods.

In some embodiments, there provided a use of inverse-freezing material or of composite comprising thereof as an element of one or more from: a protective layer armor, a protective gear, a protective equipment, a protective clothing, structural component for mitigation of shocks. In some embodiments, the materials or the composite are coupled to another layer of armor.

In some embodiments, the protective layer, or armor, is characterized by one or multiple layers comprising the inverse-freezing material or the composite, and further hard material, such as, without being limited thereto, metals, ceramic material, inorganic oxide, Kevlar, ultra-high molecular weight polyethylene.

In some embodiments, the layer(s) is in the form of either plate-like, flexible sheet-like, intermixed as a multi-component bulk (such as particles of the hard material incorporated within the inverse-freezing material or composite). In some embodiments, the thickness of each layer can be varied, between micrometers to several centimeters.

In some embodiments, the article comprises a first layer and an second layer, wherein: (i) the first layer and the second layer are held together, (ii) the second layer (e.g., outer layer) comprises a hard material and wherein (iii) the first (or inner) layer comprises the inverse freezing material or the composite, as disclosed herein. In some embodiments, the article is in the form of multiple layers (e.g., first and second layers as described herein). In some embodiments, the interior layer has a thickness of 1 micrometer to 3 cm.

In some embodiments, there is provided a shock-reducing mattress containing the disclosed inverse-freezing material or composite, e.g., for reducing shocks passing to user lying thereupon.

General:

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, and mechanical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples which, together with the above descriptions, illustrate the invention in a non-limiting fashion.

Materials

Methyl cellulose type A15C Methocel, (A15C, Sigma Aldrich®) and methyl cellulose (MC) SGA7CFood Grade (A7C, generously provided by DOW® Chemical Company) were used as received without further purification. Manufacturer reported values for percentage of methylation and viscosity of a 2% solution in water at 20° C. are: 27.5-31.5% (*D.S. 1.64-1.92) and 1200-1800 cP for A15C, and 29.5-31.5% (*D.S. 1.78-1.92) and 525-980 cP for A7C. Water was purified by a Millipore Milli-Q instrument reaching resistance of 18 MΩ.

Since the $T_g$ can vary significantly with the heating rate, gelation temperatures for the MC-based hydrogels in the heating rates used in this work, 10° C./min, were measured by cloud-point (90% optical transference reduction, red-light LED in pulse mode (200 mA) set at 10 cm from a den OA SI-biased photodiode detector (Thorlabs) with an added amplification of ×50, with a thermocouple inserted into the hydrogel into a sealed vial), these temperatures are detailed in Table 1 showing $T_g$ at a heating rate of 10° C./min for the MC-based hydrogels in this study, variance up to ±2° C.

TABLE 1

| Concentration/MC type gr/l | A7C ° C. | A15C ° C. |
|---|---|---|
| 56 | 42 | 57 |
| 44 | 46 | 61 |
| 28 | 50 | 64 |

Preparation of Four Exemplary Compositions A Non-Composite Inverse-Freezing Material and Three Different Inverse-Freezing Composites A7C Methyl Cellulose Hydrogel 5 mL of purified water (obtained by using a Millipore Milli-Q instrument) were heated in a capped vial with a magnetic stirring bar to 70-80° C. 0.28 g methyl cellulose powder, SG-A7C-FG methocel (DOW Chemical Company) was then added to the solution. The suspension was mixed vigorously using a spatula, then the vial was recapped and placed in a water bath at 70-80° C. for at least 10 minutes while stirring. The stirring bar was then removed and the capped vial was placed in an ice bath for 60 minutes. The solution was then stored for at least 12 hours in 1–4° C. before measurements.

A7C Methyl Cellulose Hydrogel with Polyvinyl Alcohol (PVA)

5 mL of purified water (obtained by using a Millipore Milli-Q instrument) were heated in a capped vial with a magnetic stirring bar to 70-80° C. 0.1 g polyvinyl alcohol (PVA), 99% hydrolyzed, Mw (average) 146,000-186,000 g/mol (Sigma-Aldrich) was added to the heated water and stirred for 35 minutes, until no PVA particles were visible to the eye. Then, 0.28 g methyl cellulose powder, SG-A7C-FG methocel (DOW Chemical Company) was then added to the solution. The suspension was mixed vigorously using a spatula, then the vial was recapped and placed in a water bath at 70-80° C. for at least 10 minutes while stirring. The stirring bar was then removed and the capped vial was placed in an ice bath for 60 minutes. The solution was then stored for at least 12 hours in 1-4° C. before measurements.

A7C Methyl Cellulose Hydrogel with Nano Boron Carbides 15 mg of nano boron carbide plate-shaped particles, with an average diameter of 55 nm (American Elements) were weighed and inserted into a glass vial. 5 mL of purified water (obtained by using a Millipore Milli-Q instrument) were added the vial, and then the dispersion was sonicated for 5 minutes. The solution was then heated to 70-80° C. in a capped vial equipped with a magnetic stirring bar. 0.28 g methyl cellulose powder, SG-A7C-FG methocel (DOW Chemical Company) was then added to the solution. The suspension was mixed vigorously using a spatula, then the vial was recapped and placed in a water bath at 70-80° C. for at least 10 minutes while stirring. The stirring bar was then removed and the capped vial was placed in an ice bath for 60 minutes. The solution was then stored for at least 12 hours in 1-4° C. before measurements.

A7C Methyl Cellulose Hydrogel with Corn Flour (STIFF)

9 g of corn flour (starch from corn, Sigma-Aldrich) was inserted into a glass vial. 8 mL of purified water (obtained by using a Millipore Milli-Q instrument) were slowly added, while thoroughly mixing the suspension.

A shear thickening fluid forms. This fluid was then warmed to 60° C., and then 0.4 g of methyl cellulose powder, SG-A7C-FG methocel (DOW Chemical Company) was then added to the fluid, while slowly stirring. The vial was kept under heating in a water bath at 60-70° C. for at least 10 minutes while slowly stirring, and then after the stirring bar was removed the capped vial was placed in an ice bath for 60 minutes. It was then stored for at least 12 hours in 1-4° C. before measurements.

Example 1

Ultrasonic Characterization

Experimental Methods

The longitudinal ($V_L$) and shear ($V_T$) wave speeds of the MC A7C were measured at 14° C. and 80° C., respectively. Since the velocity measurement itself, has inherent statistical scatter, a large number of measurements (over 40 for $V_L$ and above 10 for $V_T$) were performed. The ultrasonic experimental setup used for group velocity measurements, consists of a high voltage ultrasonic pulser (Olympus 5058PR) and two ultrasonic piezo-electric probes and two ultrasonic piezo-electric probes, one for exciting and receiving longitudinal waves at a nominal frequency of 1 MHz (SIUI-1M-24), and one for exciting and receiving shear stress waves at nominal frequency of 5 MHz (Olympus V152-RB). The measured ultrasonic signals were recorded using an oscilloscope (Agilent DSO-X 2004A, 2 Gsa/sec).

The ultrasonic measurements of the gels were performed using the pulse-echo technique. The liquid gel was cast into a cylindrical holder of Poly(methyl methacrylate)(PMMA), D=40 mm with a thin (0.2 mm) plastic slide as under plate, which was practically transparent to the ultrasonic pulse and returning signals.

The raw data from each measurement includes at least four repetitive pulse echoes which were converted into rectified mode using Hilbert transform. A homemade Matlab code detects the location of the maximum amplitude of each pulse echo and calculates the group velocity (longitudinal/shear) using the following equation (1):

$$V_g = \frac{2X}{t} \quad (1)$$

where X is the sample height and t is the time between two consecutive peaks.

For the MC gel state, the Young's modulus (E) and Poisson's ratio (v) can be calculated from the measured shear and longitudinal wave velocities according to eqn. (2).

$$E = \frac{V_L^2 \rho (1+v)(1-2v)}{1-v} \quad (2)$$

$$v = \frac{1 - 2(V_T - V_L)^2}{2 - 2(V_T - V_L)^2}$$

where $V_L$ and $V_T$ are the longitudinal and the shear wave velocity respectively and $\rho$ is the material's density. For the liquid MC the compressibility coefficient ($\beta$=dV/dP) can be calculated according to eqn. (3).

$$\beta = V_L^2 \rho \quad (3)$$

where dV is the change in volume and dP is the change in pressure.

The longitudinal ($V_L$) and shear ($V_T$) wave speeds of the MC A7C were measured at 14° C. and 80° C. respectively. Since the velocity measurement itself, has inherent statistical scatter, a large number of measurements (over 40 for $V_L$ and above 10 for $V_T$) were performed.

Results

Figure 1A:
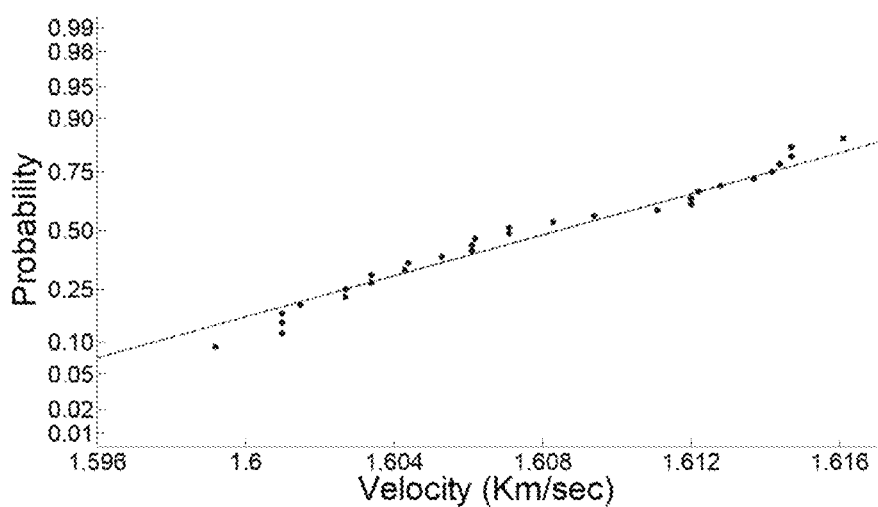
FIGS. 1A-1B illustrate an approximation to normal distribution of the measured wave velocity at liquid state (FIG. 1A) and solid state (FIG. 1B).
Figure 1B:
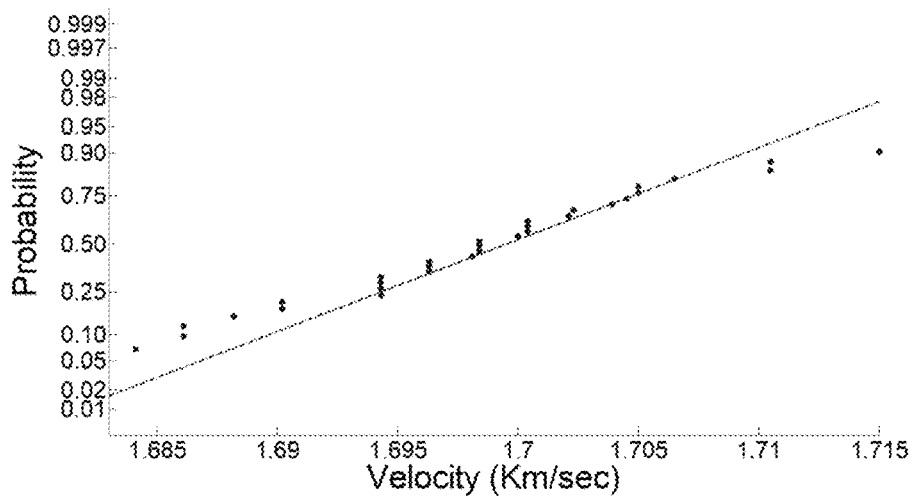

The results are shown in FIGS. 1A-B and summarized in Table 2.

TABLE 2

|  | Longitudinal wave velocity (m/s) | Shear wave velocity (m/s) | Young's modulus E (GPa) | Poisson's ratio v |
| --- | --- | --- | --- | --- |
| Gel 80° C. | 1699 ± 10 | 1010 ± 5 | 2.45 ± 2.91*10$^{-5}$ | 0.227 ± 0.005 |

|  | Longitudinal wave velocity (m/s) | Shear wave velocity (m/s) | Compressibility coefficient $\beta$(1/GP$\alpha$) |
| --- | --- | --- | --- |
| Liquid 14° C. | 1607 ± 7 | — | 0.386 ± 0.003 |

Example 2

Compression Experiments for Methyl Cellulose Gels

Experimental Methods

Static Compression:

Uniaxial quasi-static compression experiments were conducted using a screw-driven testing machine (Instron 4483), under displacement control, with a prescribed crosshead velocity of 3.6 mm/min. MC gels were tested inside a temperature controlled chamber, at a temperature of 80°±3° C. For high resolution force measurements, a 500N load-cell was installed on the machine. During the experiments the force (F) and the displacement (ΔL), were recorded at 8 Hz frequency.

Figure 2:
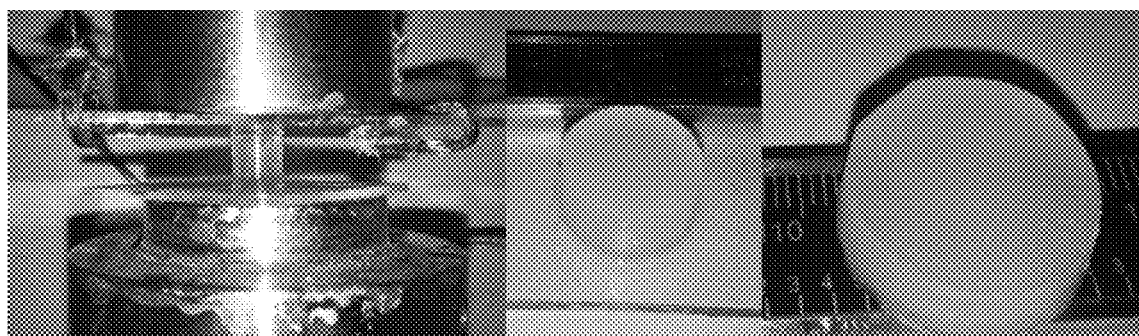
FIG. 2 illustrates photos of gel samples before and after compression (from left to right). Glass plates were used to reduce friction.

In order to minimize frictional effects and thus avoid barreling of the sample (see FIG. 2), two custom glass plate adapters were installed on the conventional compression gigs. Moreover, before each test, the glass plates were wetted with a few drops of water to reduce friction, achieving the sought-after effect.

Samples were cast into sealed glass vials with an internal diameter of 18 mm. They were then heated in the temperature control temperature (set at 80° C.) for 4 minutes, to ensure a homogenous gel. The gel was then carefully extracted out of the vial and sliced to yield a cylindrical sample with nominal diameter and height of $D_0$=18 mm, $L_0$=8 mm respectively. Pictures of a sample before and after compression are presented in FIG. 2.

The measured load-displacement curves were reduced into engineering stress-strain curves, where the engineering stress ($\sigma_{eng}$) was calculated as the applied load divided by the original cross section area ($A_0$).

$$\sigma_{eng} = \frac{F}{A_0} \quad (4)$$

Hence, the engineering strain ($\varepsilon_{eng}$) was calculated as $$\varepsilon_{eng} = \frac{\Delta L}{L_0} \quad (5)$$

where $L_0$ is the original specimen height and ΔL is the measured extension.

Repeatability and Homogeneity:

The repeatability experiments were conducted on specimens with MC concentration of 56 gr/l at temperature of 80° C. The flow stress measurements of A7C and MVM were repeated 3 to 10 times. Each curve was collected from separately-prepared batches, and not averaged out.

Furthermore, with the aim of characterizing the spatial homogeneity of the sample, different portions of the same sample were tested separately. Since the gel sample may be stored for a few days before the experiment and is not stirred before measurement, it was important to rule out sedimentation of the polymer. Such a process might cause a strain gradient in the specimen, so that the upper part might be much weaker than the lower part. For this purpose, four A7C specimens were stored for 4 days at 4° C., heated to 80° C. and split into half. Each of these portions were tested separately.

Characterization of the Semi-Solid Gel:

A7C and MVM samples at three different concentrations, including 28, 44 and 56 gr/l were characterized at 80° C. In addition, the mechanical response of MC at the gelation temperature (65° C.) was compared to semi-solid temperatures of 80° C. and 100° C. with a fixed gel concentration (44 or 56 gr/l). The strain rate sensitivity of semi-solid A7C was examined within a range of nominal strain-rates between $7.5*10^{-3}$-$4*10^{-1}$ 1/sec and with concentration of 56 gr/l at 80° C.

Figure 3A:
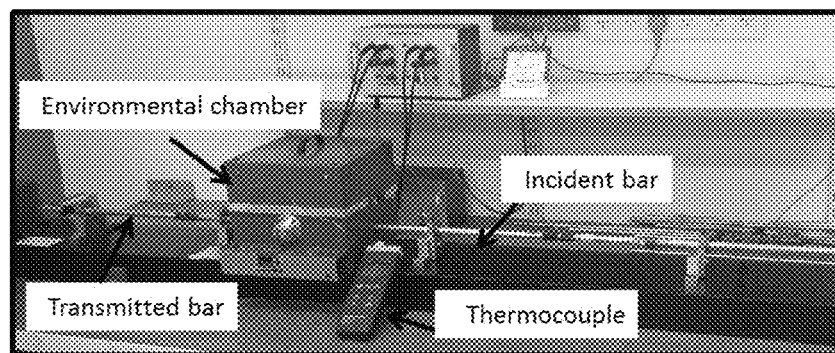
FIG. 3A illustrates the modified Kolsky (Split Hopkinson Bar) apparatus with the environmental chamber, used to perform the dynamic loading/compression measurements reported herein.

Dynamic Compression:

The dynamic compression experiments were performed using a conventional 12.7 mm diameter Kolsky apparatus as illustrated in FIG. 3A, made of 7075-T6 aluminum-alloy bars, which were loaded at the far end of the incident bar with a projectile made of the same material.

Once the striker hits the incident bar, a compression stress wave propagates along the incident bar until it reaches its end. At that point, the stress wave reaches the interface between the incident bar and the specimen. Here, part of the incident stress wave propagates through the specimen into the transmitted bar, while another part reflected back in the incident bar. The incident, reflected and transmitted stress waves, $\varepsilon_{inc}$, $\varepsilon_{ref}$, $\varepsilon_{tra}$ respectively, are measured by strain gauges (S.G) and recorded using a Nicolet 440 digital oscilloscope. The displacements and the forces acting on each side of the specimen can usually be obtained from 1D wave propagation analysis. The applied forces on each side of the specimen are calculated based on the measured strains, and can thus be checked for dynamic force equilibrium.

$$F_1 = AE(\varepsilon_r + \varepsilon_i)$$

$$F_2 = AE(\varepsilon_T) \quad (6)$$

Figure 3B:
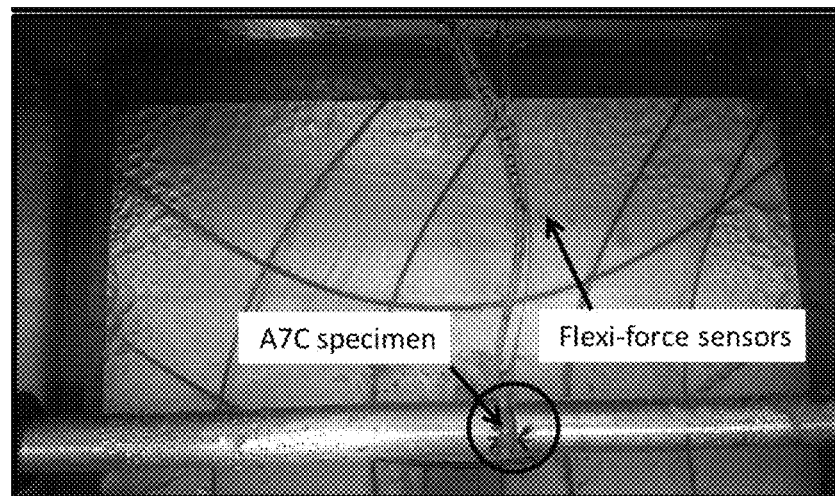
FIG. 3B illustrates the methyl cellulose SG-A7C-FG methocel (A7C) hydrogel sample placed between the Klosky's bars with the Flexi-force sensors.

1D wave analysis based on S.G measurements usually fits when the tested material has acoustic impedance close to the acoustic impedance of the Hopkinson bars. For low amplitude forces measurements, a standard 201HT Flexi-force™ (FF) force sensors were placed on the edges of the Hopkinson's bar as illustrated in FIG. 3B, so that the interfacial forces are measured directly and not through signal analysis.

A pulse shaper, consisting of soft paper mixed with a carefully measured amount of molybdenum disulfide grease, was inserted between the striker and the incident bar. The pulse shaper is used to increase the rise time of the loading pulse thereby improving the specimen equilibrium due to lowered accelerations. Due to the use of pulse-shapers, the strain rate is not constant throughout the tests as it increases with strain to reach a peak value. The reported strain rates are the peak values.

In order to ensure constant environmental temperature and humidity to 70° C. and 100% respectively, a sealed heating chamber was designed and built.

Figure 4A:
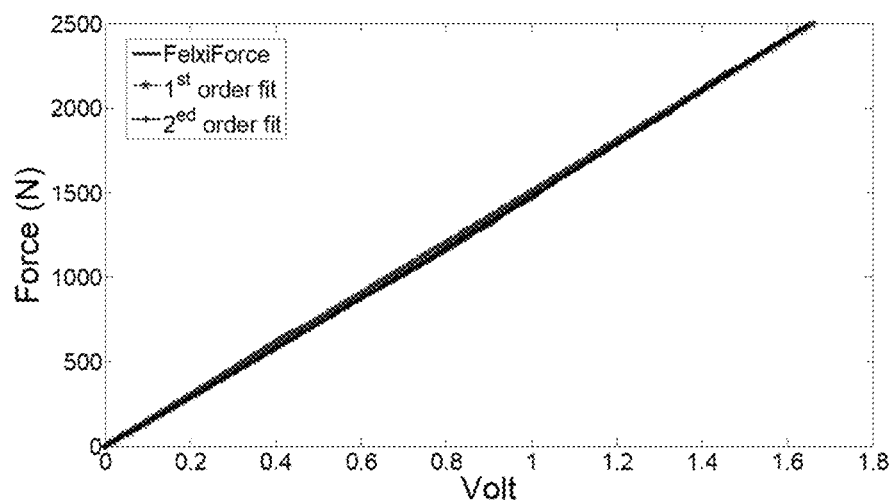
FIGS. 4A-4B illustrate the curve-fitting between voltage and force measured with the strain gauges (FIG. 4A) and Flexi-force sensors (FIG. 4B).
Figure 4B:
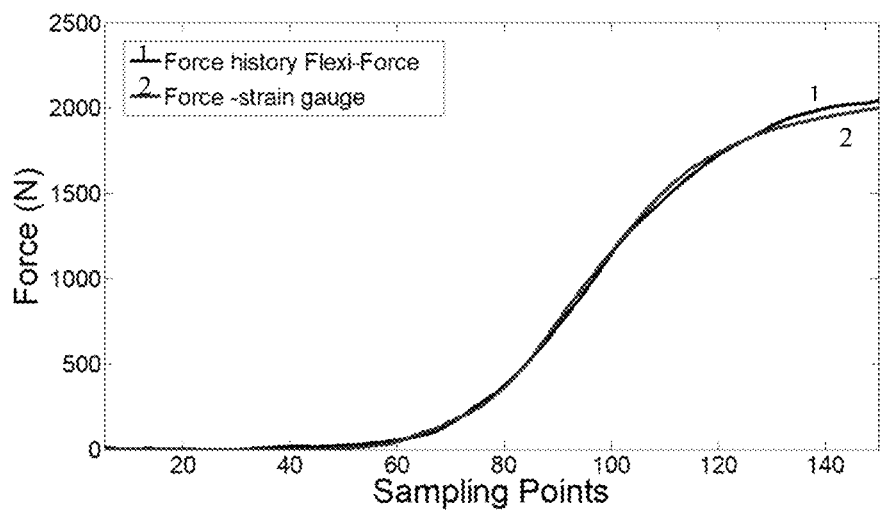

To validate the FF sensors' response, the volt to force relation was measured at the beginning and at the end of each experimental set by performing three shots without specimen between the Kolsky bars, as shown in FIG. 4A. The experimental force history was compared recorded signal on the two FF sensors, as shown in FIG. 4B.

The dynamic force equilibrium was measured directly with the FF gauges, by comparing the forces on both sides of the samples at a strain rate of ~1500 l/sec in the range of 1-12 N, using the split Hopkinson pressure bar (Kolsky apparatus). The dynamic compression true stress and true strain of A7C were calculated from split Hopkinson experiments, where the maximum strain rates were in the range of 1000-1600 l/sec at 70° C.

Comparison Between Static and Dynamic Compression

The dynamic and quasi-static flow curves were compared in order to examine the strain rate sensitivity of A7C methyl cellulose hydrogel (abbreviated hereon as MC for methyl cellulose and A7C for the SG-A7C-FG methocel hydrogel) in a qualitative manner. Unless otherwise mentioned, MVM is an abbreviation of medium viscosity methyl cellulose, of the A15C type, hydrogel.

Results

Figure 5:
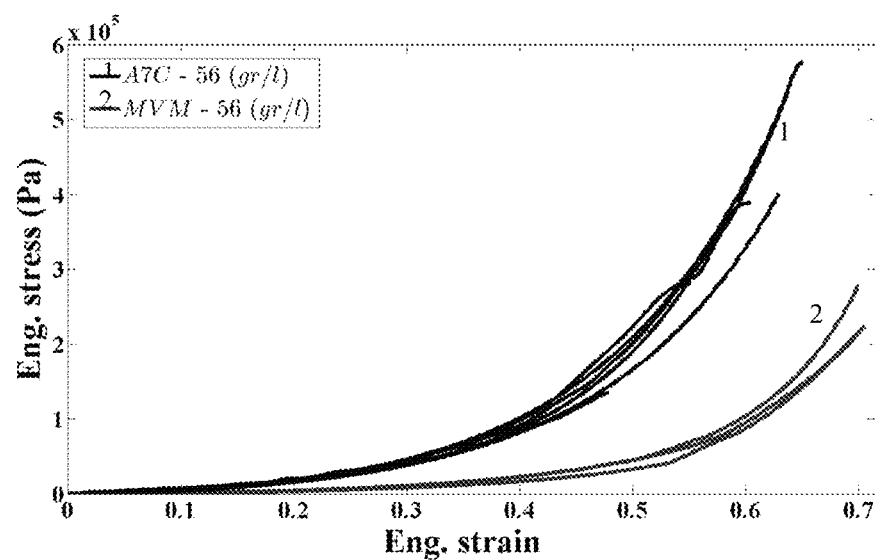
FIG. 5 illustrates engineering stress-strain curves of A7C and medium viscosity methyl cellulose (MVM, A15C methocel) hydrogels. This was measured at a temperature of 80° C.
Figure 6:
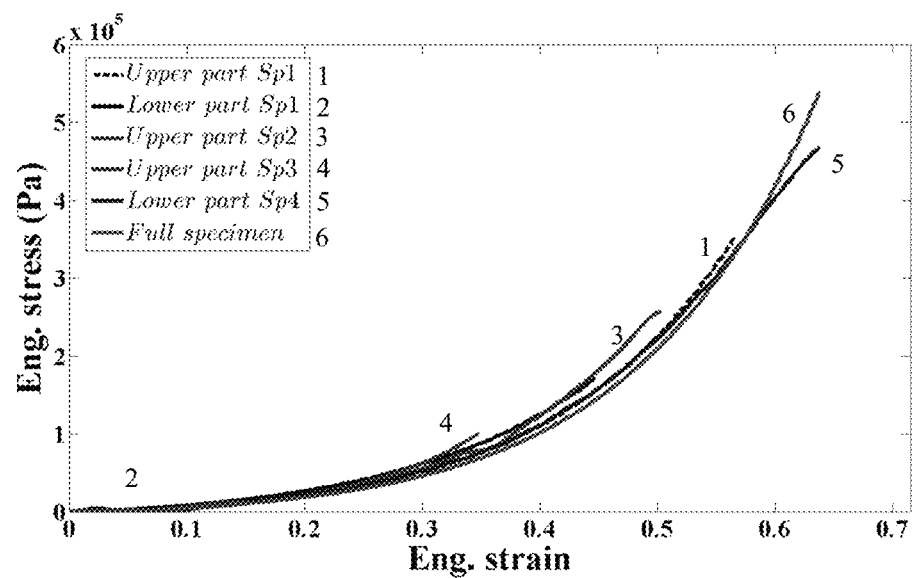
FIG. 6 illustrates engineering stress-strain curves of upper and lower portions of methyl cellulose gel samples compared to the flow stress of a full fresh specimen. This was measured at a temperature of 80° C.

Static Compression:

Repeatability and Homogeneity:

FIG. 5 presents high degree of repeatability in the quasi static measurements of the MC samples. For A7C samples, up to a strain of 0.15, there is very little hardening, but from that point on, the gels stiffen (hardens) rapidly. The same behavior was observed for MVM from stretch of a 0.2. FIG. 6 presents the sample homogeneity and stability, as no difference was observed in the stress-strain curves of the various tested specimens. Moreover, samples which were stored for 14 days at 4° C., exhibited similar flow stress to specimens with minimal storage time (12 hours).

Figure 7:
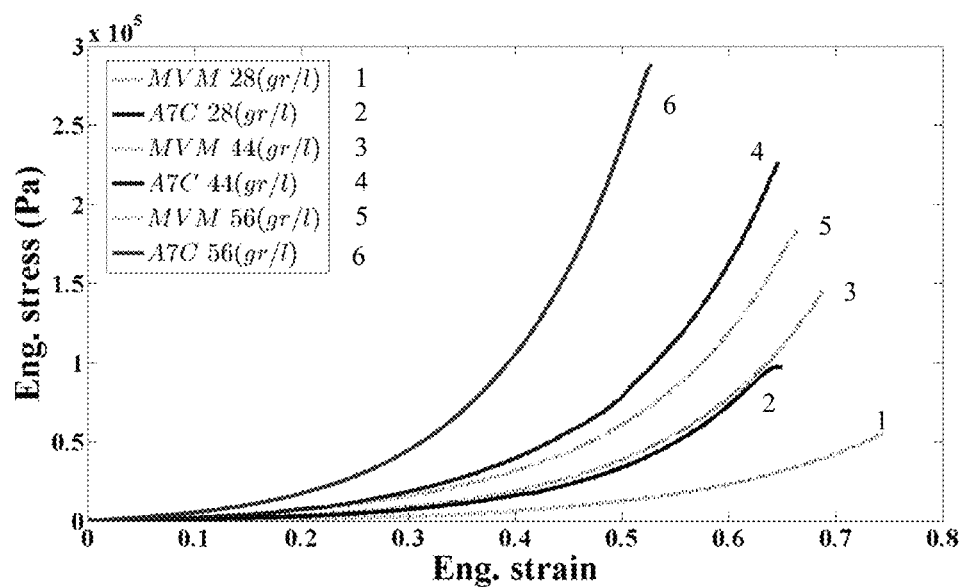
FIG. 7 illustrates engineering stress-strain curves of A7C and MVM (type A15C) at different concentrations of methyl cellulose and at a temperature of 80° C.

Characterization of the Semi-Solid Gel:

FIG. 7 shows the strengthening of MC gel with increasing polymer concentration. For instance, at a strain of 0.5 the A7C sample with 28 gr/l possesses a flow stress of ~33 KPa; by doubling the concentration of MC in the sample, the flow stress at the same strain is increased by 10 fold to ~328 KPa. Similarly, but to a lesser extent, MVM with a concentration of 28 gr/l, at a strain of 0.5, possess a flow stress of ~12 KPa, while MVM with a concentration of 56 gr/l, possesses a flow stress of ~60 KPa. With higher content of polymer chains, including loci of interactions between them, more association sites are available and a denser 3D fibrillar network can form, over larger volumes of media. Such networks confer to the gel an increased ability to resist strain and therefore a higher flow stress.

Figure 8:
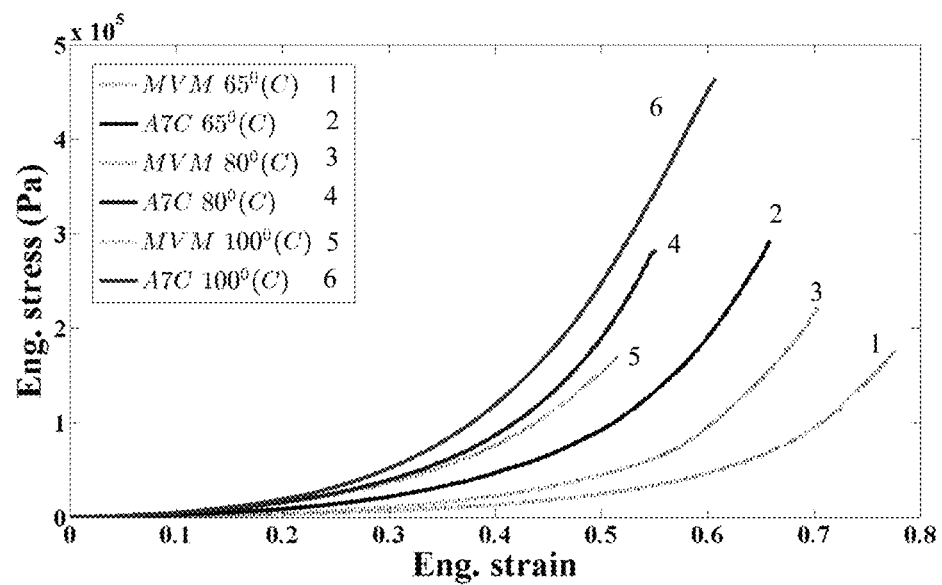
FIGS. 8 and 9 illustrate engineering stress-strain curves of A7C and MVM (type A15C) at different environmental temperatures.
Figure 9:
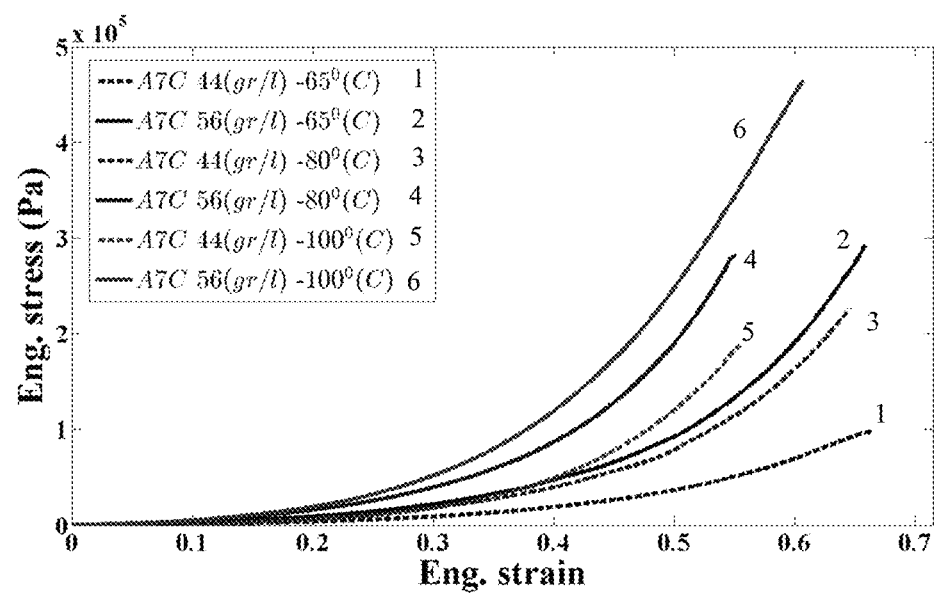

FIG. 8 shows the uniqueness of the thermo-reversible gelation phenomenon: the gels stiffen as the temperature increases. Interestingly, even at 65° C., that is just a few degrees above the gelation temperature of MVM (and about 10° C. above the gelation temperature of A7C), both gels exhibit reproducible, solid-like mechanical behavior. For example, at a strain of 0.5 the A7C sample tested at 65° C. exhibits a flow stress of ~92 KPa; by increasing the temperature to 100° C., the flow stress reaches to ~247 KPa which is about 2.5 folds enhancement. MVM exhibits an even larger hardening (6 folds). For a strain of 0.5, the flow stress of MVM shifts from ~24 KPa at 65° C. to ~150 KPa at 100° C. The same trend was observed in FIG. 9, showing that this phenomenon is not unique to a single concentration of the MC polymer in the hydrogel.

Figure 10:
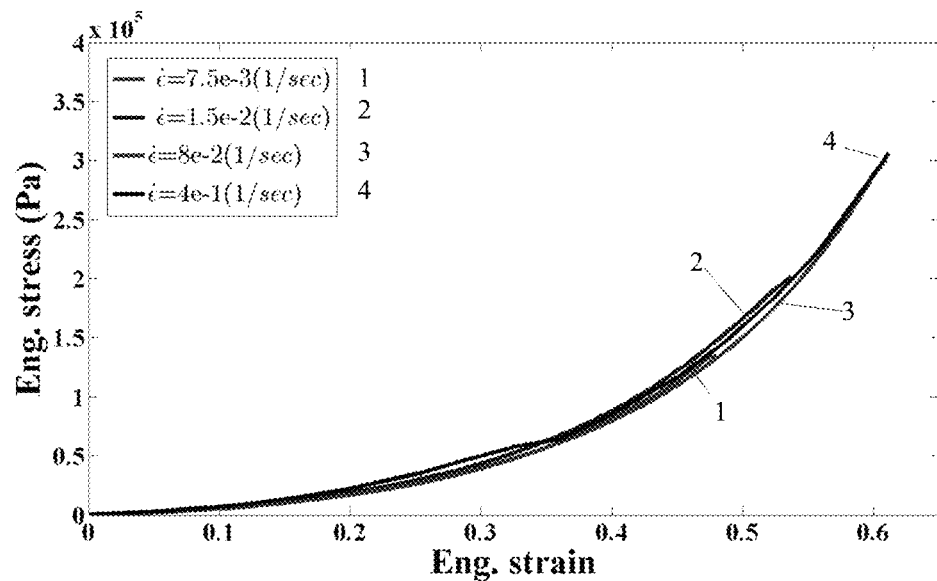
FIG. 10 illustrates engineering stress-strain curves of A7C and MVM (type A15C) at different strain rates within the quasi-static loading regime (strain rates detailed in the key).

According to FIG. 10, there is no evidence for strain rate sensitivity in the investigated range of strain rates (quasi-static regime). These results were rather surprising, since many soft gels tend to exhibit strain rate sensitivity.

Temperature and Polymer Concentration

Figure 11:
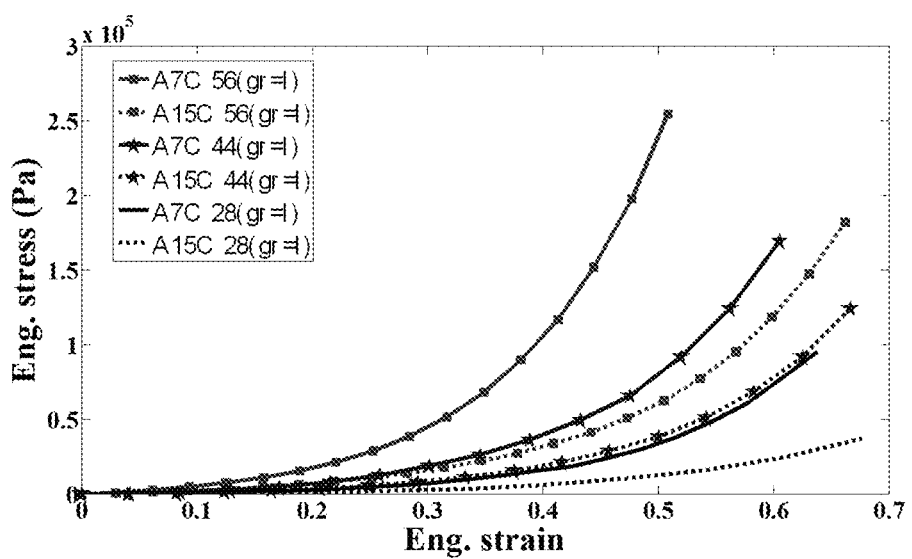
FIG. 11 illustrates quasi static tests at strain rate of $7.5 \times 10^{-3}$ sec$^{-1}$ at 80° C. Engineering stress-strain curves of A7C and A15C, MC gels at different MC concentrations. A7C solid lines, and A15C dashed lines.

A7C and A15C-based hydrogel samples at three different concentrations, 28, 44 and 56 gr/l respectively, were prepared and measured. Typical stress-strain curves of these samples with different concentration at a temperature of 80° C., are shown in FIG. 11. FIG. 11 shows that the strength of the MC-based gel increases with increasing polymer concentration. For instance, at a strain of 0.5 the A7C sample with 28 gr/l possesses a flow stress of ~33 KPa; by doubling the concentration of MC in the sample, the flow stress at the same strain is increased by tenfold to ~328 KPa. Similarly, but to a lesser extent, A15C-based hydrogel with a concentration of 28 gr/l, at a strain of 0.5, possess a flow stress of ~12 KPa, while A15C-based hydrogel with a concentration of 56 gr/l, possesses a flow stress of ~60 KPa. As can be seen, for all concentrations examined A7C-based hydrogels consistently show higher flow-stress than A15C-based hydrogels. This could be due both to the average larger values of DS for the A7C-type.

With higher content of polymer chains, including loci of interactions between them, more association sites are available and a denser 3D fibrillar network can form, over larger volumes of media. Such networks confer to the gel an increased ability to resist strain and therefore a higher flow stress.

Characterizing the influence of the temperature on the mechanical properties of our gels is essential since these properties change considerably on crossing the gelation temperature. Therefore, the mechanical response of a fixed selected gel concentration of 56 gr/l was initially measured at the lowest temperature, that is still above the $T_g$ of the lowest-$T_g$ sample (65° C.) as a reference. Then, additional samples were stabilized at temperatures of 80° C. 100° C., and then tested. Typical flow curves of A7C and A15C-based hydrogel samples are shown in FIG. 12.

Figure 12:
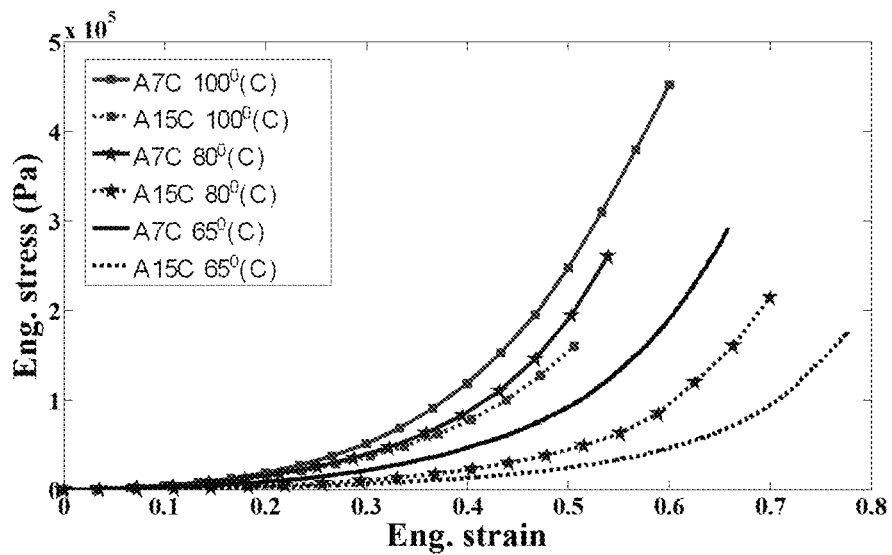
FIG. 12 presents graph showing the results of quasi static tests at a strain rate of $7.5 \times 10^{-3}$ sec$^{-1}$: engineering stress-strain curves of A7C and A15C, MC-based hydrogels (56 gr/l) at different environmental temperatures. A7C is in solid lines, and A15C is in dashed lines.

FIG. 12 shows the uniqueness of the thermoreversible gelation phenomenon: the gels stiffen as the temperature increases. Interestingly, even at 65° C., both gels exhibit reproducible, solid-like mechanical behavior. For example, at a strain of 0.5 the A7C-based hydrogel sample tested at 65° C. exhibits a flow stress of ~92 KPa; by increasing the temperature to 100° C., the stress reaches a value of ~247 KPa which is about 2.5 times larger. A15C-based hydrogel exhibits an even larger hardening (six folds). For a strain of 0.5 the flow stress of A15C-based hydrogel shifts from ~24 KPa at 65° C. to ~150 KPa at 100° C.

In order to verify that this stiffening with increased temperature is not unique only to the gel with the specific concentration described above, MC gels with another polymer concentration of 44 gr/l were also prepared and tested. Flow stress curves of A7C-based hydrogel at this concentration compared to the 56 gr/l samples are shown in FIG. 13 as a function of the temperature.

Figure 13:
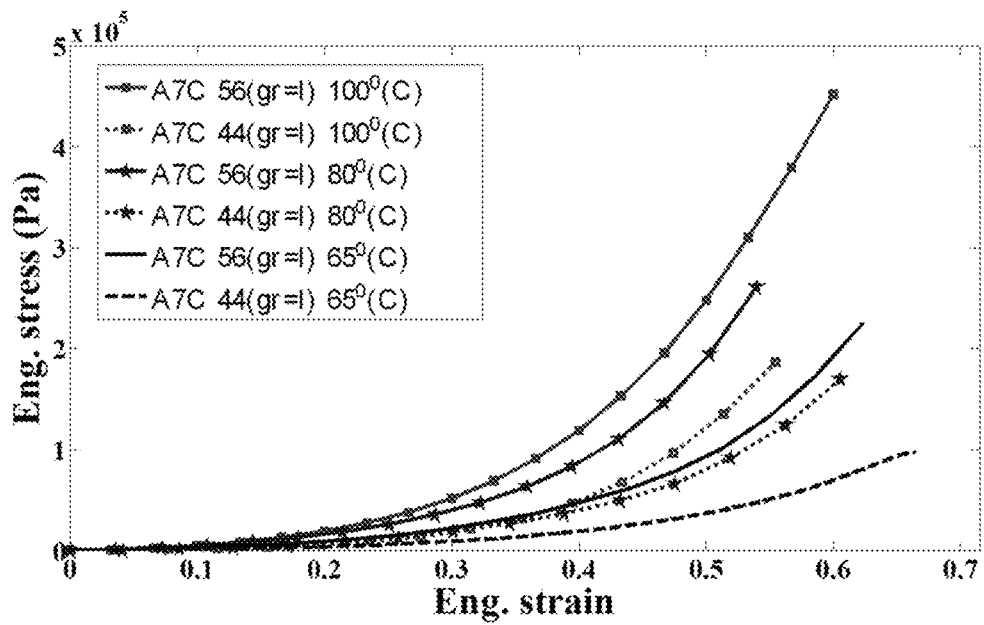
FIG. 13 presents graph showing the results of quasi static tests at strain rate $7.5 \times 10^{-3}$ (l/sec). Engineering stress-strain curves of A7C sample at two different concentrations, at different environmental temperatures. 56 gr/l is in solid lines, and 44 gr/l is in dashed lines.

The results in FIG. 13 imply that temperature-caused increase of gel flow stress occurs over a range of concentration of MC polymer in the gel.

This is the first demonstration of MC gel-state mechanical stiffening as a function of strain, by heating beyond the gelation point, as determined by straightforward monotonic compression tests, that complements the previous report.

Rheological experiments have shown that G', as a function of angular frequency up to values of 100 (rad/sec), reaches a plateau at around 65° C.-70° C. in the second stage of heat-induced gelation, corresponding to the formation of a strong gel. A more recent investigation reveals that the gels' plateau storage modulus, as a function of applied rheological stress, increases (from certain stresses upwards) with temperature. This remarkable behavior occurs only above $T_g$, and is attributed to the gel's fibrillar structure, distinct from other soft gels comprised of entangled flexible polymers. These novel findings therefore provide additional evidence that the gel's response to heating is not similar to those of the majority of other solids, either crystalline or classic amorphous (such as glass).

Heat applied to most known solids causes increased vibration of their components and weakening of their bonds (whether intermolecular in molecular solids or covalent/ionic in atomic solids), leading to decreased flow stress. However, MC hydrogels exhibit just the opposite behavior (at least in the examined temperature range). Since care was taken to prevent loss of water, increasing polymer concentration through solvent loss from the gel is an unlikely explanation of the results. While the underlying cause of this phenomenon requires further study, it is proposed, without being bound by a particular theory, that upon heating, association between more polymer chains continues to occur, shedding of structured solvent, formation of more fibrils and their growth, increasing network density and in turn leading to higher stiffness.

Figure 14:
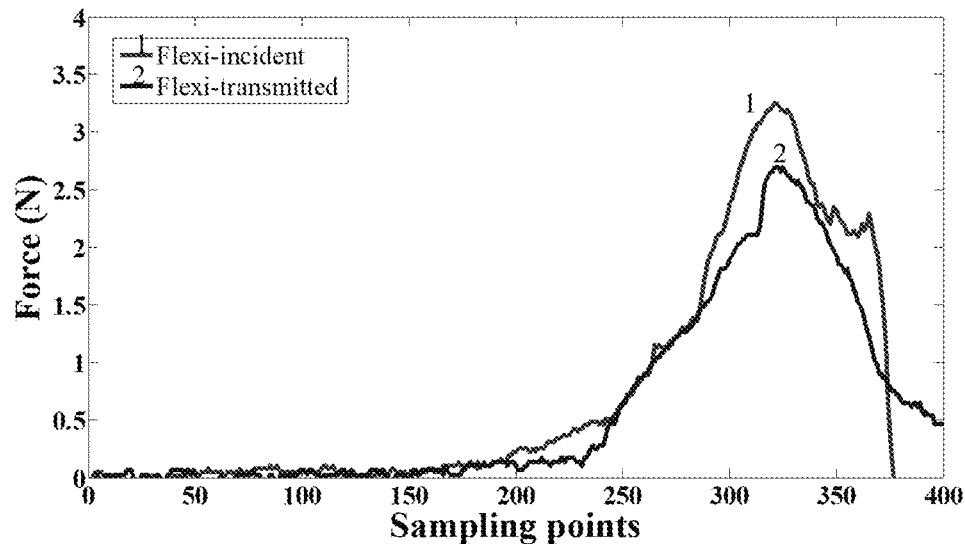
FIG. 14 illustrates typical dynamic force equilibrium for A7C gel.
Figure 15:
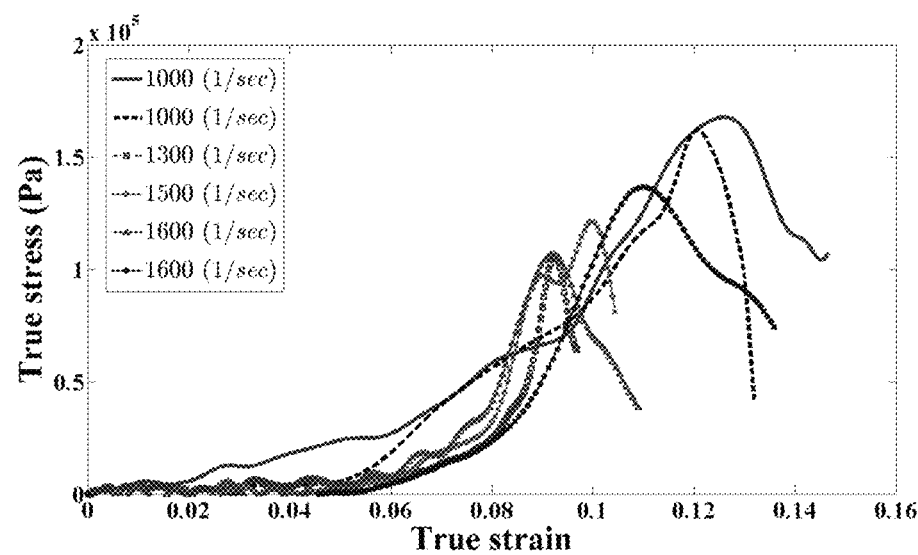
FIG. 15 illustrates the dynamic compression true stress-true strain curves of A7C gel (strain rates detailed in the key).

Dynamic Compression:

The force histories shown in FIG. 14 indicate satisfactory dynamic force equilibrium. Therefore, the strain can be reliably calculated using the reflected signal Cr. In a few cases where a satisfactory state of dynamic equilibrium was not achieved (due to the gel's acoustic impedance and high attenuation), the stress strain curves were compared to experiments showing satisfactory dynamic force equilibrium (in order to assess a good fit). FIG. 15 shows the representative true stress true strain curves and the span (scatter) of failure strains for tests carried out at relatively similar strain rates.

Comparison Between Static and Dynamic Compression

Figure 16:
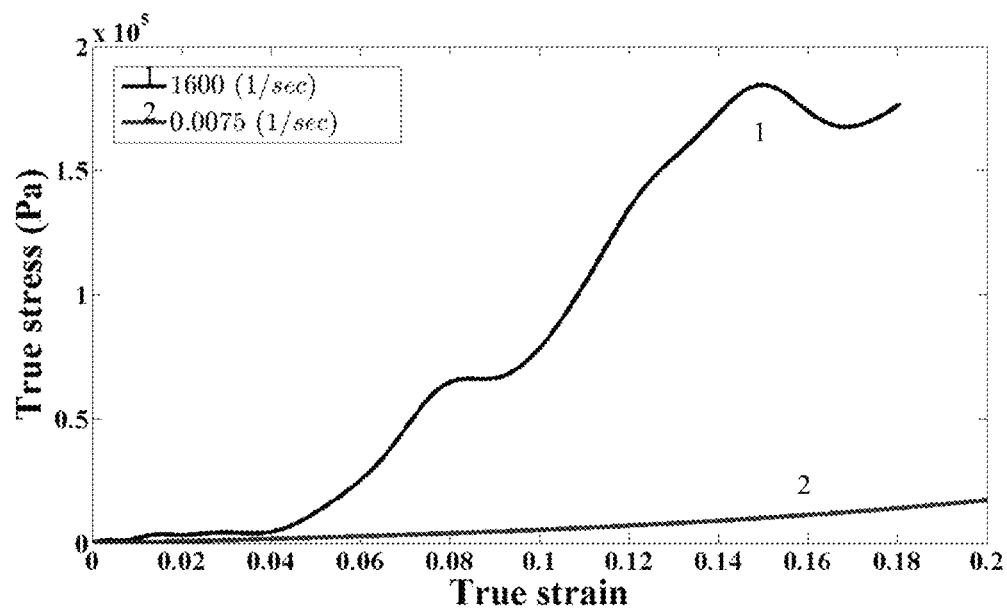
FIG. 16 illustrates the dynamic flow curves for A7C gel comparison between dynamic (black line) and quasi-static (red line) compression at 80° C. (strain rates detailed in the key).

FIG. 16 demonstrates the flow stress increase of A7C gel by 600% at a strain of 4.5% up to an increase of 1800% at a strain of 15% by dynamic compression compared to the quasi-static loading.

Example 3

The Additives' Effect on Methyl Cellulose Gels Characterized by Quasi-Static Compression Experiments Materials and Methods:

Quasi-static experiments were conducted on 4.4% of MVMorA7C by weight with and without polyvinyl alcohol (PVA), a polymer additive, in gr per 5 ml of solution. The mechanical properties of MVM were also evaluated by increased concentrations of PVA polymer.

In addition, several types of particles at different concentrations were examined as additives to A7C by quasi-static and dynamic compression experiments including silica particles with diameter of 0.063-0.200 mm, fumed silica (aerosol 200 and 300), aluminum nanoparticles with diameter of 70 and 100-200 nm, micro-sized rhombohedral boron carbides ($B_4C$) with diameter of ~0.7 μm—abbreviated henceforth as "fine boron carbides", "fine BC" or "FBC" and $B_4C$ nanoparticles with diameter of 45-55 nm (99+%, hexagonal, from US Research Nanomaterials, Inc.)—abbreviated henceforth as "nBC" or "nano BC".

A combination of 50% of corn flour with 5.3% A7C by weight was also tested as additive. Corn flour is a starch and as hear thickening fluid (STF) that characterized by its ability to increase viscosity (abbreviated henceforth as STIFF).

All experiments were conducted at 70-80° C.

Figure 17:
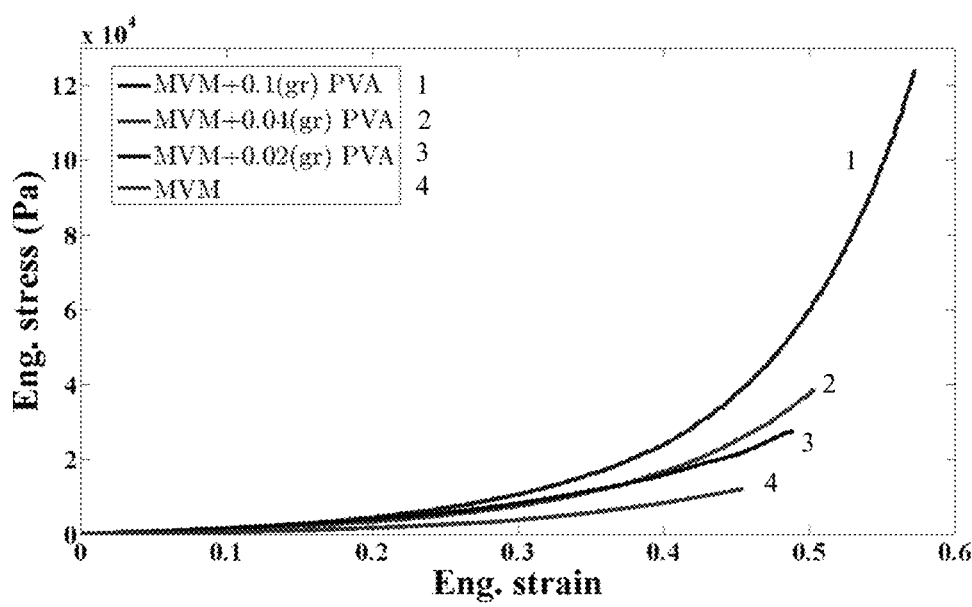
FIG. 17 illustrates engineering stress-strain curves of 4.4%, by weight, of MVM (type A15C) with and without PVA (polyvinylalcohol) (weight per 5 mL solution) as additive on gel flow-stress at different concentrations of PVA within the quasi-static loading regime at 80° C.
Figure 18:
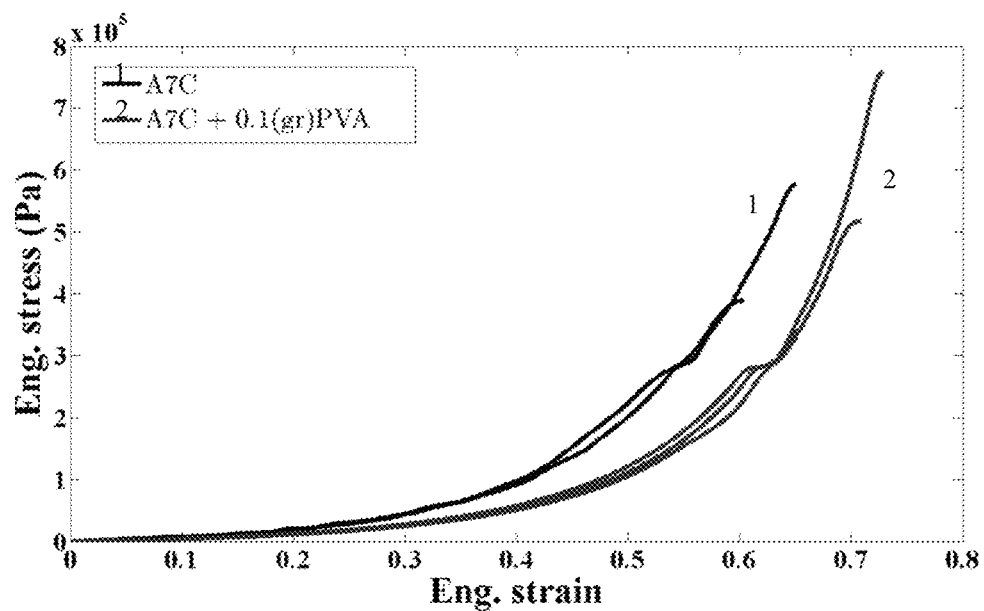
FIG. 18 illustrates engineering stress-strain curves of A7C with and without PVA as additive (0.1 g per 5 mL solution) on gel flow-stress within the quasi-static loading regime at 80° C.

Results:

Interestingly, although according to FIG. 17, PVA increased flow stress for MVM, it decreased the flow-stress of A7C, as shown in FIG. 18.

Example 4

Figure 19:
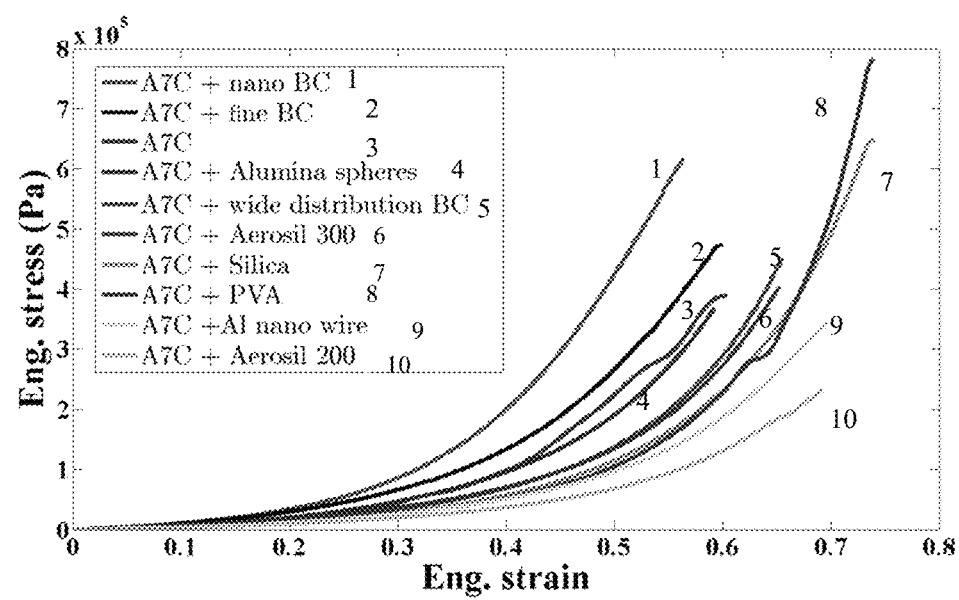
FIG. 19 illustrates engineering stress-strain curves of A7C with and without different types of particles on gel flow-stress within the quasi-static loading regime at 80° C.
Figure 20:
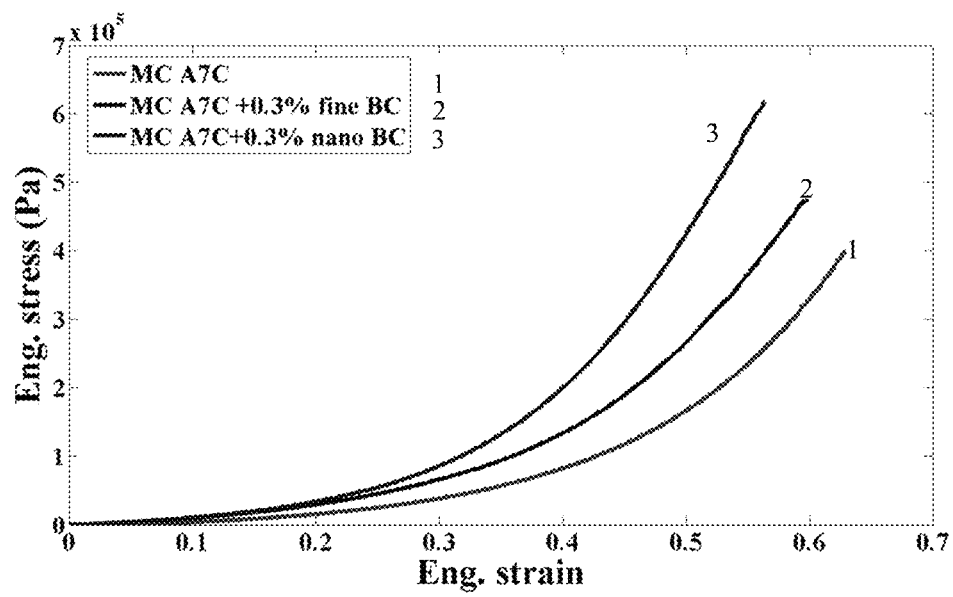
FIG. 20 illustrates engineering stress-strain curves of A7C with varied sizes of boron carbides particles compared to A7C alone on gel flow-stress within the quasi-static loading regime at 80° C.
Figure 21:
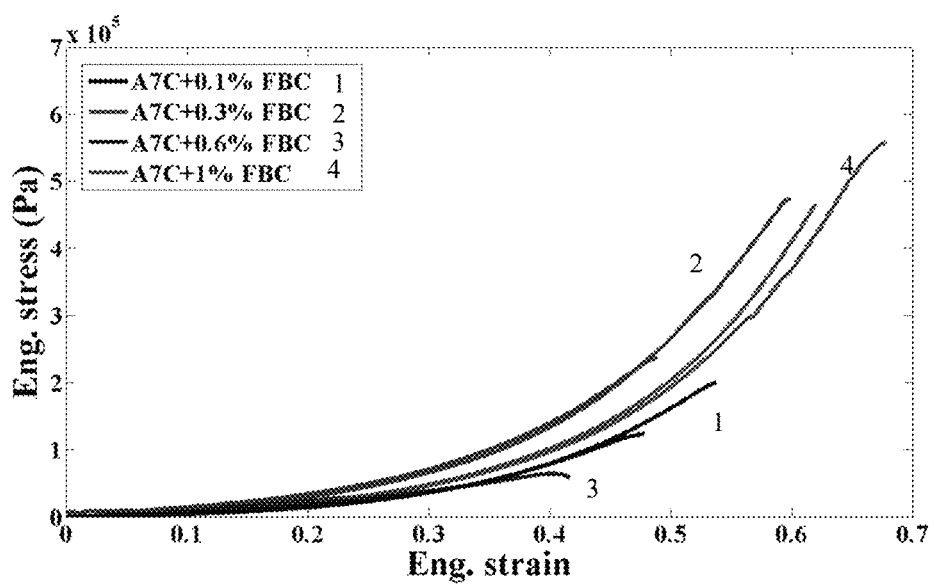
FIG. 21 illustrates engineering stress-strain curves of A7C with varied concentrations of micrometer-sized boron carbides particles ("FBC") on gel flow-stress within the quasi-static loading regime at 80° C.

Nano Boron Carbide Particles as Additives in the Composite, and their Effect on Methyl Cellulose Gels Characterized by Quasi-Static and Dynamic Compression Experiments FIGS. 19-20 show that $B_4C$ particles (nano or micro sized) addition to A7C had the largest increase of the flow stress. Among the specific concentrations examined of micro-sized $B_4C$, a weight of 0.3% showed the highest rigidification, as demonstrated in FIG. 21.

FIG. 20B presents characteristic stress-strain curves for quasi-static ($7.5 \cdot 10^{-3}$ sec$^{-1}$) compression of pristine MCH (5.6% wt. MC in water, black curve) and boron carbide-methyl cellulose BC-MC composite gels with various sized BC particles (5.6% wt. MC, 0.3% wt. BC particles, in water), at 80° C. While composites based on BC particles with a wide distribution of sizes, from ~1 μm to ~0.1 μm, failed to improve the flow stress compared to non-composited MCH, narrowing the particle size distribution shows noticeable improvement. Since nano sized BC particles with an average size of 50 nm, showed better improvement than larger, sub-micronic particles, composites based on these particles (nBC-MC) were focused upon for further study.

Moreover, FIGS. 20 and 22 demonstrate that effect of $B_4C$ nanoparticles. Therefore, the dynamic compression of a composite of A7C and 0.3% weight $B_4C$ nanoparticles was examined.

Comparison of the stress-strain curves shows that under dynamic compression conditions, nBC-MC gels display a very sharp rise in flow stress, starting from an early strain of ~5%. The strain hardening slope (dσ/dε) is about 38.7 MPa, and the peak stress is achieved at ~7% strain, with a stress of ~500 kPa. In contrast, pristine MCH shows significantly weaker dependence on strain, with a strain hardening slope of about 1.6 MPa. It reaches a peak stress at a strain of ~15% with a stress of ~200 kPa. It is noted that the increased dynamic strength is accompanied by a significant reduction in ductility of the material.

Figure 23A:
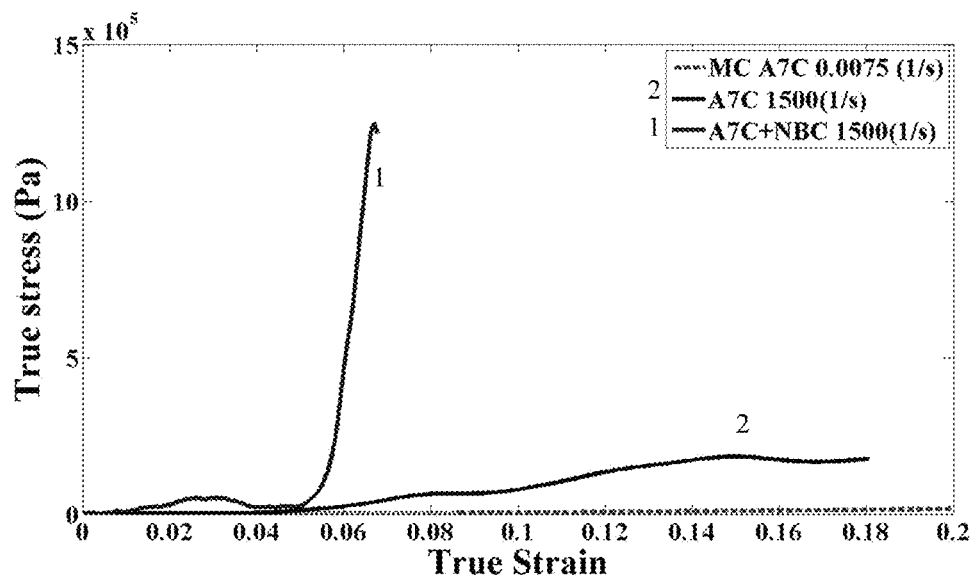
FIG. 23A-D illustrate: curves of: A7C gel with and without 0.3% weight of nano-meter sized boron carbides particles, compared to the non-composite A7C gel at quasi-static compression at 70° C. (strain rates detailed in the key), and at 1500 (FIG. 23A) and 1700 sec$^{-1}$ at 80° C.

FIG. 23A illustrates its increase flow-stress by 2400% at a strain of 1% and up to an increase of 44700% at a strain of 6%, in comparison to the A7C hydrogel alone, non-composite. Both solid states were examined at 70° C., under a strain rate of 1500 l/sec.

Figure 23B:
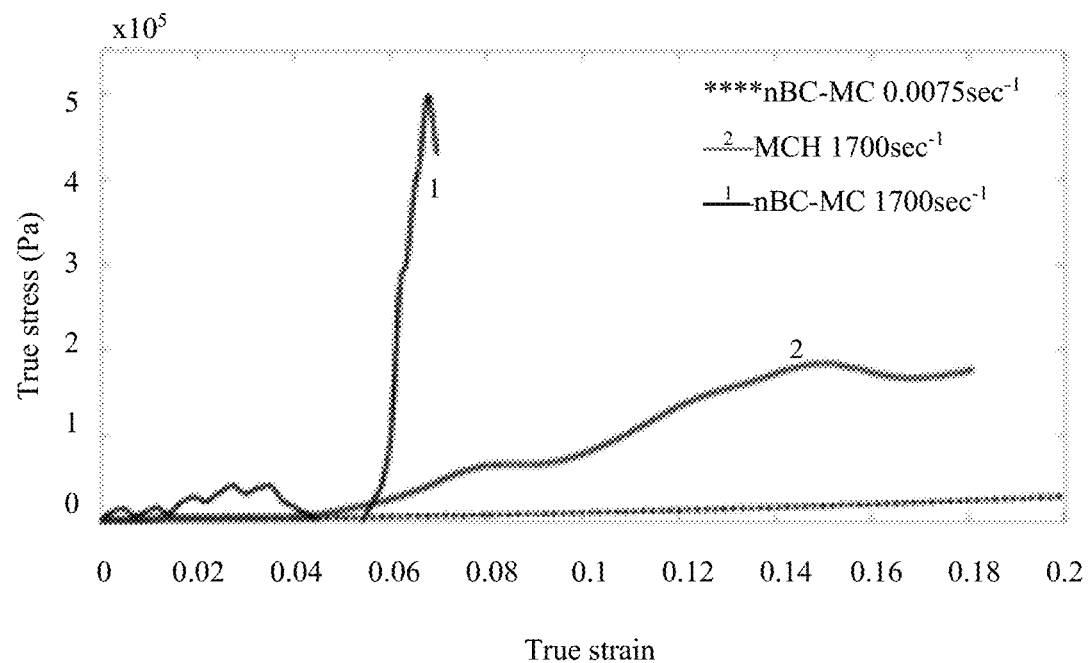
Figure 23C:
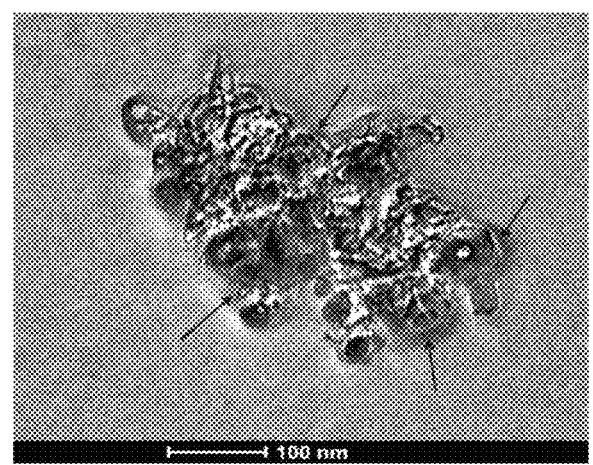
Figure 23D:
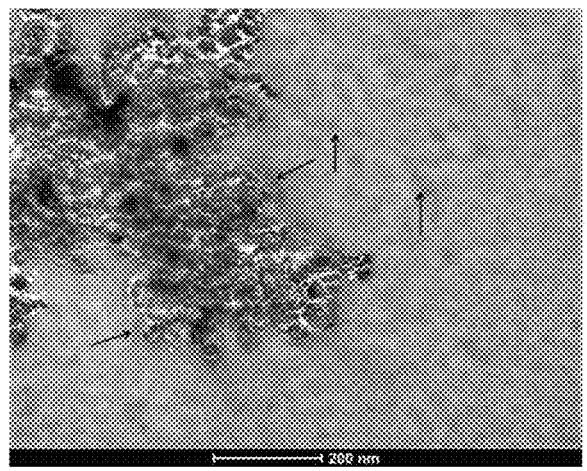

FIG. 23B presents characteristic stress-strain curves for quasi-static ($7.5 \cdot 10^{-3}$ sec$^{-1}$) and dynamic (1,700 sec$^{-1}$) compression of pristine (5.6% wt. MC in water) and nBC-MC composite gel (5.6% wt. MC, 0.3% wt. nano-BC in water), at 80° C.

The extreme enhancement in mechanical properties due to the addition of only 0.3% wt. of nanoparticles is surprising. Noticeable effects on mechanical properties are normally achieved only at significantly higher particle concentrations.

It surmised, without being bound by any particular theory, that if the nano-BC particles interact with critical sites in the gel structure, such as fibrillar nodes or intersection sites of different fibrils, they could affect the macro-sized structure in a sufficiently significant manner. From a supramolecular chemistry approach, such particle-polymer interactions likely involve interactions between lone pair electrons of oxygen atoms in the polymer with the empty orbitals of boron atoms on the surface of BC particles. Evidence of such attractions within the composite was searched using cryo-TEM to study a dilute composite gel (1% wt. MC, 0.05% wt. nano-BC in water). This provided a direct visualization of particle-polymer interactions, see FIG. 23C-D.

Using the free fibrils within the gels as reference, the considerably darker register of the outline of the nano-BC aggregate in the cryo-TEM images signifies dense MC structures. This is even more conspicuous in light of the use of phase plates in the imaging, which generates brighter outlines around distinctive features. Although the images provide evidence of the MC interacting with the external surface of the aggregate, it is possible that the polymers are also present within it, between the nano-BC plates. Since MC is a polysaccharide with only partial methylation of its hydroxyl groups, even when it assumes folded polymer structures, as is currently thought to be the case in fibrils, it should have numerous sites capable of interacting with the nano-BC particles.

Further support for this interaction is found in the control experiments performed to examine the stability of the BC-MC solutions. Samples of the composites were left in refrigeration (4-8° C.) for at least two weeks. After heating the sample to beyond its gelation temperature (80° C.) in a vial, the resulting cylindrical gel was extracted and cut across the equator. Each of the portions, upper and lower, were studied under quasi-static mechanical compression, and showed no difference in mechanical properties between the portions.

FIG. 24A shows that the stress-flow curve of a composite of A7C with corn flour as additive (50% weight), for purpose of shear thickening behavior, was similar to the curve of A7C alone, in the quasi-static regime (these rates are below the onset of shear thickening). This composite, despite the large weight percentage of the additive, still has the behavior of an inverse-freezing material (gelates upon heating).

Example 5

Improvement of STF Shock Mitigation by Incorporation of Inverse-Freezing Materials In additional exemplary procedures it was demonstrated that shear thickening fluids show very little attenuation of shocks (FIG. 24B)—2 cm thick solution of 106 g cornstarch with 100 mL water shows 4% reduction of maximum amplitude of forces. However, their combination with even small percentages of IF-enabling components leads to significant shock attenuation.

In additional example, 129 g cornstarch mixed with 120 mL. 3% aq. methylcellulose solution leads to a shear-thickening inverse-freezing solution. The shock attenuation of this composite fluid at a 2 cm. thickness is found to be 56% reduction of maximum amplitude of forces. The shock attenuation of this composite fluid is demonstrated in FIG. 24C.

Example 6

Temperature-Dependent Attenuation Effect of Methyl Cellulose

Figure 25A:
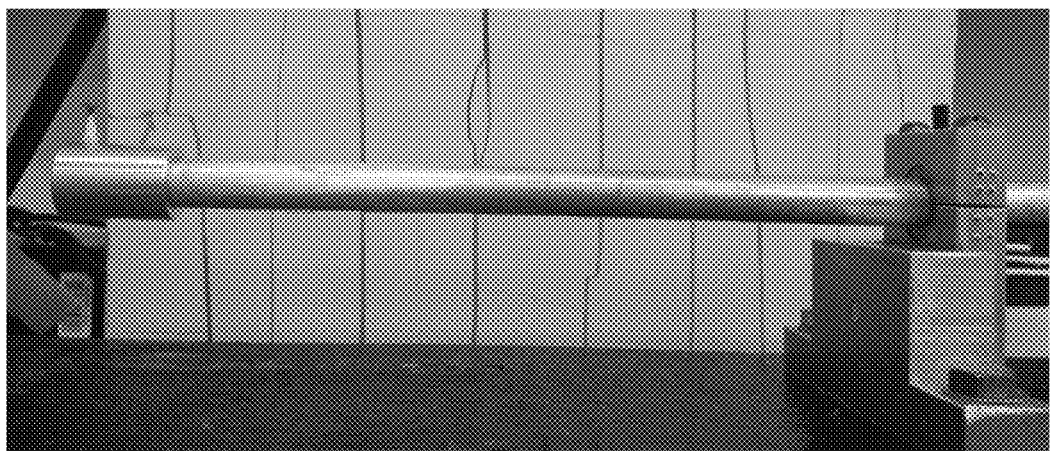
FIGS. 25A-25C present the one-bar and sealed cup experimental setup for mechanical dynamic impact in a confined-setting measurement (FIG. 25A) and a close-up of the opened aluminum cup filled with dilute MVM (FIG. 25B), liquid state (sealing O-ring also apparent).
Figure 25B:
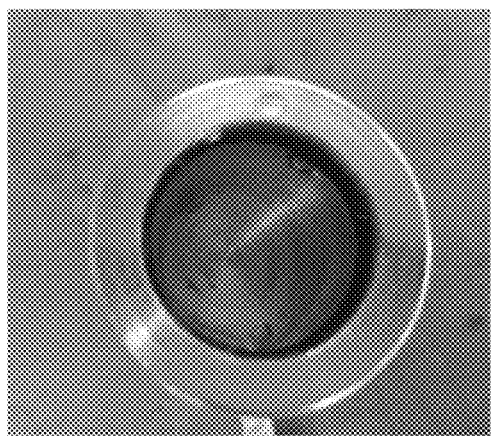
Figure 25C:
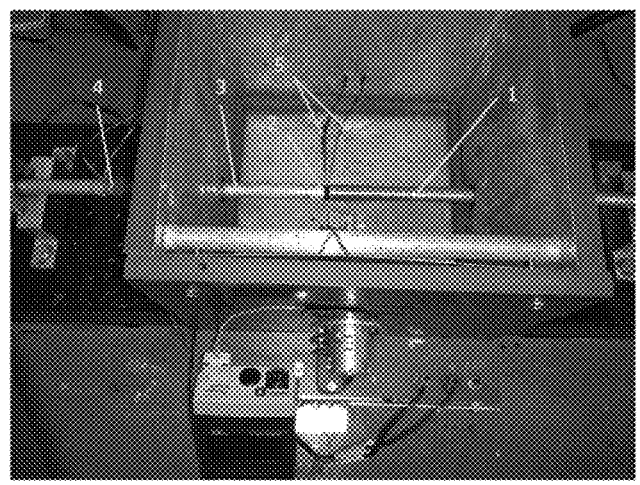

Materials and Methods:
The inverse freezing material is liquid in room-temperature and because some of the applications are shock absorbers or armor components in their ambient-temperature, liquid states, the following experiments were conducted. The material was confined into a small metal chamber and then, under confinement, was subjected to a mechanical impact using a one bar Hopkinson setup made of 7570-T6 Aluminum alloy, as shown in FIGS. 25A-C. The energy loss (attenuation, or damping) caused by the confined liquid state was compared to water, after reduction of the experimental system's inbuilt loss was taken into account in both cases.

Figure 26:
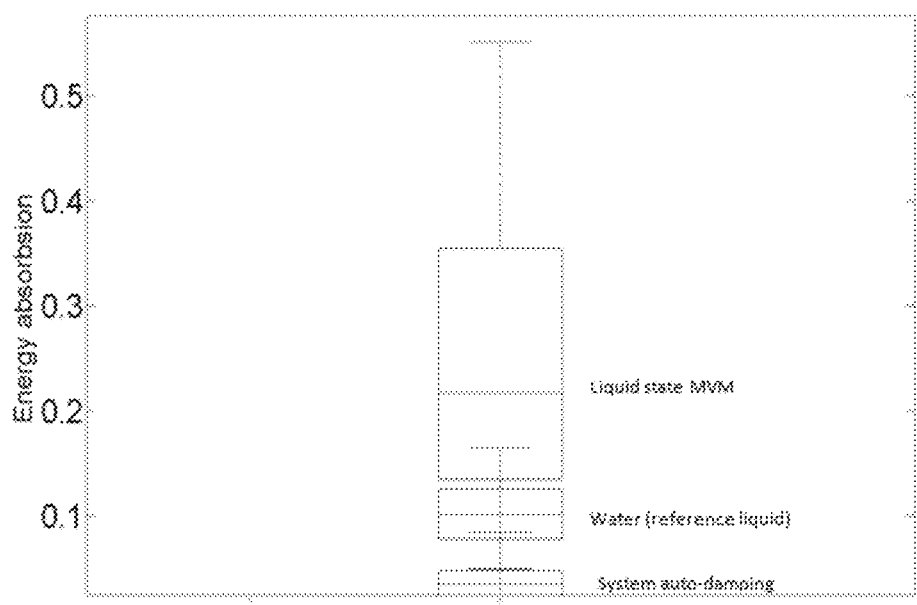
FIG. 26 presents a box-plot for energy absorption/dissipation results of mechanical impact in confined setting measurement, for dilute (3% weight) liquid state MVM at room temperature. The red line indicates average value, blue boxes enclose values within the 25 and 75 percentiles, and the black line indicates extremum values.

Results:
FIG. 26 demonstrates that diluted MVM (3% weight) had an energy loss of more than 120% compared to water according to 84 measurements of 41 specimens of MVM and 39 measurements of water (with system energy damping of 5% tested by 38 measurements), for impacts of 1000-2000 Newton at the peak and speed of 4-6 m/sec. Despite the large distribution of values for the sample, its improved energy damping is statistically significant. It is further noted that the optimal performance of the sample was when the energy loss values rise to over 50% compared to water (less than 10%), thus these samples have a 500% increase in mechanical impact energy damping. This finding shows that even at relatively low polymer concentrations in the hydrogel, the liquid state of this inverse-freezing material is capable of high energy dispersal/absorption/mitigation of dynamic impacts, at ambient temperatures (these measurements were performed at 20-25° C.

Figure 27:
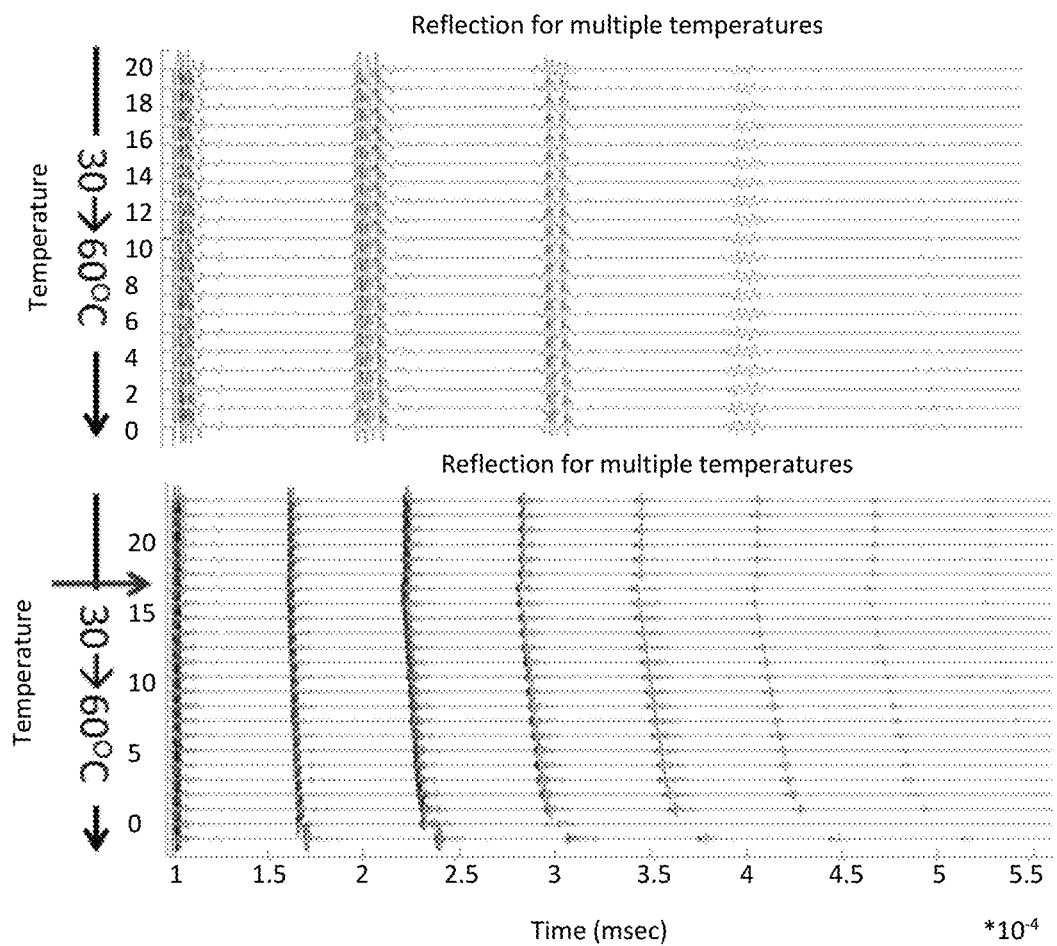
FIG. 27 presents the temperature-dependent reflectance patterns and times for ultrasonic signals travelling through a medium. Top—ballistic gelatin; bottom—A7C. The red arrow indicates the gelation temperature.

FIG. 27 illustrates the A7C ultrasonic wave velocity changes from 1607 to 1699 m/sec when the temperature rises from 14° C. to 80° C. Such temperature-dependent behavior can be discerned when examining the reflection pattern of the signals travelling within a sample—clear changes in reflectance to reflectance durations can be seen with temperature variation, especially around the gelation temperature. Such dependence is not discernable in ballistic gelatin, for example, under the same conditions.

Figure 28:
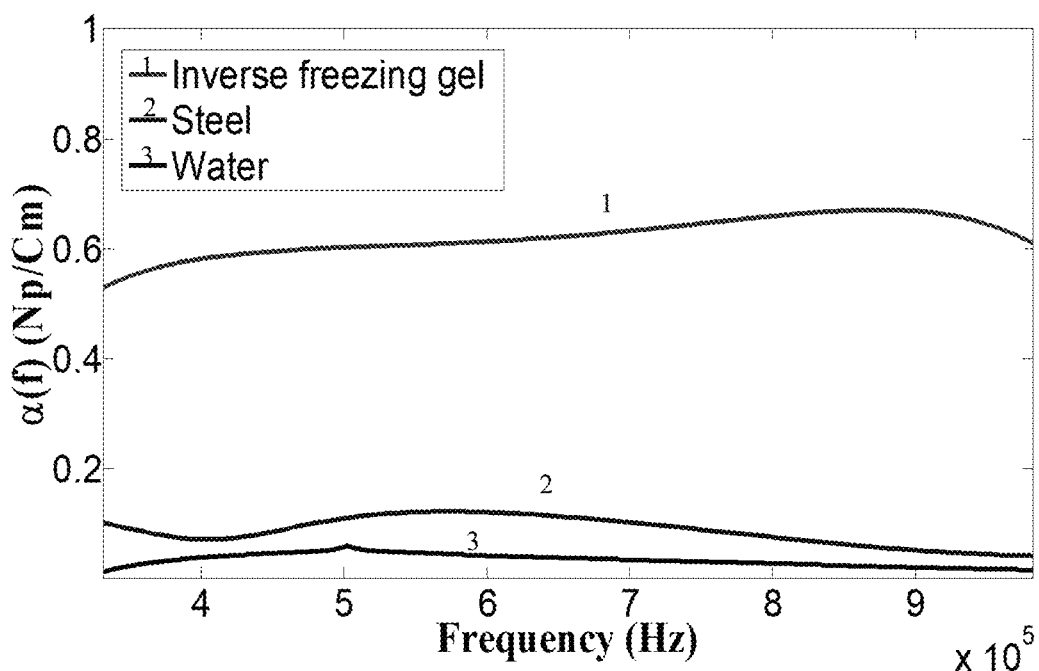
FIG. 28 illustrates the comparative attenuation coefficients of MVM inverse-freezing gel, steel and water, over a frequency range of ~400 kHz to 1 MHz.
Figure 29:
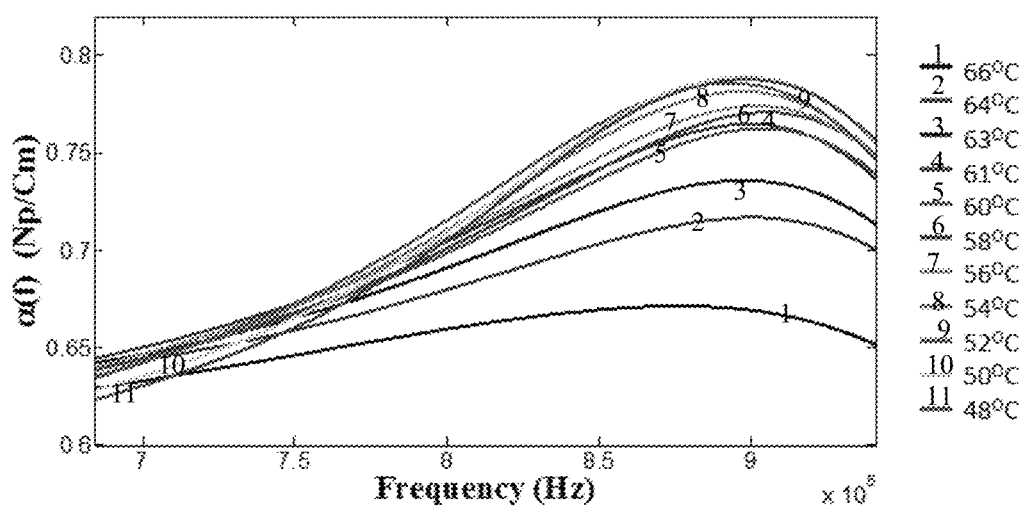
FIG. 29 illustrates the temperature-dependent attenuation coefficient values for A7C over a frequency range of ~700 kHz to 1 MHz.

The temperature attenuation coefficient of liquid and solid A7C ranges between 0.4-0.55 Np/Cm at frequencies of 400 KHz to 1 MHz as shown in FIGS. 28-29. The attenuation of these frequencies is a challenging task currently, and even the modern armors have lower attenuation coefficients than this. For comparison, the attenuation coefficient of water at these frequencies is twenty times smaller than that of A7C.

Example 7

Shock Testing Systems and Shock Attenuation of Inverse-Freezing Materials

Figure 32A:
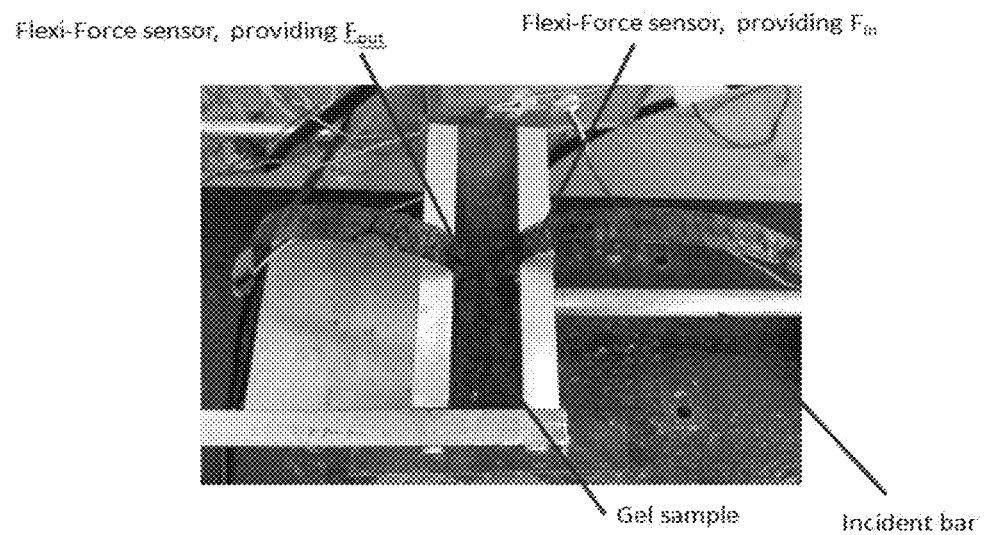
FIGS. 32A-32B present photographic images and visual description of a disclosed system in an embodiment thereof: a general structure of the experiment system viewed from above, with some components specified (FIG. 32A), and general side view of the system, more clearly showing the inverse-freezing material filling within its chamber (the yellow-brown conductors are those of the force-sensors) (FIG. 32B).
Figure 32B:
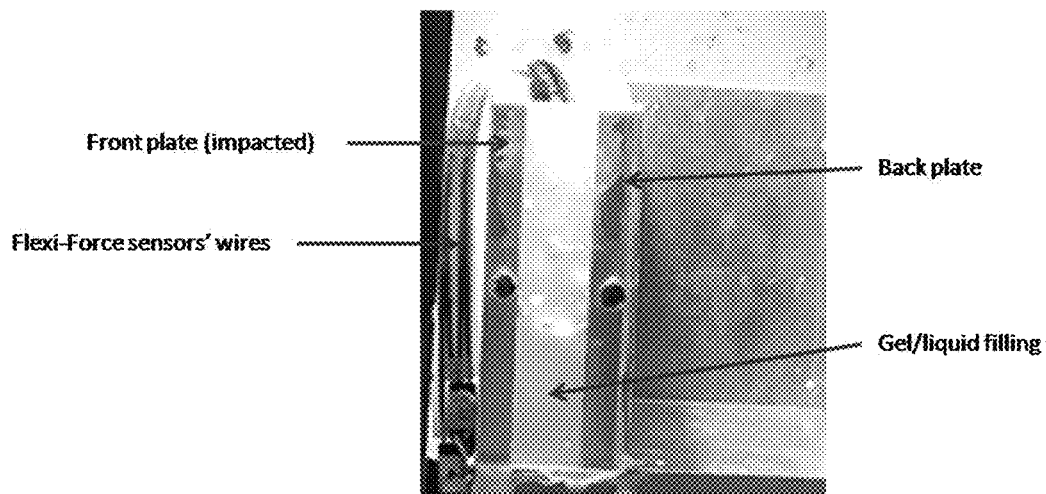

In exemplary procedures, the testing system included a Hopkinson Bar dynamic system with strain gauges on the bar and a box whose front was a metal plate fixated perpendicularly to the impact bar which impacts it from the front. Behind the metal plate a rectangular chamber holds varying thicknesses of the inverse-freezing liquid, or water as reference. The width of the gap between the front plate and the back wall can be adjusted, thus enabling to study the response of different thicknesses of the inverse-freezing fluid. Force sensors were installed to sandwich this liquid layer from its front (set on the backside of the front metal plate)—providing a reading of the force signal entering the layer due to impact on the front plate, and on its back (set on the front of the hind wall)—providing a reading of the force signal that passed through the liquid. This latter simulates the force that would hit a wearer of an armor comprising a front, projectile-penetration preventive hard layer, and second, shock attenuating layer closer to the wearer's body. FIGS. 32A-B provide a visual description of the system.

FIG. 32A presents a general structure of the experiment system viewed from above, with some components specified. FIG. 32B general side view of the system, more clearly showing the inverse-freezing material filling within its chamber (the yellow-brown conductors are those of the force-sensors).

Results

Impact Forces and Impulses

In some experiments, the impactor driving pressure of 1.5 bar provided a maximum force amplitude of 10,000 Newton. In another, the impactor driving pressure of 4 bar provided a maximum force of 20,000 Newton. This provides impact impulses that are in the range of 40-75% of those of a 5.56 mm bullet fired from an M4 assault rifle impacting a target at a range of 50 m.

Figure 33A:
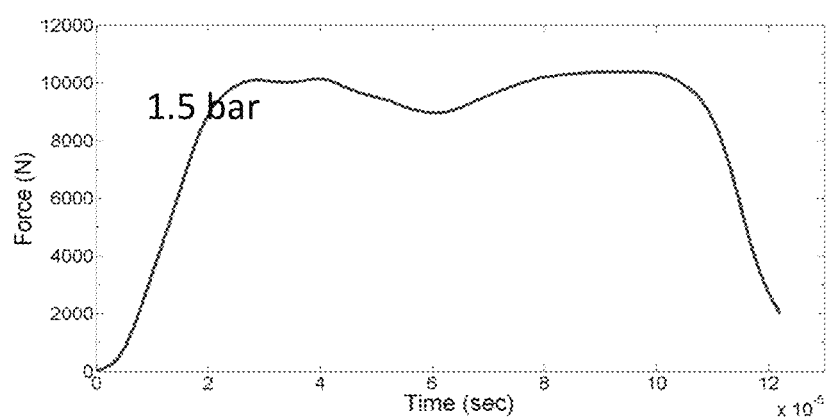

FIGS. 33A-B present force amplitude graphs measured for two different impactor driving pressures (specified at the upper left corner in each graph).

Attenuation of the Impact Forces Applied to the Layer

Figure 34:
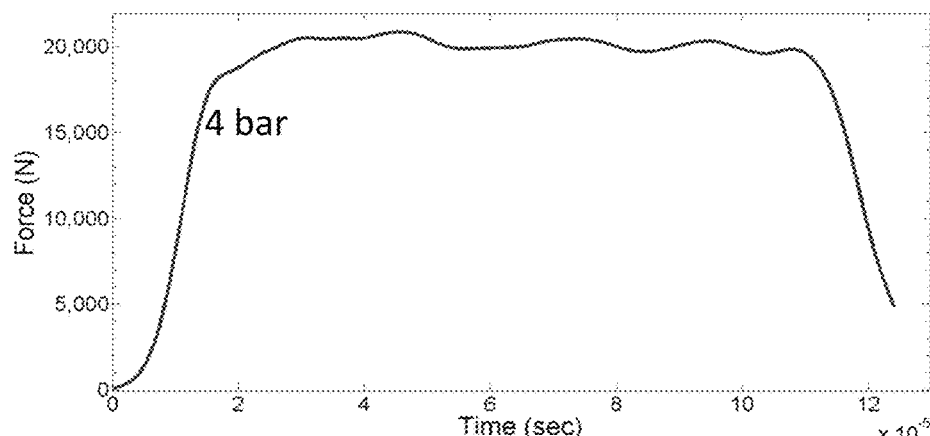
FIG. 34 presents force amplitude graphs impact forces entering the layer, in water (red) and a 10% w/w aqueous methylcellulose solution, at room temperature.
Figure 34:
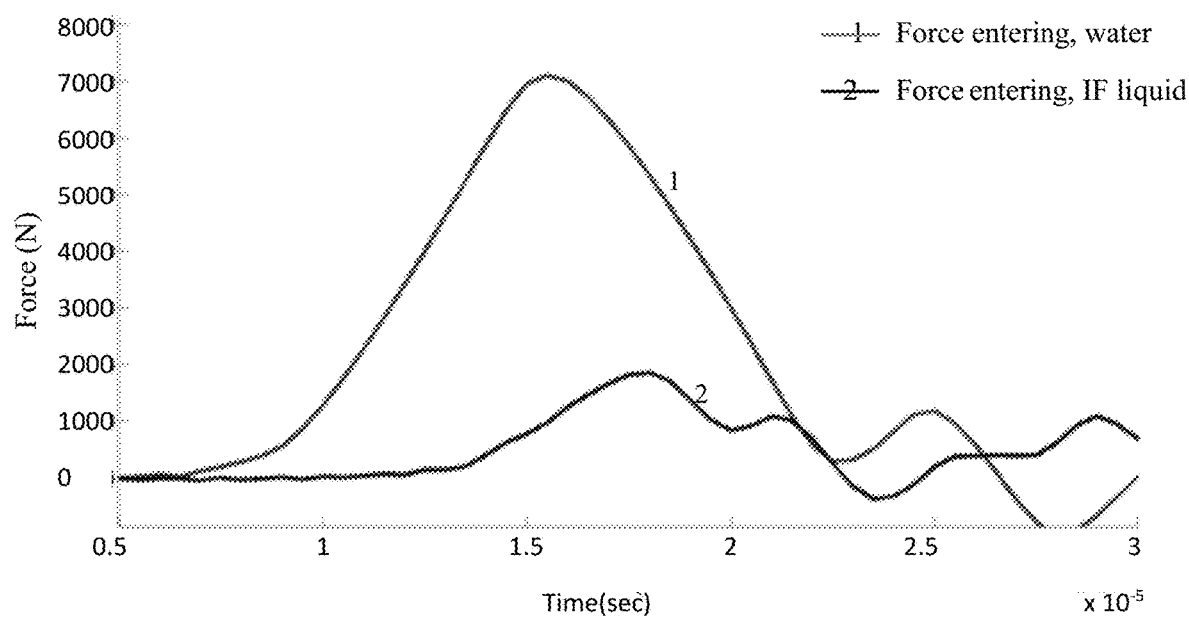

The inverse freezing materials were found to have immediate attenuation of the applied forces, in addition to the attenuation of propagating stress loads (discussed in the following sections). For example, for a maximal force amplitude of 20,000N (see profile in the graph of FIG. 33A) a 5% w/w aqueous methylcellulose solution mitigates the incoming force of the impact 3.5 times better than water. Details are provided in FIG. 34 showing that even at small thicknesses, these materials provide attenuation for incoming impacts.

Attenuation Performance of a 5% w/w Methylcellulose Aqueous Solution

The performance of a 5% w/w methyl cellulose aqueous solution at room temperature (the inverse freezing material is thus in its liquid state) was compared to that of water, both at 2 cm. thickness.

Figure 35A:
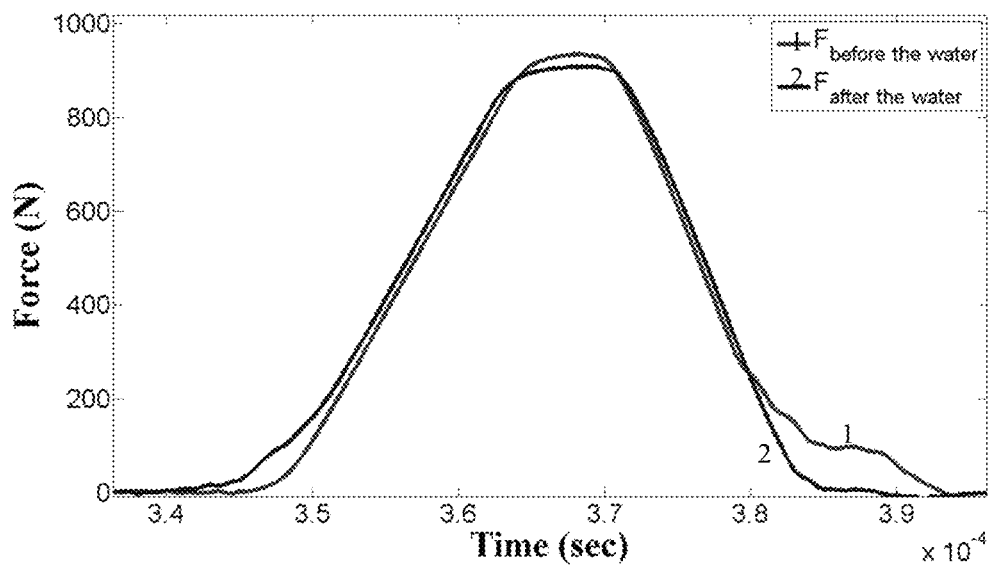
FIGS. 35A-35B present graphs impact force mitigation of water (FIG. 35A) and a 5% w/w aqueous methylcellulose solution (FIG. 35B), at room temperature. A shift on the time-axis for the readings of the hind sensor (measuring the force passing through the investigated material) was performed so that both maxima have the same time value, for visual aid of the comparison of force profiles.
Figure 35B:
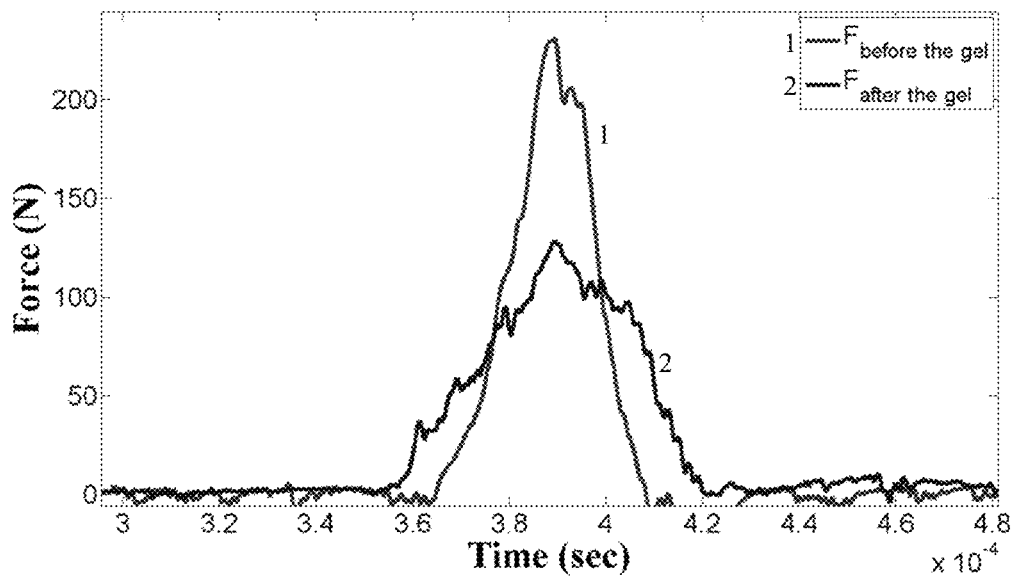

Comparison of the force signals incoming into the material with those passing through the material show a 45% percent reduction of the maximum amplitude of the force, and a ~40% reduction of the impulse. In comparison, water alone shows 2.9% reduction of the maximum amplitude of the force, and a ~3% reduction of the impulse. FIGS. 35A-B provide the comparison data.

Figure 36A:
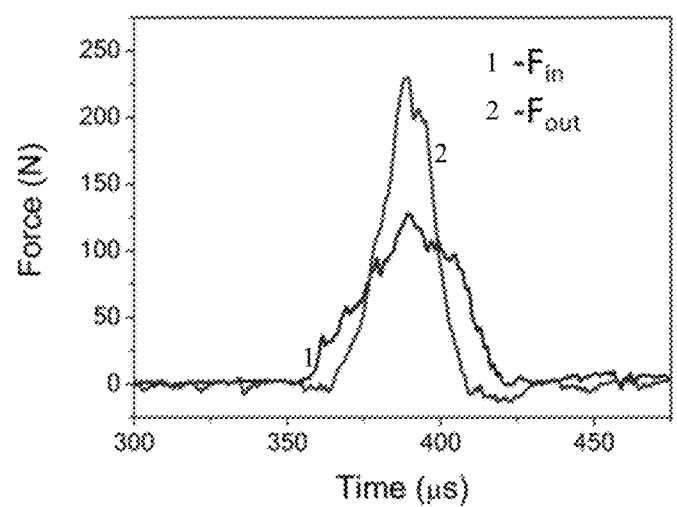
FIGS. 36A-F present graphs showing the reduction of maximum force amplitudes of a 2 cm thick of inverse freezing fluid: 5% aq. methylcellulose solution (FIG. 36A); water (FIG. 36B); 5% ballistic gelatin solution (FIG. 36C); and 1 cm thick of: 5% aq. hydroxypropyl methylcellulose solution (FIG. 36D); composite methylcellulose-poly(2-oxazole) (FIG. 36E); and comparing to 1 cm thick composite methylcellulose-nano boron carbides (FIG. 36F).
Figure 36B:
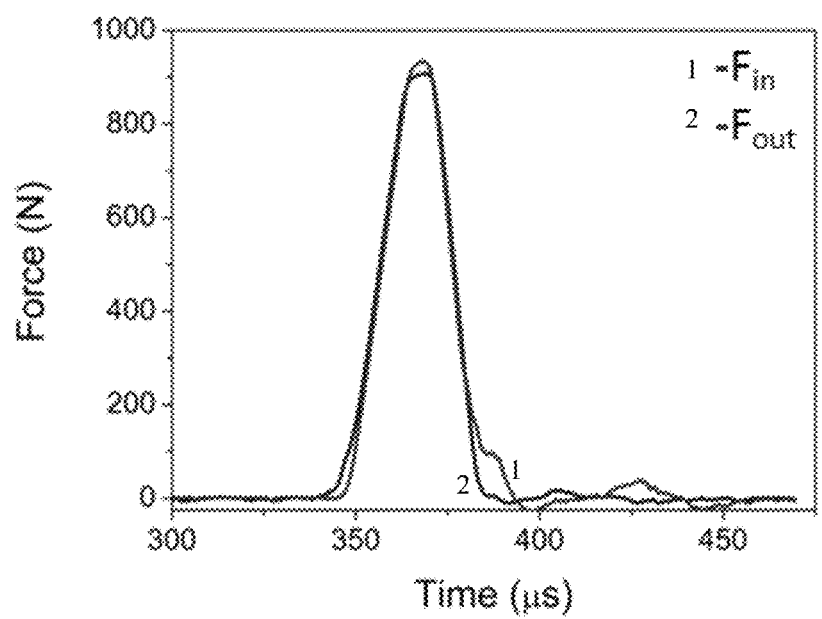
Figure 36C:
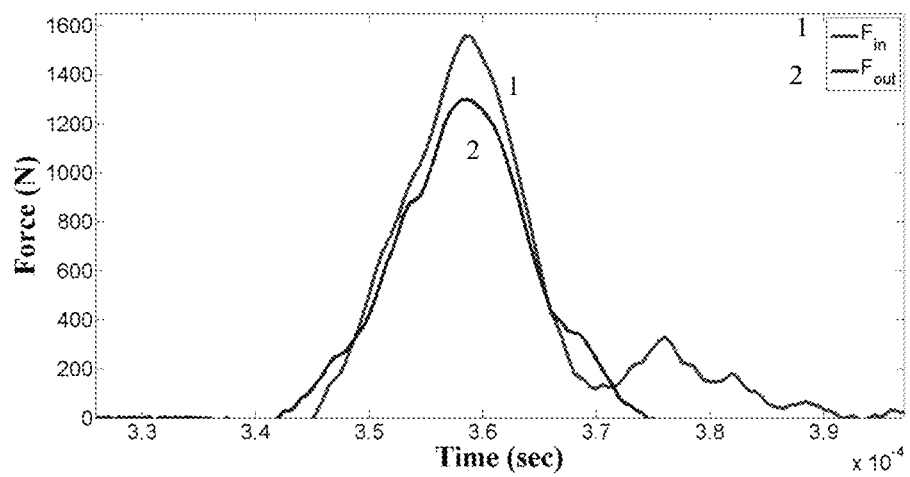

In additional exemplary procedures, 5% wt. aq. methylcellulose, the shock attenuation based on maximum forces' amplitude was measured before and after the medium, denoted as Fin as Fout (FIG. 36A). Attenuation of 45% of maximum amplitude of forces passing through 2 cm of the material was found. This is in comparison to water (FIG. 36B) which showed (using the same setup and 2 cm thickness) attenuation of 3% of maximum amplitude of forces, and 5% wt. aq. ballistic gelatin (bloom 300) with the same setup and 2 cm thickness which showed attenuation of 17% of impact forces (FIG. 36C).

Figure 36D:
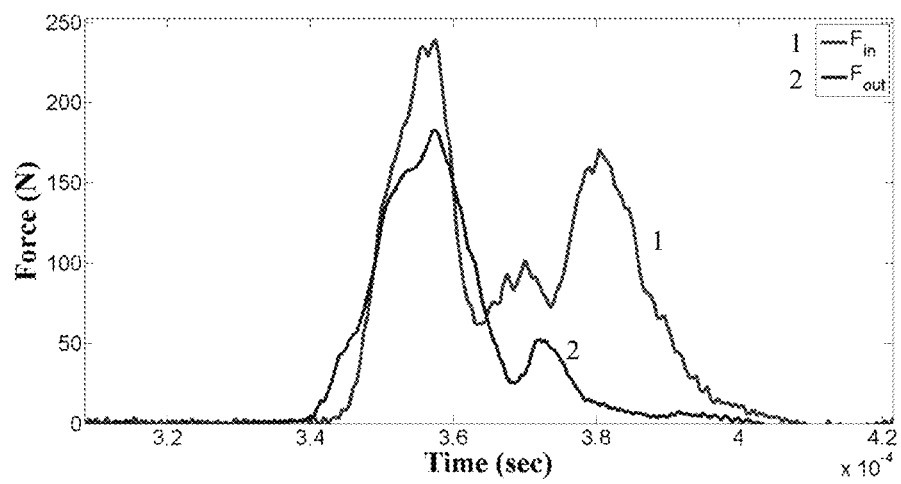

In additional exemplary procedures, a composite comprising 1 cm thick 5% wt. aq. hydroxypropyl methylcellulose was tested for attenuation based on Fin vs. Fout of impact (FIG. 36D). Attenuation of 20% of maximum amplitude of forces passing through the material was found.

Figure 36E:
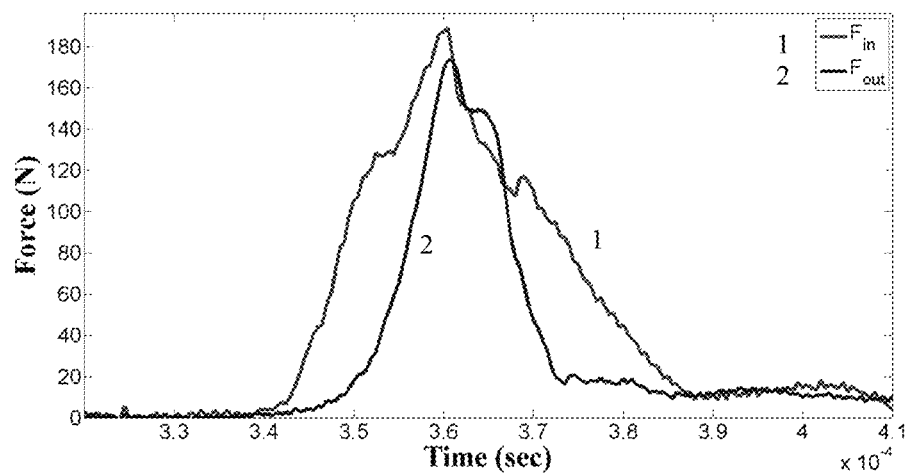

In additional exemplary procedures, a composite of 1 cm thick 5% wt. aq. methylcellulose and 5% wt. poly(2-ethyl-2-oxazoline) was tested for shock attenuation based on Fin vs. Fout amplitudes (FIG. 36E). Attenuation of 8% of impact forces passing through the material was found.

Figure 36F:
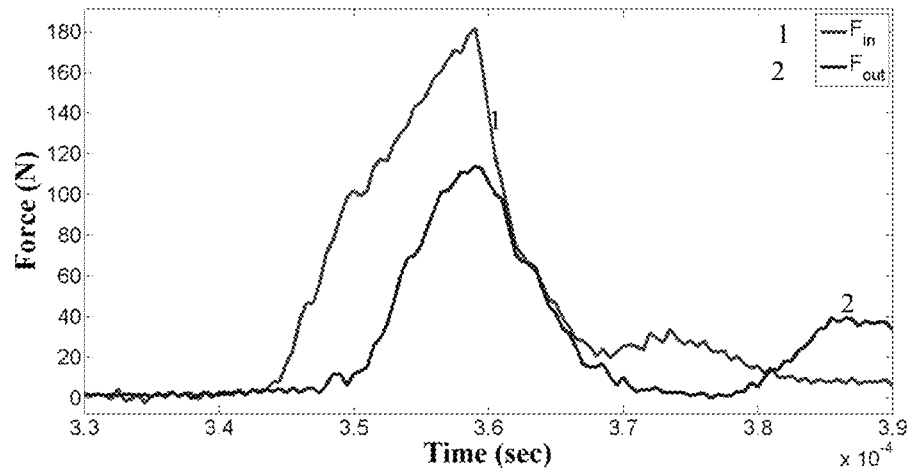

In additional exemplary procedures, a composite of 1 cm thick 5% wt. aq. methylcellulose and 0.3% wt. nano Boron Carbides was tested for attenuation based on Fin vs. Fout of impact (FIG. 36F). Attenuation of 33% of maximum amplitude of forces passing through the material is found.

Additional exemplary procedures aimed at using inverse-freezing materials and composites as shock-absorbers/attenuators due to phase transformations at the interface with impacted/impacting material, such as a hard front plate or hard elements within the material.

It is noteworthy, without being bound by any particular mechanism, that this attenuation is a property of the inverse freezing material and is not simply a matter of wave reflection due to acoustic impedance mismatch.

Figure 37A:
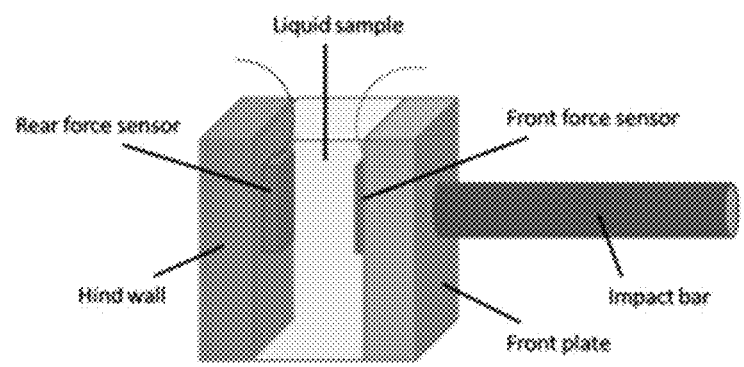
FIGS. 37A-37C present: Schematics of experiment system setup for measurement of shock reduction by examined liquids (FIG. 37A), Force amplitude of the striker in the experimental system (FIG. 37B); Force amplitude in the force sensor on the incoming side of the liquid, located behind the front plate, and comparison of water and IF liquid (FIG. 37C).
Figure 37B:
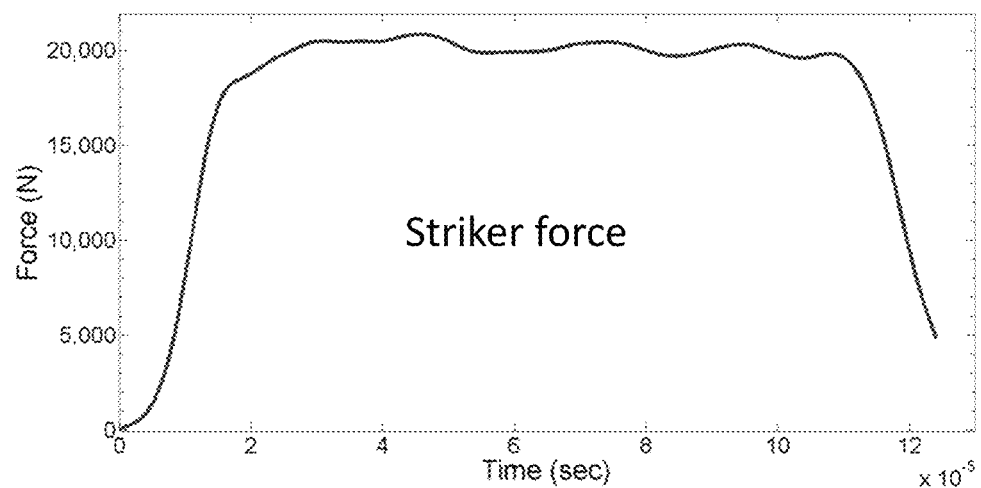
Figure 37C:
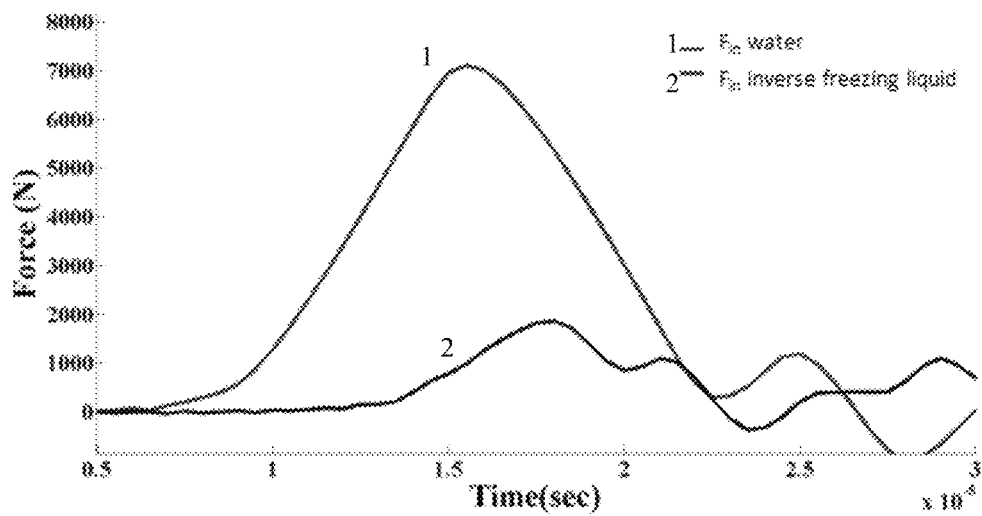

In exemplary procedures, incoming forces were applied on into 5% wt. aq. Methylcellulose. The attenuation was based on strain-gauge on impacting bar vs. Fin, when the 5% wt. aq. methylcellulose was coupled to an aluminum front plate, with the methylcellulose as a second layer in armor (FIG. 37A). Attenuation of 90% of maximum amplitude of forces entering the inverse-freezing material was found. This is in comparison to water (FIG. 37B-C; strain gauge forces, and performance of water vs. IF liquid, respectively). It was found that the inverse freezing liquid attenuated the maximum amplitude of incoming forces more than 3.5 times better than water—incoming forces of 2000 N vs. 8000 N respectively, for the same setup and forces of striker.

In additional exemplary procedures 2 cm thick sample of 5% wt. aq. methylcellulose attenuates shock the same as a 1 cm thick sample of 5% wt. aq., for the same shock, in the same experimental setup. Both attenuate 35-45% of maximum amplitude of forces Therefore, it seems that the inverse-freezing material or the composite's attenuation of shocks is not thickness-dependent (FIG. 37D, compare to FIG. 36A to see similarity).

Figure 38A:
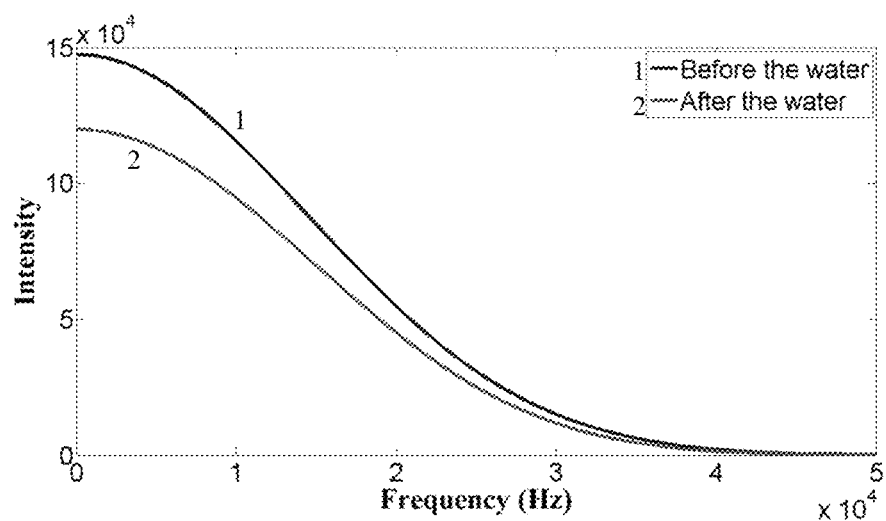

A spectral analysis providing data on the spectral attenuation shows that the inverse freezing solution provides nearly full attenuation of the frequencies above 20 KHz. Near 0 KHz the attenuation is about 20% and grows in size with increasing frequency. FIGS. 38A-B provide visual data.

Attenuation Performance of a 10% w/w Methylcellulose Aqueous Solution

The performance of a 10% w/w methyl cellulose aqueous solution at room temperature (the inverse freezing material is thus in its liquid state) was compared to that of water, both at 2 cm thickness.

Comparison of the force signals incoming into the material with those passing through the material show a 77% percent reduction of the maximum amplitude of the force, and a 69.5% reduction of the impulse. In comparison, water alone shows 2.9% reduction of the maximum amplitude of the force, and a 3.4% reduction of the impulse. In exemplary procedures, 2 cm thickness 10% wt. aq. Methylcellulose was used, and the shock attenuation based on Fin vs. Fout amplitudes before and after the medium was measured. Attenuation of 71% of maximum amplitude of forces passing through the material was found (FIG. 39).

Figure 40:
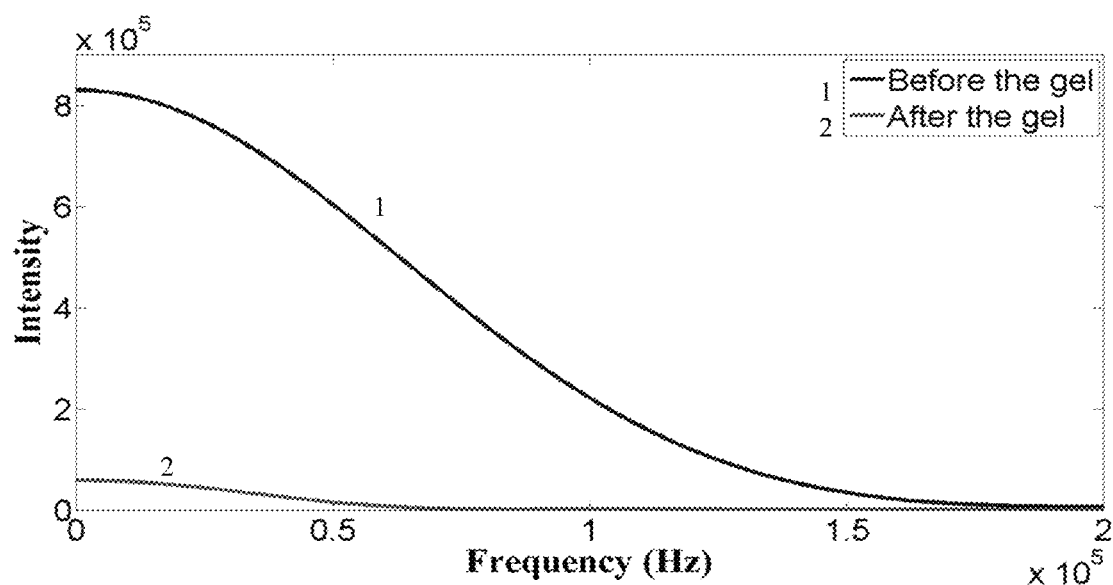
FIG. 40 presents graphs showing impact force mitigation of a 10% w/w aqueous methylcellulose solution, at room temperature, by frequency.

A spectral analysis providing data on the frequencies of attenuation shows that the inverse freezing solution provides nearly full attenuation for all impact frequencies. FIG. 40 provides the visual data.

High-Speed Photography

Figure 41A:
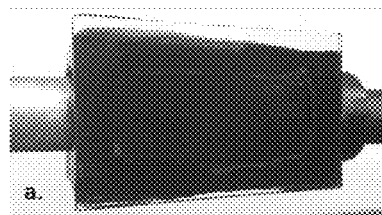
FIG. 41A-41B present: side view of the liquid-filled impact chamber (the impacting bar is on the right, and advances into the chamber upon impact) (FIG. 41A), and time-lapse pictures of: b-e: methylcellulose (AMC) 5.6% wt.; f-i: water, j-m: ballistic gelatin 5% wt. In all cases, $t_0$=time of impact on the liquid, sample temperature is 23±2° C.

Aiming to gain more in-depth understanding into how these materials achieve such efficient attenuation, high-speed photography was applied to follow the AMC solution as it responds to impact. A custom-made low reflectivity chamber, equipped with a transparent window and an orifice for the insertion of the Hopkinson impacting bar, was filled with the 5.6% wt. AMC solution. Control experiments were performed on water and on 5% wt. ballistic gelatin using the same cell and setup, see FIG. 41A.

Figure 41B:
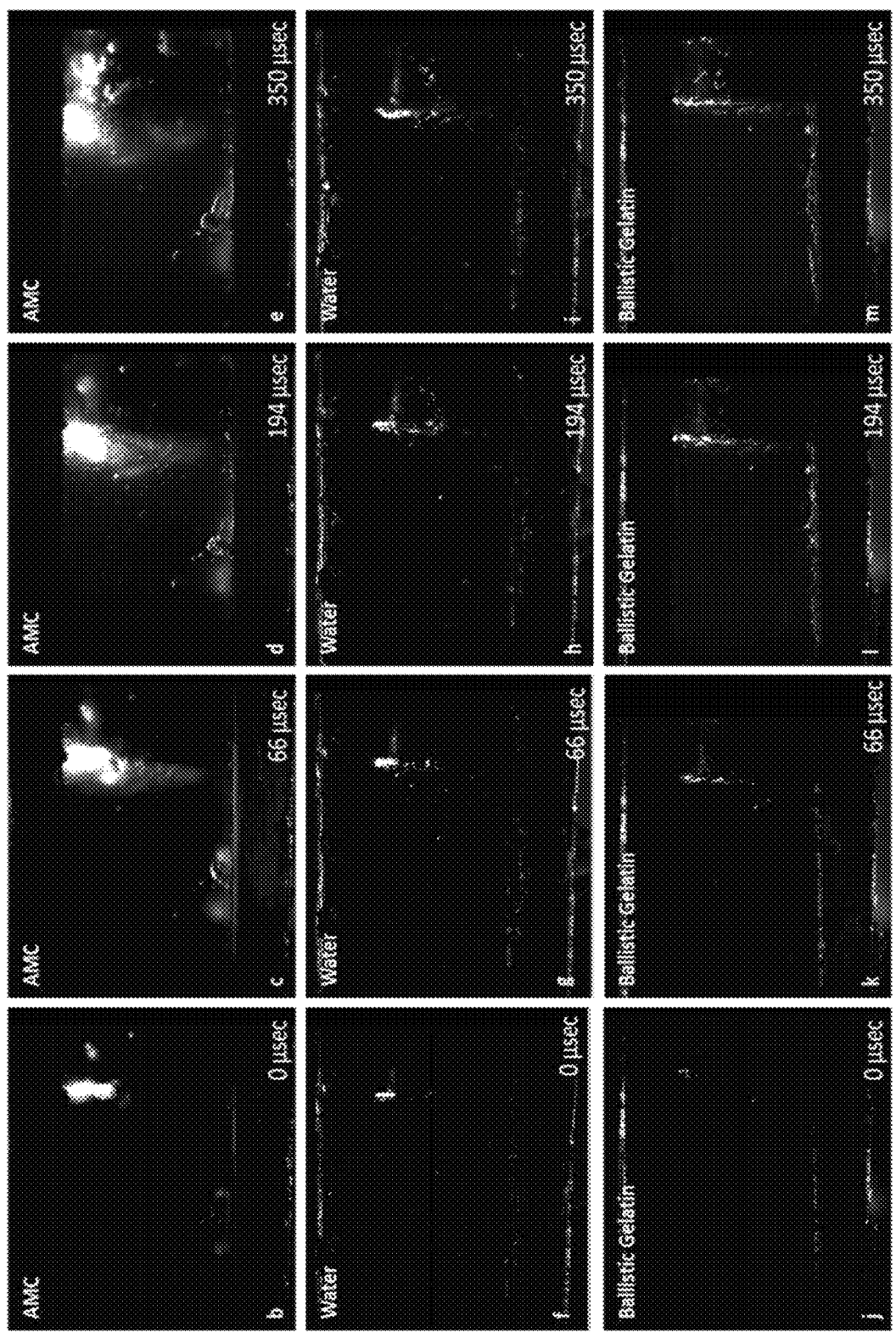

Frames b-e of FIG. 41B depict time-lapse pictures of the AMC gel following impact. Volume oscillations (pulsations) of air bubbles, trapped inside the gel, indicate the recurrent passage of stress-waves across the sample. An optically opaque front develops on the edge of the bar ~50 microseconds after the impact, and grows to 3-5 mm depth within the following ~300 microseconds. This front progresses at a velocity of ~50 m·s$^{-1}$, which is much slower than the stress waves, whose velocity is about 1600 m·s$^{-1}$.

In order to rule out reasons for the impact-induced opacity other than gelation, two control experiments were carried out. An experiment with near identical loading conditions was performed on pure water, as they compose 94.4% wt. of the AMC system. A second control experiment was carried out on 5% wt. ballistic gelatin, the most extensively studied organic aqueous gel material in impact experiments. However, in both control experiments only the formation of trapped oscillating air bubbles was observed, FIG. 41B frames f-I and frames j-m respectively. Cavitation as a possible cause for opaqueness is also excluded since the air bubbles, present throughout the samples clearly "pulsate" in size. This volume oscillation originates from reflections of the faster travelling elastic stress-waves within the medium, and is incompatible with conditions required to form a cavitation-induced advancing front.

It is therefore proposed that the process occurring within the sample in the area most proximal to the bar's leading edge, originates from the rapid shock-induced gelation of the AMC following impact. The opacity would therefore arise from structures of large enough size to scatter visible light, although these structures would not necessarily be as complex as those obtained by slow heating. This gelation may stem from several sources, among which are the local heating and the large increase, ~150 fold, of local pressures caused by the impact. The effect of high pressure on AMC gel formation has not yet been reported. Further support for the proposed mechanism can be derived by straightforward energy considerations. The enthalpy of gelation of AMC solution is on the order of 0.7 J·mL$^{-1}$. The energy delivered into the sample was calculated based on the difference between impact and reflected elastic waves, recorded using strain gauges on the impact bar. Calculations and measurements clearly indicate that the energy delivered to the sample upon impact in all cases exceeds the energy required to induce gelation in the volume in which opacity is observed by a factor of at least 1.7, see Table 3, showing energy values provided by the impacting bar compared to those required for AMCs to undergo gelation, in four typical experiments.

Figure 43:
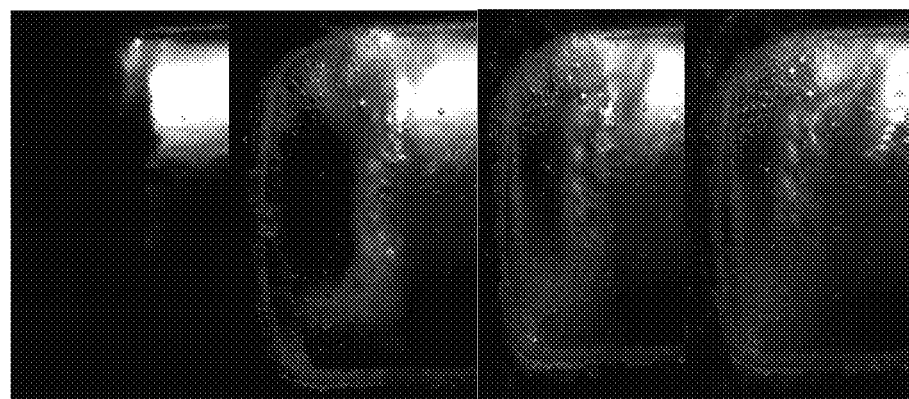
FIG. 43 presents time-lapse pictures of AMC 5.6% wt. in a chamber with the impact bar situated close to the rear wall. $t_0$=time of impact, the sample temperature is 23±2° C. and the impacting bar advances inwards from the right (from left to right: 0 μsec, 66 μsec, 194 μsec, 350 μsec).

In a typical impacted AMC solution, a delay time of ~100 microseconds precedes the formation of the opaque front, which presents a rise-time of ~200 microseconds. The obtained sigmoidal curves are similar to those reported for gel formation by slow heating in rheological measurements, where the storage and loss moduli are plotted as a function of increasing temperature. When the impacting bar is in close proximity to the rear wall of the chamber, the formation of gel can be observed in this site as well, as the appearance of a second opaque front, see FIG. 43. In contrast to the moving bar, the rear wall is a non-hindered site for observation, in which the conditions of heat and pressure for gel formation are also met. In such a setup, the delay time for observed gel formation shortens somewhat but the rise-times remain similar.

AMC was previously well-known to gelate in a thermally-induced process, but this complementary impact-induced gelation is presented here for the first time. This new mechanism can explain the energy uptake and large shock-attenuation observed for impacted, room-temperature AMC. Because of their unique transition to solids upon heating, this behavior may occur also in other families of inverse-freezing materials. Thus, the herein disclosed findings unfold a new potential to harness these materials for shock mitigation or energy dissipation purposes, and for other applications requiring very rapid response of liquid materials.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A composition comprising (i) at least one inverse freezing material and (ii) an additive; wherein said composition is characterized by at least one of: (i) a composition capable of reducing incoming shockwaves entering into the composition, at a value of at least 10% higher compared to water; (ii) a shock attenuator, capable of reducing at least 10% of a maximal amplitude of a force passing through 1 cm thick layer of said composition; (iii) a shock attenuator, capable of reducing at least 5% of an impulse of a force passing through 1 cm thick layer of said composition; (iv) a shear thickening composition characterized by an increase of viscosity of at least 20% within a shear rate range between 1 1/sec and 1,000,000 1/sec, compared to a corresponding viscosity of a pristine inverse-freezing material devoid of

TABLE 3

| Exp. No. | Strain energy (Pa) | Depth of observed gel front (mm) | Volume of formed gel (mL) | Impact energy, in volume of observed gel (J) | Energy required for gelation in the observed volume(J)* | Ratio of impact energy to gelation energy |
|---|---|---|---|---|---|---|
| 1 | $1.23 \cdot 10^6$ | 3.0 | 0.38 | 0.47 | 0.27 | 1.7 |
| 2 | $1.31 \cdot 10^6$ | 4.4 | 0.56 | 0.87 | 0.39 | 2.2 |
| 3 | $2.57 \cdot 10^6$ | 4.4 | 0.56 | 1.43 | 0.39 | 3.7 |
| 4 | $2.82 \cdot 10^6$ | 4.3 | 0.54 | 1.53 | 0.38 | 4.0 |

The surface area of the bar is constant for all experiments, 12.7 mm. The depth of the observed gel front was measured from the films.
*Values are 0.7 J · mL$^{-1}$.

Figure 42:
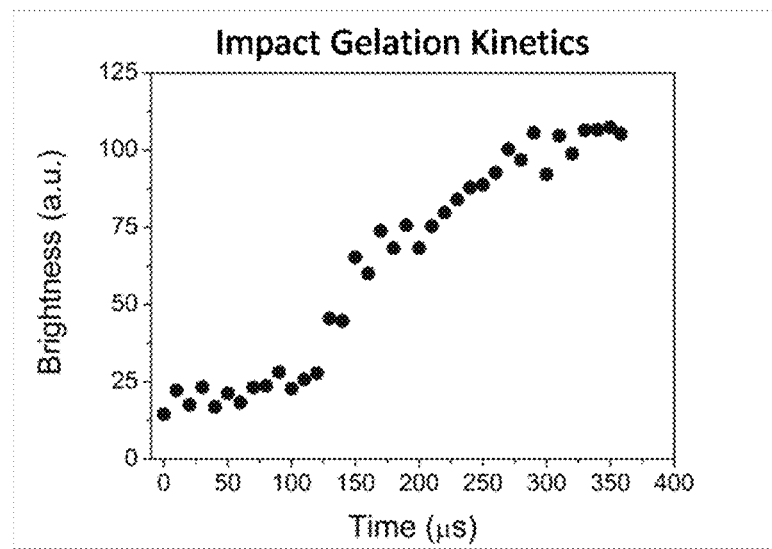
FIG. 42 presents a graph showing gel formation by time from impact (in microseconds), provided by graphical analysis (brightness in arbitrary units), as derived from the high-speed camera films.

By applying statistical analysis on pixel brightness, the kinetics of gelation may be unveiled, FIG. 42.

said additive; (v) a composition capable of reducing at least 10% of the intensity of shockwaves passing thereto in the frequencies of 0 Hz to 50,000 Hz; and (vi) at least 10% shear thickening at a shear rate of at least 1 l/sec to 1000 l/sec; (vii) a composition having an increase of flow stress of at least 10%, measured at a strain higher than 2%, at a strain rate of 1200 l/sec to 1800 l/sec and at a temperature above the gelation or solidification point, compared to a corresponding flow stress of a pristine inverse-freezing material devoid of said additive.

2. The composition of claim 1, wherein said inverse freezing material comprises (i) a polymeric component selected from the group consisting of: a cellulose derivative, amphiphilic polymer, Polysuccinimide, N-alkyl substituted acrylamide, Poly-4-methylpentene-1 (P4MP 1), Polyethyleneoxide-polypropyleneoxide-polyethyleneoxide (PEO-PPO-PEO), poly(2-ethyl-2-oxazoline, poly(ethylene oxide)-polylactic acid block copolymer; (ii) a small molecule selected from the group consisting of: 4-cyano-4'-octyloxybiphenyl liquid crystal, 4-methylpyridine (4MP), alpha cyclodextrin, nicotine, and any combination thereof.

3. The composition of claim 1, wherein said cellulose derivative comprises an alkyl cellulose, optionally wherein said cellulose derivative is selected from the group consisting of: hydroxypropylcellulose, methyl cellulose, and a combination thereof.

4. The composition of claim 1, further comprising a solvent, a solvent comprising an aqueous solvent, a matrix, or a combination thereof.

5. The composition of claim 1, wherein said composite is characterized by undergoing one or more from: solidification, crystallization, phase separation, gelation, or increased viscosity, upon heating or upon introduction of shock into the composite, wherein said additive is present at a concentration of 0.05 to 65%, by weight of said composition.

6. The composition of claim 1, wherein said additive is selected from the group consisting of: rubber, polystyrene, polyethylene, polypropylene, a polyvinyl, graphite, polysaccharide, polyvinyl alcohol (PVA), alginic acid, poly(methyl methacrylate) (PMMA), polyvinyl pyrrolidone, polythiophene, polylactic acid, polysuccinimide, acrylic polymer, methacrylic acid polymers, polyamines, polyamides, peptides, polyesters, polyurethanes, a biomolecule or biosourced material, corn-flour (starch), starch derivatives, polyamine crosslinkers, Flubber or a derivative thereof, diamond, graphene, ceramics, metals, metalloids, and any composition thereof, boron carbide ($B_4C$), boron nitride, silicon carbide, tungsten carbide, aluminum, alumina, silicon, silica and inorganic silicates, alkali and earth-alkali hydroxides and oxides, or any combination or mixture thereof.

7. The composition of claim 1, wherein a concentration of said inverse freezing material within said composition is at least 3%.

8. An article comprising a first layer comprising an inverse-freezing material, and an additional layer of a material selected from: metal, ceramic material, inorganic oxide, Kevlar, and ultra-high molecular weight polyethylene or any combination thereof, and wherein said article is configured for mitigation of energy.

9. The article of claim 8, wherein said composition is in a form selected from liquid, solid, semi-solid and gel, optionally said composition comprising an additive selected from the group consisting of: polymer, rubber, polystyrene, polyethylene, polypropylene, a polyvinyl, graphite, polysaccharide, polyvinyl alcohol (PVA), alginic acid, poly(methyl methacrylate) (PMMA), polyvinyl pyrrolidone, polythiophene, polylactic acid, polysuccinimide, acrylic polymer, methacrylic acid polymers, polyamines, polyamides, peptides, polyesters, polyurethanes, a biomolecule or biosourced material, corn-flour (starch), starch derivatives, polyamine, Flubber or a derivative thereof, diamond, graphene, ceramics, metals, metalloids, and any composition thereof, boron carbide ($B_4C$), boron nitride, silicon carbide, tungsten carbide, aluminum, alumina, silicon, silica and inorganic silicates, alkali and earth-alkali hydroxides and oxides, or any combination or mixture thereof.

10. The article of claim 8, wherein said layer is in a form of a sealed confinement.

11. The article of claim 8, wherein said layer has a thickness of at least 0.1 micrometer.

12. The article of claim 8, wherein said energy is a mechanical energy.

13. The article of claim 8, wherein said inverse-freezing material is selected from the group consisting of: (i) a polymeric component selected from the group consisting of: a cellulose derivative, amphiphilic polymer, polysuccinimide, N-alkyl substituted acrylamide, poly-4-methylpentene-1 (P4MP1), polyethyleneoxide-polypropyleneoxide-polyethyleneoxide (PEO-PPO-PEO), poly(2-ethyl-2-oxazoline, poly(ethylene oxide)-polylactic acid block copolymer: (ii) a small molecule selected from the group consisting of: 4-cyano-4'-octyloxybiphenyl liquid crystal, 4-methylpyridine (4MP), alpha cyclodextrin, nicotine, and any combination thereof.

14. The article of claim 8, wherein said inverse-freezing material comprises a cellulose derivative.

15. The article of claim 14, wherein said cellulose derivative comprises an alkyl cellulose, optionally wherein said cellulose derivative is selected from the group consisting of: hydroxypropylcellulose, methyl cellulose, and a combination thereof.

16. An article comprising a composition comprising an inverse-freezing material, wherein said composition is in a form of a layer, and wherein said article is configured for mitigation of energy, wherein said inverse freezing material is present within said composition at an amount sufficient to provide at least one of: (i) attenuation coefficient in the range of 0.4-0.55 Np/Cm at frequencies of 400 KHz to 1 MHz; (ii) an increase of flow stress of at least 10% at strains higher than 10%, upon increasing the temperature from the gelation temperature (Tg) to 100° C.; (iii) an increase of flow stress by at least 200% in response to a strain above 4% applied to said article at a strain rate above $10^3$ l/sec, in comparison to a flow stress in response to said strain applied to said article at a strain rate below 1 l/sec, at a temperature above the Tg of said inverse-freezing material; (iv) an increase of flow stress by at least 200% at a temperature ranging from the of said inverse-freezing material to 100° C.

17. The article of claim 16, wherein said inverse-freezing material comprises a cellulose derivative.

18. The article of claim 17, wherein said cellulose derivative comprises an alkyl cellulose, optionally wherein said cellulose derivative is selected from the group consisting of: hydroxypropylcellulose, methyl cellulose, and a combination thereof.

19. The article of claim 16, wherein said inverse-freezing material is selected from the group consisting of: (i) a polymeric component selected from the group consisting of: a cellulose derivative, amphiphilic polymer, Polysuccinimide, N-alkyl substituted acrylamide, Poly-4-methylpentene-1 (P4MP1), Polyethyleneoxide-polypropyleneoxide-polyethyleneoxide (PEO-PPO-PEO), poly(2-ethyl-2-oxazoline, poly(ethylene oxide)-polylactic acid block copolymer: (ii) a small molecule selected from the group consisting of: 4-cyano-4'-octyloxybiphenyl liquid crystal, 4-methylpyridine (4MP), alpha cyclodextrin, nicotine, and any combination thereof.

* * * * *